United States Patent
Nakarmi et al.

(10) Patent No.: US 12,556,948 B2
(45) Date of Patent: Feb. 17, 2026

(54) FALSE CELL DETECTION IN A WIRELESS COMMUNICATION NETWORK

(71) Applicant: Telefonaktiebolaget LM Ericsson (publ), Stockholm (SE)

(72) Inventors: Prajwol Kumar Nakarmi, Sollentuna (SE); Ikram Ullah, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 441 days.

(21) Appl. No.: 18/013,929

(22) PCT Filed: Jun. 22, 2021

(86) PCT No.: PCT/IB2021/055519
§ 371 (c)(1),
(2) Date: Dec. 30, 2022

(87) PCT Pub. No.: WO2022/003490
PCT Pub. Date: Jan. 6, 2022

(65) Prior Publication Data
US 2023/0300643 A1  Sep. 21, 2023

Related U.S. Application Data

(60) Provisional application No. 63/045,932, filed on Jun. 30, 2020.

(51) Int. Cl.
*H04W 24/08* (2009.01)
*G06F 21/30* (2013.01)
*G06N 3/0895* (2023.01)
*G06N 3/09* (2023.01)
*H04L 41/16* (2022.01)
*H04W 12/121* (2021.01)
*H04W 48/08* (2009.01)

(52) U.S. Cl.
CPC ............ *H04W 24/08* (2013.01); *G06F 21/30* (2013.01); *G06N 3/0895* (2023.01); *G06N 3/09* (2023.01);
(Continued)

(58) Field of Classification Search
None
See application file for complete search history.

(56) References Cited

U.S. PATENT DOCUMENTS

2013/0242795 A1*  9/2013  Heen ............... H04L 63/1425
                                              370/252
2017/0126705 A1*  5/2017  Mirashrafi .......... H04L 63/102
(Continued)

FOREIGN PATENT DOCUMENTS

WO  2016096836 A1  6/2016
WO  2016206610 A1  12/2016

OTHER PUBLICATIONS

S. Vanjale, P. Mane, Multi Parameter Based Robust and Efficient Rogue AP Detection Approach, pp. 139-156 (Year: 2018).*
(Continued)

*Primary Examiner* — Christopher M Crutchfield
(74) *Attorney, Agent, or Firm* — Sage Patent Group

(57) ABSTRACT

Detection equipment (46) detects a false cell (18) in a wireless communication network (10). The detection equipment (46) obtains a test dataset (40) that comprises one or more test datapoints (42), with each test datapoint indicating a combination (44) of values detected for a cell characteristic. The detection equipment (46) tests for the presence of a false cell (18) that is using the same cell identity as a genuine cell, based on an extent to which the test dataset (40) differs from a training dataset (26) according to a model (30) trained using the training dataset (26).

17 Claims, 34 Drawing Sheets

(52) U.S. Cl.
CPC ........... *H04L 41/16* (2013.01); *H04W 12/121* (2021.01); *H04W 48/08* (2013.01)

(56) References Cited

U.S. PATENT DOCUMENTS

| | | | |
|---|---|---|---|
| 2018/0219885 A1* | 8/2018 | Ahmadzadeh | H04L 63/1483 |
| 2018/0295519 A1* | 10/2018 | Nandha Premnath | ........................ H04L 63/1425 |
| 2019/0130019 A1* | 5/2019 | De | H04L 67/1097 |

OTHER PUBLICATIONS

Tang, Zhanyong et al. "Detecting Evil-twin Attacks in Smart Homes Using The Received Signal Strength Indicator." (Year: 2016).*

N. M. Ahmad, A. H. M. Amin, S. Kannan, M. F. Abdollah and R. Yusof, "A RSSI-based rogue access point detection framework for Wi-Fi hotspots," 2014 IEEE 2nd International Symposium on Telecommunication Technologies (ISTT), Langkawi, Malaysia, pp. 104-109 (Year: 2014).*

Gill, Sumeet, "Detection of Rogue Access Point in WLAN Using Hopfield Neural Network." International Journal of Electrical and Computer Engineering (IJECE), Institute of Advanced Engineering and Science, (Year: 2017).*

Anmulwar, Sweta et al. "Rogue access point detection methods: A review." International Conference on Information Communication and Embedded Systems (ICICES2014), pp. 1-6 (Year: 2014).*

J. Jin, C. Lian and M. Xu, "Rogue Base Station Detection Using A Machine Learning Approach," 2019 28th Wireless and Optical Communications Conference (WOCC), Beijing, China, pp. 1-5 (Year: 2019).*

\* cited by examiner

Train cell 2 without cell 1

| time | n1p | n2p | n3p | n4p | n5p | n6p | n7p | n8p | n9p | n10p | n11p | n12p |
|------|-----|-----|-----|-----|-----|-----|-----|-----|-----|------|------|------|
| 400  |     | -97 | -156| -91 | -88 | -97 | -94 | -92 | -98 | -156 | -99  | -156 |
| 2440 | -100| -98 | -156| -95 | -90 | -100| -94 | -87 | -156| -99  | -97  |      | predict and compare

Train cell 2 without cell 3

| time | n1p | n2p | n3p | n4p | n5p | n6p | n7p | n8p | n9p | n10p | n11p | n12p |
|------|-----|-----|-----|-----|-----|-----|-----|-----|-----|------|------|------|
| 400  |     | -97 |     | -91 | -88 | -97 | -94 | -92 | -98 | -156 | -99  | -156 |
| 2440 | -156| -100|     | -156| -95 | -90 | -100| -94 | -87 | -156 | -99  | -97  | predict and compare

Train cell 2 without cell 12

| time | n1p | n2p | n3p | n4p | n5p | n6p | n7p | n8p | n9p | n10p | n11p | n12p |
|------|-----|-----|-----|-----|-----|-----|-----|-----|-----|------|------|------|
| 400  |     | -97 | -97 | -91 | -88 | -97 | -94 | -92 | -98 | -156 | -99  |      |
| 2440 | -156| -100| -98 | -156| -95 | -90 | -100| -94 | -87 | -156 | -99  |      | predict and compare

*FIGURE 5*

| ServingCell | NeighCell-1 | NeighCell-3 | NeighCell-4 | NeighCell-5 | NeighCell-6 | NeighCell-7 | NeighCell-8 | NeighCell-9 | NeighCell-10 | NeighCell-11 |
|---|---|---|---|---|---|---|---|---|---|---|
| -68 | -79.0 | -76.000000 | -75.000000 | -79.0 | -69.000000 | -79.0 | -67.000000 | -79.0 | -75.000000 | -73.000000 |
| -67 | -79.0 | -76.000000 | -74.264487 | -79.0 | -69.298663 | -79.0 | -67.383358 | -79.0 | -75.000000 | -73.052006 |
| -66 | -79.0 | -76.206546 | -73.873025 | -79.0 | -69.693567 | -79.0 | -67.254515 | -79.0 | -74.763544 | -73.550226 |
| -65 | -79.0 | -76.483497 | -73.370787 | -79.0 | -70.143961 | -79.0 | -67.300211 | -79.0 | -74.371138 | -74.068820 |
| -64 | -79.0 | -76.324468 | -73.311550 | -79.0 | -69.655395 | -79.0 | -68.284954 | -79.0 | -73.772036 | -74.018617 |
| -63 | -79.0 | -76.433207 | -73.247788 | -79.0 | -69.435314 | -79.0 | -69.028234 | -79.0 | -73.415086 | -74.218289 |
| -62 | -79.0 | -76.995960 | -73.047980 | -79.0 | -69.638384 | -79.0 | -69.346465 | -79.0 | -73.195960 | -74.350000 |
| -61 | -79.0 | -78.096166 | -72.766890 | -79.0 | -69.721242 | -79.0 | -69.558125 | -79.0 | -72.850883 | -74.405965 |
| -60 | -79.0 | -79.000000 | -72.614173 | -79.0 | -69.916249 | -79.0 | -69.833214 | -79.0 | -72.665712 | -74.592699 |
| -59 | -79.0 | -79.000000 | -72.617021 | -79.0 | -69.929695 | -79.0 | -70.022202 | -79.0 | -72.552266 | -76.356152 |
| -58 | -79.0 | -79.000000 | -72.426029 | -79.0 | -70.170189 | -79.0 | -70.190211 | -79.0 | -72.437152 | -79.000000 |
| -57 | -79.0 | -79.000000 | -72.248143 | -79.0 | -70.378900 | -79.0 | -70.368499 | -79.0 | -72.245171 | -79.000000 |
| -56 | -79.0 | -79.000000 | -73.582723 | -79.0 | -70.404100 | -79.0 | -70.505124 | -79.0 | -73.087848 | -79.000000 |
| -55 | -79.0 | -79.000000 | -77.980565 | -79.0 | -70.535336 | -79.0 | -70.736749 | -79.0 | -77.673145 | -79.000000 |
| -54 | -79.0 | -79.000000 | -79.000000 | -79.0 | -73.313665 | -79.0 | -73.236025 | -79.0 | -79.000000 | -79.000000 |

*FIGURE 14*

|  | NeighCell-1 | NeighCell-2 | NeighCell-3 | NeighCell-4 | NeighCell-5 | NeighCell-6 | NeighCell-7 | NeighCell-8 | NeighCell-9 | NeighCell-10 | NeighCell-11 |
|---|---|---|---|---|---|---|---|---|---|---|---|
| Meas Report #1 | 0.0 | NaN | 0.995960 | 0.047980 | 0.0 | -0.361616 | 0.0 | 0.346465 | 0.0 | -0.804040 | 1.350000 |
| Meas Report #2 | 0.0 | NaN | 0.433207 | -0.752212 | 0.0 | 1.435314 | 0.0 | -0.971766 | 0.0 | 0.415086 | 2.218289 |
| Meas Report #3 | 0.0 | NaN | 0.000000 | 0.614173 | 0.0 | -1.083751 | 0.0 | 0.833214 | 0.0 | -0.334288 | 0.592699 |
| Meas Report #4 | 0.0 | NaN | 0.433207 | -0.752212 | 0.0 | 0.435314 | 0.0 | 0.028234 | 0.0 | 0.415086 | 2.218289 |
| Meas Report #5 | 0.0 | NaN | -0.516503 | 0.370787 | 0.0 | -0.856039 | 0.0 | 1.300211 | 0.0 | -0.628862 | 1.068820 |

*FIGURE 15*

| ServingCell | NeighCell-1 | NeighCell-2 | NeighCell-3 | NeighCell-4 | NeighCell-5 | NeighCell-6 | NeighCell-7 | NeighCell-8 | NeighCell-9 | NeighCell-10 | NeighCell-11 |
|---|---|---|---|---|---|---|---|---|---|---|---|
| -68 | 0.0 | 0.0 | -76.000000 | -75.000000 | 0.0 | -69.000000 | 0.0 | -67.000000 | 0.0 | -75.000000 | -71.000000 |
| -67 | 0.0 | 0.0 | -76.000000 | -74.276627 | 0.0 | -69.306213 | 0.0 | -67.374260 | 0.0 | -75.000000 | -71.602071 |
| -66 | 0.0 | 0.0 | -76.225970 | -73.853288 | 0.0 | -69.724564 | 0.0 | -67.219224 | 0.0 | -74.767847 | -72.157392 |
| -65 | 0.0 | 0.0 | -76.475532 | -73.375177 | 0.0 | -70.215177 | 0.0 | -67.325532 | 0.0 | -74.359220 | -72.762766 |
| -64 | 0.0 | 0.0 | -76.323831 | -73.312429 | 0.0 | -69.660205 | 0.0 | -68.282402 | 0.0 | -73.771570 | -72.766629 |
| -63 | 0.0 | 0.0 | -69.773744 | -73.246518 | 0.0 | -69.438160 | 0.0 | -69.030393 | 0.0 | -73.415787 | -72.776699 |
| -62 | 0.0 | 0.0 | -52.923814 | -73.050959 | 0.0 | -69.639253 | 0.0 | -69.343592 | 0.0 | -73.197780 | -73.117558 |
| -61 | 0.0 | 0.0 | -20.655698 | -72.768434 | 0.0 | -69.715417 | 0.0 | -69.567946 | 0.0 | -72.850091 | -73.288848 |
| -60 | 0.0 | 0.0 | 0.000000 | -72.620043 | 0.0 | -69.909156 | 0.0 | -69.839942 | 0.0 | -72.668349 | -73.377794 |
| -59 | 0.0 | 0.0 | 0.000000 | -72.606786 | 0.0 | -69.933134 | 0.0 | -70.012974 | 0.0 | -72.555888 | -73.396208 |
| -58 | 0.0 | 0.0 | 0.000000 | -72.400000 | 0.0 | -70.191710 | 0.0 | -70.179084 | 0.0 | -72.439378 | -59.648705 |
| -57 | 0.0 | 0.0 | 0.000000 | -72.267544 | 0.0 | -70.366959 | 0.0 | -70.383041 | 0.0 | -72.236842 | -2.380117 |
| -56 | 0.0 | 0.0 | 0.000000 | -53.976778 | 0.0 | -70.406386 | 0.0 | -70.503628 | 0.0 | -58.554427 | 0.000000 |
| -55 | 0.0 | 0.0 | 0.000000 | -9.363148 | 0.0 | -69.813953 | 0.0 | -68.808587 | 0.0 | -12.686941 | 0.000000 |
| -54 | 0.0 | 0.0 | 0.000000 | 0.000000 | 0.0 | -47.219136 | 0.0 | -46.966049 | 0.0 | 0.000000 | 0.000000 |

*FIGURE 17*

| | ServingCell | NeighCell-1 | NeighCell-2 | NeighCell-3 | NeighCell-4 | NeighCell-5 | NeighCell-6 | NeighCell-7 | NeighCell-9 | NeighCell-10 | NeighCell-11 |
|---|---|---|---|---|---|---|---|---|---|---|---|
| ServingCell | 0.0 | 0.0 | 0.046408 | 0.0 | 0.331024 | 0.0 | 0.000000 | 0.0 | 0.0 | 0.000000 | 18.689657 |
| NeighCell-1 | 0.0 | 0.0 | 0.000000 | 0.0 | 0.000000 | 0.0 | 0.000000 | 0.0 | 0.0 | 0.000000 | 0.000000 |
| NeighCell-2 | 0.0 | 0.0 | 0.000000 | 0.0 | 0.000000 | 0.0 | 0.022321 | 0.0 | 0.0 | 0.000000 | 9.675639 |
| NeighCell-3 | 0.0 | 0.0 | 0.098792 | 0.0 | 0.059149 | 0.0 | 0.065134 | 0.0 | 0.0 | 0.015237 | 3.760065 |
| NeighCell-4 | 0.0 | 0.0 | 0.033756 | 0.0 | 0.000000 | 0.0 | 0.036230 | 0.0 | 0.0 | 0.000000 | 7.003094 |
| NeighCell-5 | 0.0 | 0.0 | 0.000000 | 0.0 | 0.000000 | 0.0 | 0.000000 | 0.0 | 0.0 | 0.000000 | 0.000000 |
| NeighCell-6 | 0.0 | 0.0 | 0.250053 | 0.0 | 0.000000 | 0.0 | 0.000000 | 0.0 | 0.0 | 0.000000 | 6.491473 |
| NeighCell-7 | 0.0 | 0.0 | 0.000000 | 0.0 | 0.000000 | 0.0 | 0.000000 | 0.0 | 0.0 | 0.000000 | 0.000000 |
| NeighCell-9 | 0.0 | 0.0 | 0.000000 | 0.0 | 0.000000 | 0.0 | 0.000000 | 0.0 | 0.0 | 0.000000 | 0.000000 |
| NeighCell-10 | 0.0 | 0.0 | 0.004471 | 0.0 | 0.000000 | 0.0 | 0.017601 | 0.0 | 0.0 | 0.000000 | 4.232644 |

*FIGURE 19*

FALSE CELL DETECTION IN A WIRELESS COMMUNICATION NETWORK

PRIORITY CLAIM

This application is a national stage application of International Patent Application No. PCT/IB2021/055519, filed Jun. 22, 2021, which claims priority to U.S. Patent Application No. 63/045,932, Jun. 30, 2020, the disclosure disclosures of which are hereby incorporated in their entirety by reference.

TECHNICAL FIELD

The present application relates generally to a wireless communication system and relates more particularly to detection of a false cell in such a system.

BACKGROUND

A wireless device can be configured by a wireless communication network to provide the network with measurements of neighbour cells, e.g., to facilitate handovers, enable Self-Organizing Network (SON) features, and the like. These measurement reports can also be used to detect false cells that masquerade as genuine cells in order to maliciously eavesdrop on and/or track wireless devices. For example, when a wireless device sends a measurement report that reports detection of a cell with a certain cell identity, the network can check whether the reported cell identity is valid by checking whether the reported identity is included in a list of identities used by the network. If the reported identity is absent from the list so as to be an invalid identity, this anomaly may indicate the presence of a false cell.

Challenges nonetheless exist in detecting the presence of a false cell that is using a valid cell identity. A resourceful attacker may for instance scan the network to identify a cell identity being used in the network, and then operate its false cell with that valid cell identity. Known approaches to false cell detection would fail to detect the presence of a false cell in this case.

SUMMARY

Some embodiments herein are advantageously capable of detecting the presence of a false cell even if that false cell is using the same cell identity as a genuine cell. Some embodiments in this regard detect the presence of a false cell by detecting the impact that the false cell's presence has on what combination of values a wireless device detects for a cell characteristic, e.g., signal strength, signal quality, or cell identity. The values in the combination may for example be values for different respective cells, e.g., reflecting the values for the cells at a certain time. One or more embodiments, for instance, detect the impact that a false cell's presence has on what combination of values a wireless device's measurement report reports for the signal strength, signal quality, or cell identity of a serving cell's neighbors, e.g., on the basis that the false cell's presence, in a location different than the genuine cell which the false cell is masquerading as, disturbs the spatial relationship between various cells' signal strength values, signal quality values, or cell identity values reported in combination by a wireless device. Or, as another example, the values in the combination may be values for the same cell, e.g., reflecting values of the same cell at different times. For instance, one or more other embodiments according to this example detect the impact that a false cell's presence has on what combination of values a wireless device reports over time for a certain cell's signal strength or signal quality, e.g., on the basis that the false cell's presence disturbs the temporal relationship between signal strength values or signal quality values reported for the cell. By focusing on what combination of values a wireless device detects for a cell characteristic, instead of or in addition to whether a detected cell identity is valid or invalid, some embodiments thereby provide false cell detection that is robust against malicious re-use of valid cell identifiers.

More particularly, embodiments herein include a method performed by model training equipment. The method comprises obtaining a training dataset that comprises false-cell-free datapoints. Each false-cell-free datapoint indicates a combination of values detected for a cell characteristic in the assumed absence of a false cell. The method may further comprise, using the training dataset, training a model to test for the presence of a false cell based on an extent to which a test dataset differs from the training dataset. In some embodiments, the model is trained to test for the presence of a false cell that is using the same cell identity as a genuine cell, e.g., so that the presence of a false cell may be detected even if the false cell is using the same cell identity as a genuine cell.

In some embodiments, the method further comprises obtaining an input dataset that indicates values detected for the cell characteristic in the assumed absence of a false cell. In this case, obtaining the training dataset may comprise creating the training dataset from the input dataset. In one such embodiment, the input dataset includes data detected and reported by wireless devices in the assumed absence of a false cell. Alternatively or additionally, creating the training dataset from the input dataset may comprise forming the false-cell-free datapoints as respective combinations of values indicated by the input dataset.

In some embodiments, the values in each combination indicated by a false-cell-free datapoint have a spatial and/or temporal relationship. In one such embodiment, the model is trained to test for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

In some embodiments, the values in the combination indicated by each false-cell-free datapoint are associated with respective cell identities in a set.

In some embodiments, the model is trained to test for the presence of a false cell that is using a certain cell identity based on an extent to which a test distribution for the certain cell identity differs from a false-cell-free distribution for the certain cell identity.

In some embodiments, the model is trained to test for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in combination with the given reference value, detected in association with the non-reference cell identity, and detected across the false-cell-free datapoints. And the test distribution for the non-reference cell identity comprises a distribution of values detected for the cell characteristic in combination with the given reference value, detected in association with the non-reference cell identity, and detected across test datapoints of the test dataset. For example, the model may represent the false-cell-free distribution for the non-reference cell identity as a measure of central tendency of the values detected for the cell characteristic in combination with the given reference value, detected in association with the non-reference cell identity, and detected across the false-cell-free datapoints. In such a case, the model may comprise a threshold based on which to test an extent to which the false-cell-free distribution for the non-reference cell identity differs from the test distribution for the non-reference cell identity.

In other embodiments, the model is trained to test for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in association with the non-reference cell identity, detected across the false-cell-free datapoints, and detected across the different reference values. And the test distribution for the non-reference cell identity comprises a distribution of values detected for the cell characteristic in association with the non-reference cell identity, detected across test datapoints of the test dataset, and detected across the different reference values. For example, the model may represent the false-cell-free distribution for the non-reference cell identity as a two-dimensional curve of the values detected for the cell characteristic in association with the non-reference cell identity, detected across the false-cell-free datapoints, and detected across the different reference values. In this case, the model may comprise a threshold based on which to test an extent to which the test distribution for the non-reference cell identity differs from the false-cell-free distribution for the non-reference cell identity. In some embodiment, then, the test distribution for the non-reference cell identity is represented as a two-dimensional curve of values detected for the cell characteristic in association with the non-reference cell identity, detected across the test datapoints, and detected across the different reference values. Training may thereby comprise training the model to test for the presence of a false cell based on an extent to which an area under the two-dimensional curve represented by the test distribution is above the threshold.

In some embodiments, each false-cell-free datapoint represents a measurement report that reports values detected for the cell characteristic associated with respective cell identities in a set, including a serving cell identity and one or more neighbor cell identities, wherein the reference cell identity is the serving cell identity.

In some embodiments, said training comprises training the model to test for the presence of a false cell using a certain cell identity based on an extent to which a Kullback-Leibler (KL) divergence representing values associated with the certain cell identity in the test dataset differs from a KL divergence representing values associated with the certain cell identity in the training dataset.

In some embodiments, the values in the combination indicated by each false-cell-free datapoint are associated with respective cell identities in a set, the test dataset includes a test datapoint indicating a combination of values detected for the cell characteristic, and the values in the combination indicated by the test datapoint are associated with respective cell identities in the set. In one such embodiment, training comprises training the model to predict a value for the cell characteristic in association with a certain cell identity in the set, from a combination of one or more values indicated by the test datapoint as detected for the cell characteristic in association with one or more other cell identities in the set. The model may be trained to test for the presence of a false cell using the certain cell identity based on an extent to which the value associated with the certain cell identity in the combination indicated by the test datapoint differs from the value predicted for the cell characteristic in association with the certain cell identity.

In some embodiments, values for the cell characteristic are numerical values and the model is a regression model. In other embodiments, values for the cell characteristic are classification labels and the model is a classification model. It should also be appreciated that numerical values can also be grouped or binned and be used by a classification model.

In yet other embodiments, the combination of values indicated by each false-cell-free datapoint comprise a pair of values detected by a wireless device for the cell characteristic for the same cell identity but at different consecutive detection times. In one such embodiment, the model comprises a measure of central tendency of the differences between the values of each pair comprised in a false-cell-free datapoint, and the model further comprises a threshold based on which to test an extent to which a pair of values detected by the wireless device for the cell characteristic for the same cell identity but at different detection times according to a test datapoint differs from the measure of central tendency.

In some embodiments, the cell characteristic is a cell signal strength or quality. Cell signal strength or quality as used herein may cover, for example, signal-to-noise-ratio (SNR) or signal-to-interference-plus-noise-ratio (SINR) or strength to quality ratio.

In other embodiments, the cell characteristic is a cell identity.

In some embodiments, the model is a machine learning model.

In some embodiments, the model is specific to certain conditions under which the cell characteristic is detected.

In some embodiments, the training dataset further comprises false-cell datapoints, with each false-cell datapoint indicating a combination of values detected for the cell characteristic in the assumed presence of a false cell.

In some embodiments, the method is further performed by detection equipment, and wherein the method further comprises obtaining the test dataset that comprises test datapoints, with each test datapoint indicating a combination of values detected for a cell characteristic. The method may further comprise testing for the presence of a false cell based on an extent to which the test dataset differs from the training dataset according to the trained model.

Embodiments herein also include a method performed by detection equipment. The method comprises obtaining a test dataset that comprises one or more test datapoints, with each test datapoint indicating a combination of values detected for a cell characteristic. The method also comprises testing for the presence of a false cell that is using the same cell identity as a genuine cell, based on an extent to which the test dataset differs from a training dataset according to a model trained using the training dataset.

In some embodiments, the training dataset comprises false-cell-free datapoints, with each false-cell-free datapoint indicating a combination of values detected for the cell characteristic in the assumed absence of a false cell.

In some embodiments, the values in each combination indicated by a false-cell-free datapoint of the training dataset have a spatial and/or temporal relationship. In one such embodiment, said testing comprises testing for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

In some embodiments, the values in the combination indicated by each test datapoint are associated with respective cell identities in a set.

In some embodiments, said testing comprises testing for the presence of a false cell that is using a certain cell identity based on an extent to which a test distribution for the certain cell identity differs from a false-cell-free distribution for the certain cell identity.

In some embodiments, said testing comprises testing for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in combination with the given reference value, detected in association with the non-reference cell identity, and detected across false-cell-free datapoints of the training dataset. And the test distribution for the non-reference cell identity comprises a distribution of values detected for the cell characteristic in combination with the given reference value, detected in association with the non-reference cell identity, and detected across test datapoints of the test dataset. For example, the model may represent the false-cell-free distribution for the non-reference cell identity as a measure of central tendency of the values detected for the cell characteristic in combination with the given reference value, detected in association with the non-reference cell identity, and detected across the false-cell-free datapoints. In this case, the model may comprise a threshold based on which to test an extent to which the false-cell-free distribution for the non-reference cell identity differs from the test distribution for the non-reference cell identity. And said testing may comprise testing for the presence of a false cell using the measure of central tendency and the threshold.

In some embodiments, said testing comprises testing for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in association with the non-reference cell identity, detected across false-cell-free datapoints of the training dataset, and detected across the different reference values. And the test distribution for the non-reference cell identity comprises a distribution of values detected for the cell characteristic in association with the non-reference cell identity, detected across test datapoints of the test dataset, and detected across the different reference values. For example, the model may represent the false-cell-free distribution for the non-reference cell identity as a two-dimensional curve of the values detected for the cell characteristic in association with the non-reference cell identity, detected across the false-cell-free datapoints, and detected across the different reference values. In this case, the model may comprise a threshold based on which to test an extent to which the test distribution for the non-reference cell identity differs from the false-cell-free distribution for the non-reference cell identity. And said testing comprises testing for the presence of a false cell using the two-dimensional curve and the threshold. For instance, the test distribution for the non-reference cell identity is represented as a two-dimensional curve of values detected for the cell characteristic in association with the non-reference cell identity, detected across the test datapoints, and detected across the different reference values, and wherein said testing comprises testing for the presence of a false cell based on an extent to which an area under the two-dimensional curve represented by the test distribution is above the threshold.

In some embodiments, each test datapoint represents a measurement report that reports values detected for the cell characteristic associated with respective cell identities in a set, including a serving cell identity and one or more neighbor cell identities, wherein the reference cell identity is the serving cell identity.

In some embodiments, said testing comprises testing for the presence of a false cell using a certain cell identity based on an extent to which a Kullback-Leibler (KL) divergence representing values associated with the certain cell identity in the test dataset differs from a KL divergence representing values associated with the certain cell identity in the training dataset according to the model.

In some embodiments, the training dataset comprises false-cell-free datapoints, with each false-cell-free datapoint indicating a combination of values detected for the cell characteristic in the assumed absence of a false cell. In one such embodiment, the values in the combination indicated by each false-cell-free datapoint are associated with respective cell identities in a set, the test dataset includes a test datapoint indicating a combination of values detected for the cell characteristic, and the values in the combination indicated by the test datapoint are associated with respective cell identities in the set. In this case, the testing may comprise predicting a value for the cell characteristic in association with a certain cell identity in the set, from a combination of one or more values indicated by the test datapoint as detected for the cell characteristic in association with one or more other cell identities in the set. And testing may further comprise determining an extent to which the value associated with the certain cell identity in the combination indicated by the test datapoint differs from the value predicted for the cell characteristic in association with the certain cell identity.

In some embodiments, values for the cell characteristic are numerical values and the model is a regression model. In other embodiments, values for the cell characteristic are classification labels and the model is a classification model. It should also be appreciated that numerical values can also be grouped or binned and be used by a classification model.

In some embodiments, the combination of values indicated by each test datapoint comprise a pair of values detected by a wireless device for the cell characteristic for the same cell identity but at different consecutive detection times. In one such embodiment, the model comprises a measure of central tendency of the differences between the values of each pair comprised in a test datapoint. In this case, the model may further comprise a threshold based on which to test an extent to which a pair of values detected by the wireless device for the cell characteristic for the same cell identity but at different detection times according to a test datapoint differs from the measure of central tendency, and said testing may comprise testing for the presence of a false cell using the measure of central tendency and the threshold.

In some embodiments, the cell characteristic is a cell signal strength or quality. In other embodiments, the cell characteristic is a cell identity.

In some embodiments, the model is a machine learning model.

In some embodiments, the model is specific to certain conditions under which the cell characteristic is detected.

In some embodiments, the training dataset further comprises false-cell datapoints, with each false-cell datapoint indicating a combination of values detected for the cell characteristic in the assumed presence of a false cell.

Embodiments herein also include corresponding apparatus, computer programs, and carriers of those computer programs. For example, embodiments herein include wireless communication equipment, e.g., comprising communication circuitry and processing circuitry. The wireless communication equipment may comprise model training equipment and/or detection equipment.

The model training equipment may for example be configured to obtain a training dataset that comprises false-cell-free datapoints. Each false-cell-free datapoint indicates a combination of values detected for a cell characteristic in the assumed absence of a false cell. The model training equipment may be further configured to, using the training dataset, train a model to test for the presence of a false cell based on an extent to which a test dataset differs from the training dataset. In some embodiments, the model is trained to test for the presence of a false cell that is using the same cell identity as a genuine cell, e.g., so that the presence of a false cell may be detected even if the false cell is using the same cell identity as a genuine cell.

The detection equipment may be configured to obtain a test dataset that comprises one or more test datapoints, with each test datapoint indicating a combination of values detected for a cell characteristic. The detection equipment may also be configured to test for the presence of a false cell that is using the same cell identity as a genuine cell, based on an extent to which the test dataset differs from a training dataset according to a model trained using the training dataset.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a block diagram of an example data frame for detecting a malicious cell by running prediction on one cell at a time, according to some embodiments.

FIG. 14 is an example reference mapping table that contains mean RSRP values of all cells for unique RSRP values of the serving cell according to some embodiments.

FIG. 15 is an example difference vector V of RSRP values according to some embodiments.

FIG. 17 is an example summary table generated using test data according to some embodiments.

FIG. 19 show an example matrix M containing the area between the curves for all pairs of cells (i,j) in the network according to some embodiments.

DETAILED DESCRIPTION

Figure 1A:
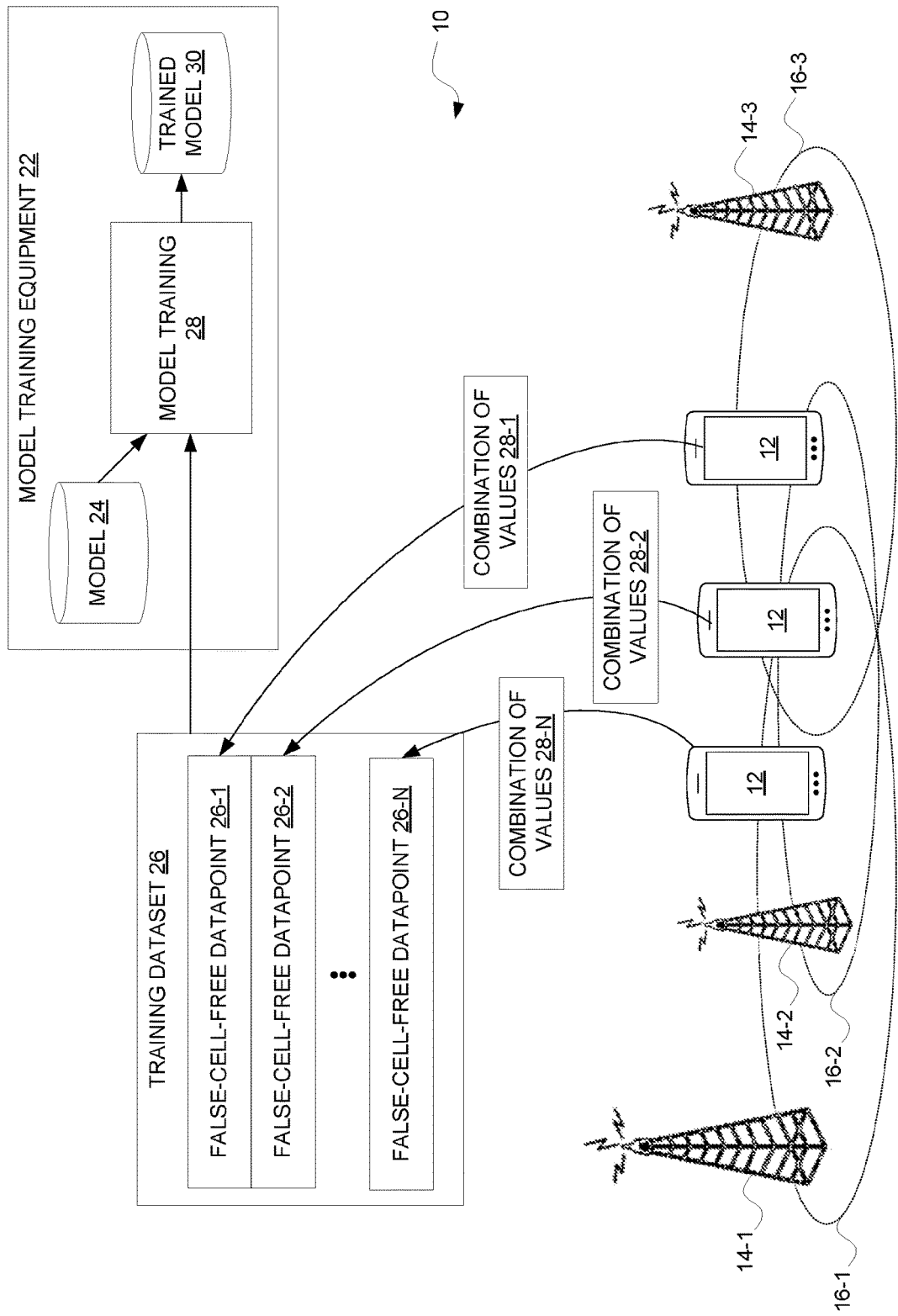
FIG. 1A is a block diagram of a wireless communication network with model training equipment according to some embodiments.

FIG. 1A shows a wireless communication network 10 according to some embodiments. The wireless communication network 10 provides wireless communication service to one or more wireless devices 12. The wireless communication network 10 in this regard includes radio equipment 14 that provide wireless communication service via one or more cells 16. FIG. 1A for instance shows that radio equipment 14-1, 14-2, and 14-3 provide wireless communication service via cells 16-1, 16-2, and 16-3, respectively. The cells 16-1, 16-2, and 16-3 may use respective cell identities, e.g., in the form of respective Physical Cell Identities (PC's) or Cell Global Identities (CGIs), to distinguish themselves on a on a local or global basis. Wireless communication signals may for example be transmitted or received in association with a certain cell identity in order be associated with a certain cell which is assigned that certain cell identity.

Each of the cells 16-1, 16-2, and 16-3 in FIG. 1A are genuine cells in the sense that they are provided by genuine radio equipment belonging to the wireless communication network 10, e.g., according to the network topology and/or under the network operator's control. The genuine cells 16-1, 16-2, 16-3 in this regard advertise themselves as belonging to the wireless communication network 10 and are authentic in doing so, i.e., the genuine cells actually belong to the network to which they claim to belong. This contrasts with a so-called false cell 18 shown in FIG. 1B as being provided by false radio equipment 20. A false cell is a cell that is not provided by radio equipment belonging to the wireless communication network 10 (e.g., according to the network topology and/or under the network operator's control) but that nonetheless attempts to transmit to and/or receive from wireless devices as if the cell was a genuine cell. A false cell may for example masquerade as a genuine cell and surreptitiously lure wireless devices to transmit to and/or receive from the false cell, in order to passively and/or actively attack those wireless devices. A false cell may masquerade as a genuine cell by falsely advertising the wireless communication network's identity as the identity of the network to which the false cell belongs. To more convincingly masquerade as a genuine cell, a false cell might also use the same cell identity as a genuine cell.

Some embodiments herein provide wireless communication equipment that is advantageously capable of detecting the presence of a false cell, even if that false cell is using the same cell identity as a genuine cell. Some embodiments in this regard detect the presence of a false cell by detecting the impact that the false cell's presence has on what combination of values a wireless device detects for a cell characteristic, e.g., signal strength, signal quality, or cell identity. These embodiments thereby capitalize on false cells inherently inducing a change in the surrounding radio environment, especially if they transmit at higher-than-normal signal strength to lure nearby wireless devices. By focusing on what combination of values a wireless device detects for a cell characteristic, instead of or in addition to whether a detected cell identity is valid or invalid as the identity of a genuine cell, some embodiments thereby provide false cell detection that is robust against malicious re-use of genuine cell identifiers.

Basing false cell presence testing on the impact that a false cell has on what combination of values are detected for a cell characteristic may be seen as exploiting a relationship between those values. Such relationship may, for example, be spatial or temporal, e.g., as induced by different cells' geographical positions.

Figure 1B:
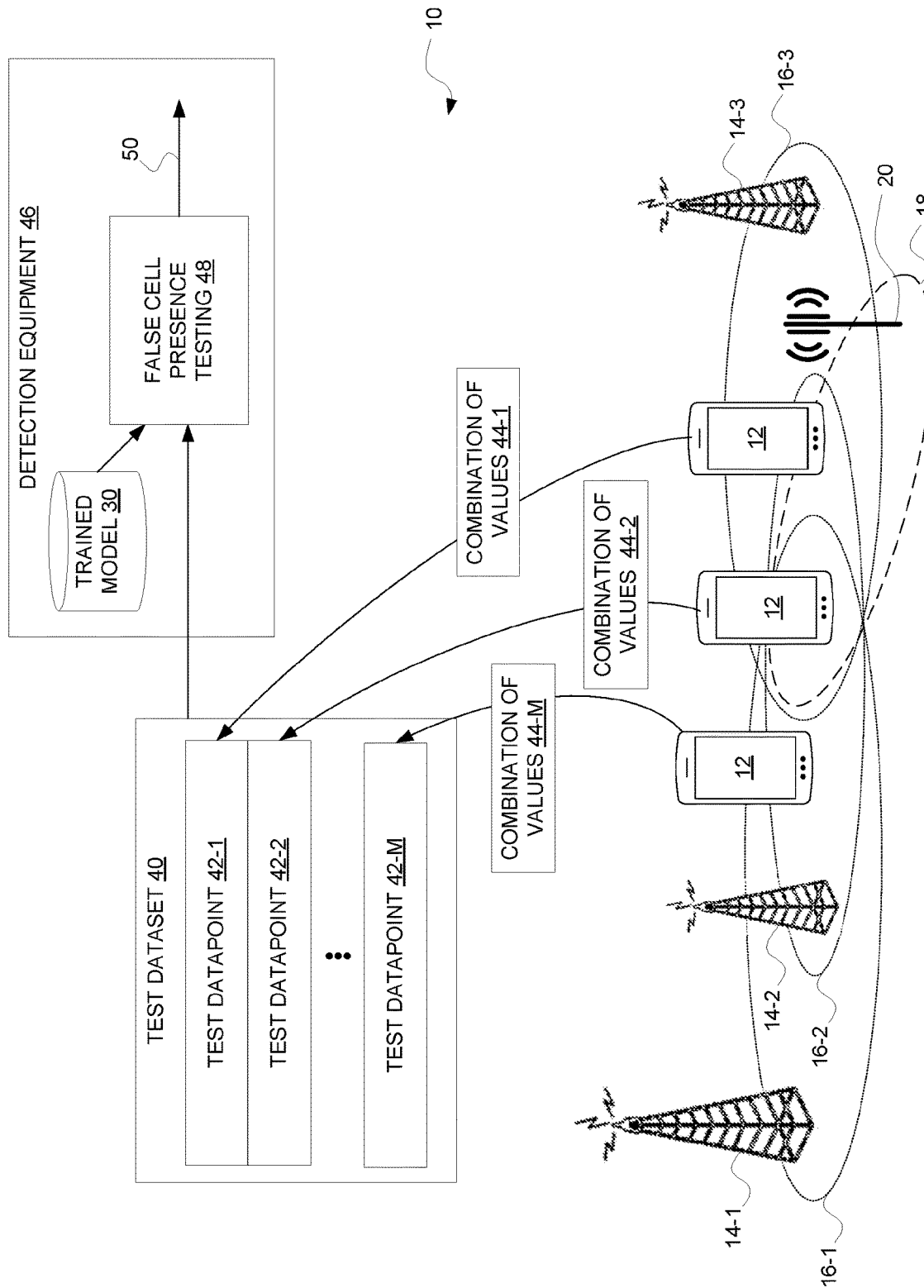
FIG. 1B is a block diagram of a wireless communication network with detection equipment according to some embodiments.

Consider an example where the cell characteristic is signal strength (e.g., Reference Signal Received Power, RSRP) or signal quality (e.g., Reference Signal Received Quality, RSRQ, Signal to Interference to Noise Ratio, SINR, Signal to Noise Ratio, SNR, or Received Signal Strength Indicator, RSSI). Some embodiments may exploit a spatial relationship between the signal strengths and/or signal qualities of cells. Indeed, some embodiments exploit the fact that the signal strengths and signal qualities are related to the geographical position of the cells and the wireless devices, such that the strengths and qualities reported by wireless devices implicitly contain or reflect this spatial relationship. In the absence of a false cell, for instance, a wireless device in FIG. 1A moving away from cell 16-1 and cell 16-2, and toward cell 16-3, will detect a decrease in signal strength/quality for the cell identities being used by cells 16-1 and 16-2 and will detect an increase in signal strength/quality for the cell identity being used by cell 16-3. However, as shown in FIG. 1B, a false cell 18 using the same cell identity as cell 16-1 will disturb this spatial relationship between the signal strengths/qualities detected in combination for those cell identities. Indeed, for the same wireless device movement, the wireless device may actually detect an increase in signal strength/quality for the cell identity being used by cell 16-1 and false cell 18, since the false cell 18 is using that same cell identity. That increase in signal strength or quality may even be sudden and/or experienced by many wireless devices in the vicinity around the same time. Some embodiments exploit this relationship in a linear or non-linear model to detect the presence of a false cell as an anomalous disturbance to the relationship between the signal strengths or qualities detected in combination.

Consider another example where the cell characteristic is the presence of absence of a cell identity (e.g., a Physical Cell Identity, PCI). Some embodiments may exploit a spatial relationship between the cell identities that are detected in combination by wireless devices. In the absence of a false cell, for instance, a wireless device in FIG. 1A moving from left to right will detect various combinations of cell identities over time. First, the wireless device may only detect the cell identity used by cell 16-1. Then, as the wireless device moves to the right, the wireless device may detect the cell identity used by cell 16-1 as well as the cell identity used by cell 16-2. As the wireless device moves further right, the wireless device may then detect a combination of the cell identities used by cells 16-1, 16-2, and 16-3, followed by a combination of the cell identities used by cells 16-2 and 16-3. However, as shown in FIG. 1B, a false cell 18 using the same cell identity as cell 16-1 will disturb this spatial relationship between the cell identities detected in combination. Indeed, for the same wireless device movement, the wireless device may actually detect a combination of the cell identity used by cell 16-1 and the cell identity used by cell 16-3, since the false cell 18 is using the same cell identity as cell 16-1. Some embodiments exploit this relationship in a linear or non-linear model to detect the presence of a false cell as an anomalous disturbance to the relationship between the cell identities detected in combination.

More particularly, FIG. 1A shows that some embodiments herein include model training equipment 22 configured to train a model 24 to test for the presence of a false cell. The model 24 may for instance be a machine learning model, e.g., in the form of a regression model, classification model, or any other type of model trainable via machine learning. Regardless, the model training equipment 22 obtains a training dataset 26. Using this training dataset 26, the model training equipment 22 performs model training 28 in order to train the model 24. The trained model 30 that results from this model training 28 is configured to test for the presence of a false cell, e.g., the model training 28 may train one or more parameters of the model 24 to have values effective for testing for the presence of a false cell.

The training dataset 26 as shown comprises false-cell-free datapoints 26-1, 26-2 . . . 26-N. Each false-cell-free datapoint 26-$n$ indicates a combination of values detected for a cell characteristic (e.g., signal strength, signal quality, or cell presence) in the assumed absence of a false cell. As shown, for instance, false-cell-free datapoint 26-1 indicates one combination of values 28-1 detected for the cell characteristic, false-cell-free datapoint 26-2 indicates another combination of values 28-2 detected for the cell characteristic, and false-cell-free datapoint 26-N indicates yet another combination of values 28-N detected for the cell characteristic, all under the assumption that no false cell is present. The false-cell-free datapoints 26-1, 26-2, . . . 26-N may for instance be acquired during an initial training phase, with tight control over physical access to the network's coverage area, or with other security mechanisms to safeguard against the introduction of false cells. The training phase in this regard may even be performed "offline". In this way the false-cell-free datapoints would be contamination-free, e.g., free of contamination from false cells. In other cases, the network may infer that the false-cell-free datapoints are contamination-free or have few contaminations when there is no degradation of key performance indicators or no complaints from customers. In yet other cases, the network may filter the datapoints to only specific operator-controlled wireless devices at specific times where the chance of a false cell being present is minimum or nil. No matter the particular mechanism for obtaining false-cell-free datapoints, embodiments herein recognize that sometimes it may not be known for certain whether the datapoints are contaminated or not. But embodiments herein may nonetheless assume or operate under the assumption that they are in fact free of contamination from a false cell. Regardless, the false-cell-free datapoints 26-1, 26-2, . . . 26-N thereby effectively represent, as a baseline, the sort of combinations of values that are expected to be detected when no false cell is present.

Figure 2A:
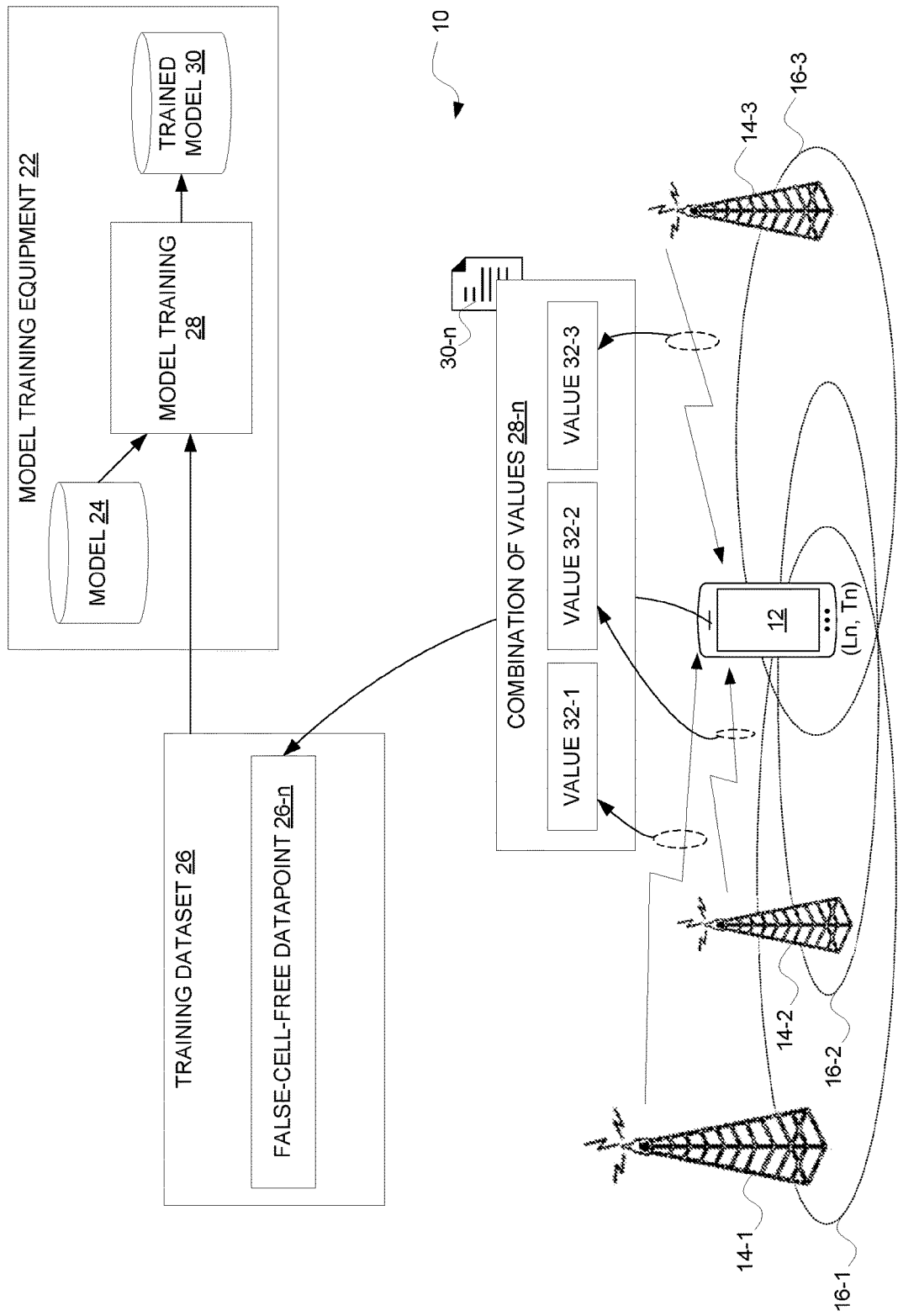
FIG. 2A is a block diagram of a wireless communication network in which values in a combination are reported by the same measurement report, detected at the same location, and/or detected at the same time, according to some embodiments.

The values in any given combination may be interrelated in terms of any number of combination-forming criteria. In some embodiments, for example, values in a combination include values that are detected for the cell characteristic by the same wireless device, at the same time, and/or at the same location, and/or that are reported to the network 10 in the same measurement report. As shown in FIG. 2A, for example, the values in each combination 28-$n$ may be reported by the same measurement report 30-$n$, be detected at the same location Ln, and/or be detected at the same time Tn. In this case, then, each false-cell-free datapoint 26-$n$ may effectively reflect the values that are expected to be detected in combination for the cell characteristic at a certain time and/or location when no false cell is present.

Moreover, in these and other embodiments, the values in each combination 28-$n$ may be associated with respective cell identities in a set. As shown in FIG. 2A, for instance, value 32-1 in the combination 28-$n$ may be detected for the cell characteristic in association with the cell identity of cell 16-1, value 32-2 in the combination 28-$n$ may be detected for the cell characteristic in association with the cell identity of cell 16-2, and value 32-3 in the combination 28-$n$ may be detected for the cell characteristic in association with the cell identity of cell 16-3. Where the cell characteristic is signal strength or quality, value 32-1 is the signal strength or quality detected for the cell identity of cell 16-1, value 32-2 is the signal strength or quality detected for the cell identity of cell 16-2, and value 32-3 is the signal strength or quality detected for the cell identity of cell 16-3, such that the combination 28-$n$ is the combination of signal strength/quality values detected for the cell identities used by cells 16-1, 16-2, and 16-3, e.g., as reported by measurement report 30-$n$. Where the cell characteristic is cell presence, by contrast, value 32-1 indicates whether the cell identity of cell 16-1 is detected as present, value 32-2 indicates whether the cell identity of cell 16-2 is detected as present, and value 32-3 indicates whether the cell identity of cell 16-3 is detected as present, such that the combination 28-$n$ is the combination of presence values detected for the cell identities used by cells 16-1, 16-2, and 16-3, e.g., as reported by measurement report 30-$n$ in the assumed absence of a false cell.

Figure 2B:
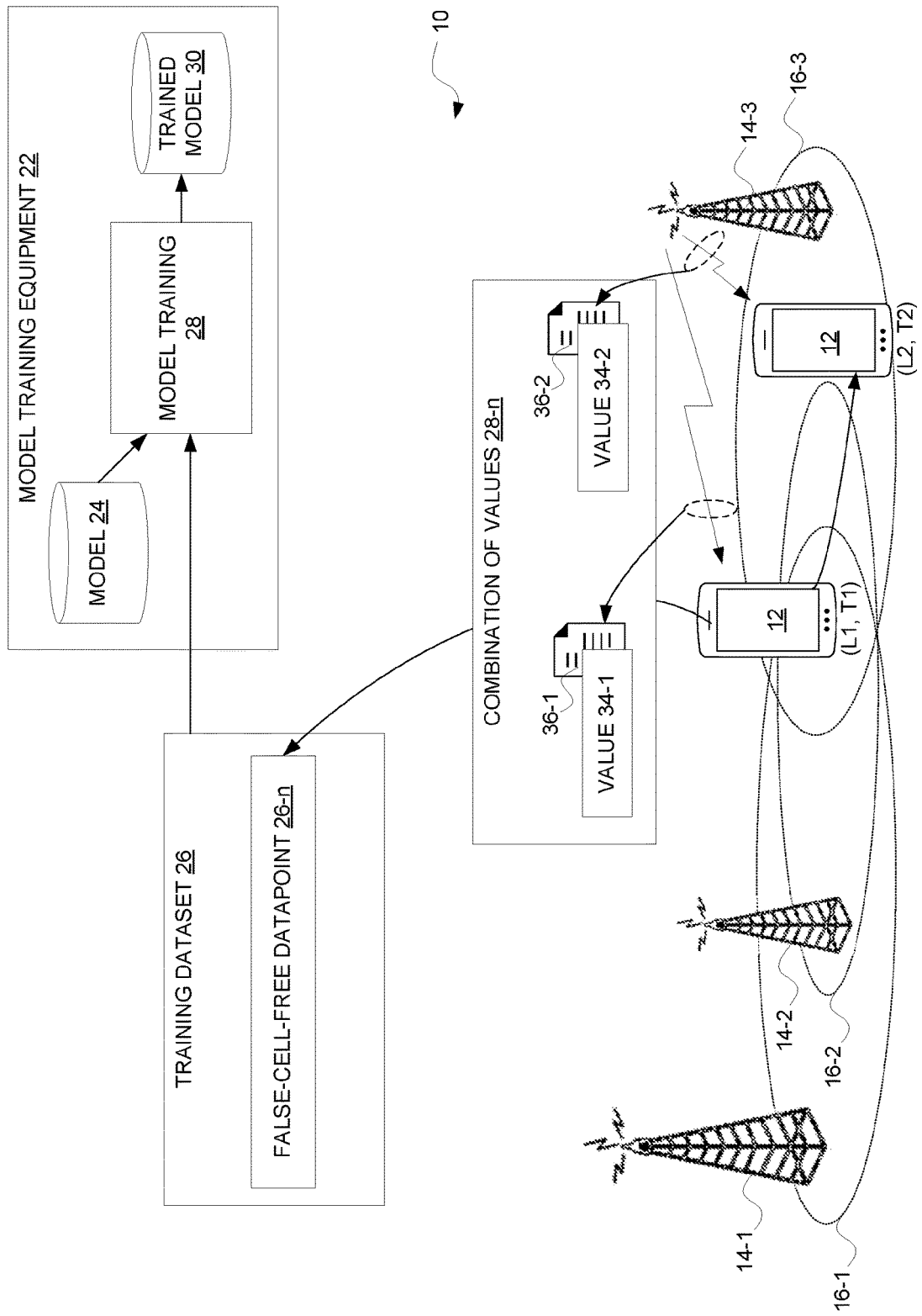
FIG. 2B is a block diagram of a wireless communication network in which values in a combination are detected across two or more consecutive detection times and/or reported across two or more consecutive measurement reports, according to some embodiments.

In other embodiments shown in FIG. 2B, by contrast, values in a combination include values detected across two or more consecutive detection times and/or reported across two or more consecutive measurement reports, e.g., in association with the same cell identity. As depicted in this regard, value 34-1 in the combination 28-$n$ is detected for the cell characteristic at time T1 and reported in measurement report 36-1, in association with the cell identity of cell 16-3. And value 34-2 in the same combination 28-$n$ is detected for the cell characteristic at time T2 and reported in measurement report 36-2, in association with the same cell identity. Times T1, T2 may be consecutive detection times and/or reports 36-1, 36-2 may be consecutive reports, such that the values 34-1, 34-2 in the combination 28-$n$ reflect the underlying temporal relationship between the values of the cell characteristic associated with the same cell identity in the assumed absence of a false cell.

No matter the particular nature of the combinations 28-1, 28-2, . . . 28-N, though, the combinations may in some embodiments be inherently captured or reflected in measurement reports from wireless devices 12, i.e., each measurement report may report a combination of values for the cell characteristic. In other embodiments, though, the combinations must be formed from an input dataset (not shown) which may include data detected and reported by wireless devices in the assumed absence of a false cell, without any regard or resemblance to the combinations. In this case, the training dataset 26 may be created from the input dataset, e.g., by forming the false-cell-free datapoints 26-1 . . . 26-N as respective combinations of values indicated by the input dataset.

Regardless, the false-cell-free datapoints 26-1, 26-2, . . . 26-N indicating these combinations are used by the model training equipment 22 to train the model 24. The cell characteristic described by these false-cell-free datapoints 26-1, 26-2, . . . 26-N thereby serves as the feature on which the model 24 is trained. The trained model 30 that results may include one or more parameters (e.g., a measure of central tendency, model fitting parameter(s), a 2-D curve, etc.) that effectively characterize the training dataset 26. The trained model 30 may also include one or more parameters (e.g., one or more thresholds) that characterize the type and/or amount of deviation from the training dataset 26, as modelled, which would suggest a false cell is present. The model training equipment 22 may thereby train the model 24 to test for the presence of a false cell based on an extent to which a test dataset differs from the training dataset 26.

FIG. 1B in this regard shows that a test dataset 40 may be obtained as the basis on which to test for the presence of a false cell 18. Such test may be performed to provide an unbiased evaluation of the final model fit on the training dataset 26, or may be performed after real-world deployment of the final trained model 40 in order to detect the presence of a false cell in a live network. Regardless, the test dataset 40 comprises one or more test datapoints 42-1, 42-2, . . . 42-M. Each test datapoint 42-m indicates a combination of values detected for the cell characteristic, in a similar way as described above for the training dataset 26. As shown, for instance, test datapoint 42-1 indicates one combination 44-1 of values detected for the cell characteristic, test datapoint 42-2 indicates another combination 44-2 of values detected for the cell characteristic, and test datapoint 42-M indicates yet another combination 44-M of values detected for the cell characteristic. In some embodiments, the presence of a false cell 18 impacts the combination(s) 44-m of values that are indicated by the training datapoint(s) 42-m as being detected for the cell characteristic, as compared to the combinations 28-n of values that are indicated by the false-cell-free datapoints 26-n. And this impact is exploited in order to test for the presence of a false cell 18.

FIG. 1B in particular shows that detection equipment 46 obtains the test dataset 40 and uses it in conjunction with the trained model 30 to test for the presence of a false cell 18. The detection equipment 46 performs false cell presence testing 48 to test for the presence of a false cell 18 based on an extent to which the test dataset 40 differs from the training dataset 26 according to the trained model 30. Such false cell presence testing 48 may for instance yield a test result 50 for the test dataset 40 as a whole or a test result 50 for each test datapoint. A test result 50 for the test dataset 40 as a whole would indicate whether a false cell is present considering the test datapoints of the test dataset 40 collectively, whereas a test result 50 for each test datapoint would indicate whether a false cell is present considering each test datapoint individually. In this latter case, then, the test result 50 for each test datapoint may be a tag that flags the test datapoint as anomalous if a false cell is detected as present, e.g., in the form of a Boolean value with TRUE meaning anomalous and FALSE meaning normal. In some embodiments, the test result 50 indicates a hard decision as to whether or not a false cell is present, whereas in other embodiments the test result 50 indicates a soft decision, with a probabilistic anomaly score reflecting the probability of a false cell being present. In any case, by testing for the presence of a false cell 18 in this way, the detection equipment 46 is able to detect the presence of a false cell 18 even if the false cell 18 is using the same cell identity as a genuine cell 16-1, 16-2, or 16-3.

Figure 3:
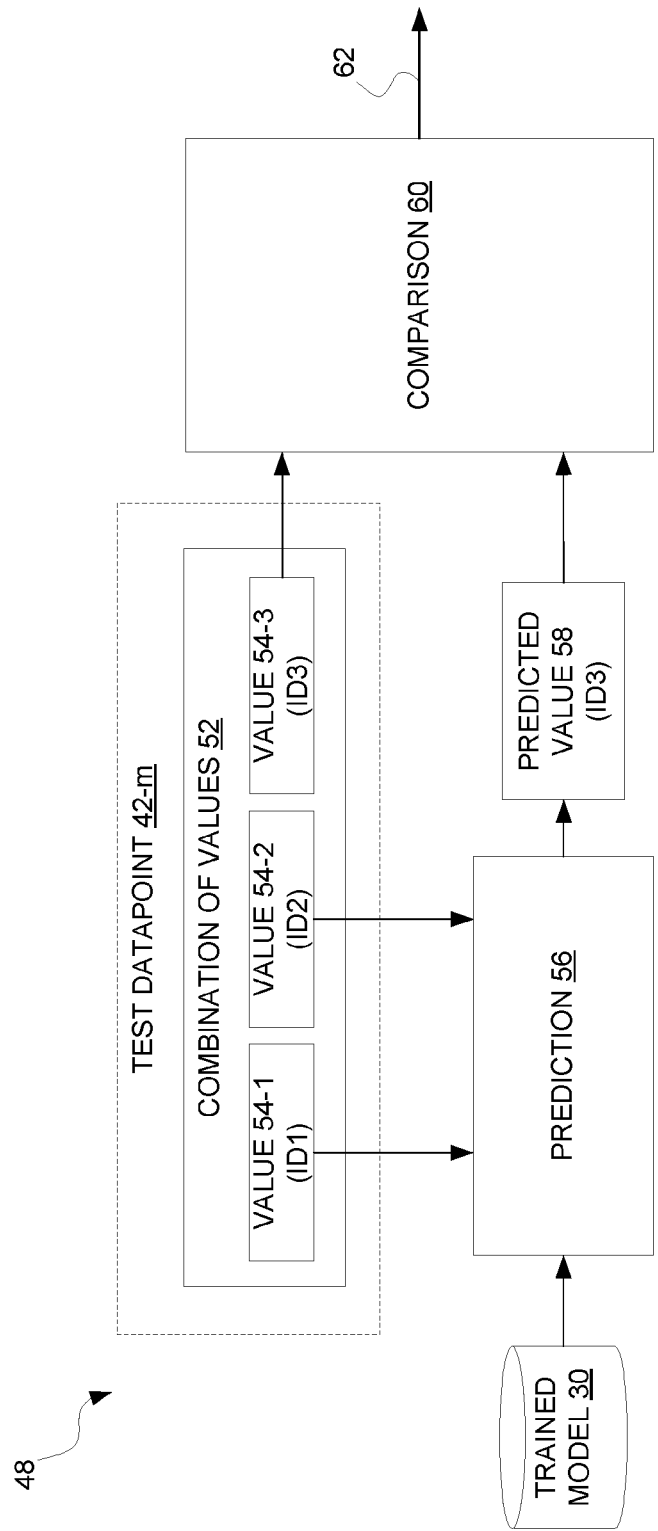
FIG. 3 is a block diagram of false presence detection by detection equipment according to some embodiments.

Consider for example some embodiments that use the trained model 30 to predict expected value(s) for the cell characteristic in the absence of a false cell, and that test for the presence of a false cell based on the extent to which value(s) observed in the test dataset 40 differ from the predicted value(s). FIG. 3 illustrates one such embodiment.

As shown in FIG. 3, a test datapoint 42-m indicates a combination of values 52 for the cell characteristic which includes values 54-1, 54-2, and 54-3 that are respectively associated with cell identities ID1, ID2, and ID3. Detection equipment 40 performs prediction 56 using the values 54-1 and 54-2 associated with ID1 and ID2, as well as the trained model 30. This prediction 56 predicts, from the combination of values 54-1 and 54-2 indicated by the test datapoint 42-m as detected for the cell characteristic in association with ID1 and ID2, a value 58 for the cell characteristic in association with ID3. The detection equipment 40 then performs comparison 60 in order to compare the predicted value 58 for ID3 with the value 54-3 observed in the test datapoint 42-2 for ID3. If the difference between the predicted value 58 and the observed value 54-3 exceeds a threshold included in the trained model 30, the false cell presence testing 48 may decide that a false cell using ID3 is present. False cell presence testing 48 may decide this even if ID3 is a valid cell identity being used by a genuine cell.

It should also be appreciated that the principle idea shown in FIG. 3 can be used in other variants too. For example, value 54-1 may be predicted using value 54-3 and without value 54-2. The predicted value could differ from the observed value assuming that value 54-3 is because of a false cell. Next, value 54-1 may be predicted using value 54-2 and without value 54-3. The predicted value could be closer to the observed value assuming that value 54-2 is because of genuine cell. The inference from this is that in the absence of value 54-3, the prediction was correct, meaning that cell identify ID3 which contributed to value 54-3 is flagged as false. The same logic can be repeated to predict and compare value 54-2 without 54-1 and 54-3. Again, the prediction will be correct without value 54-3 in this example. Now, the confidence that value 54-3 needs to be flagged increases based on observation with value 54-1 and 54-2.

Figure 4:
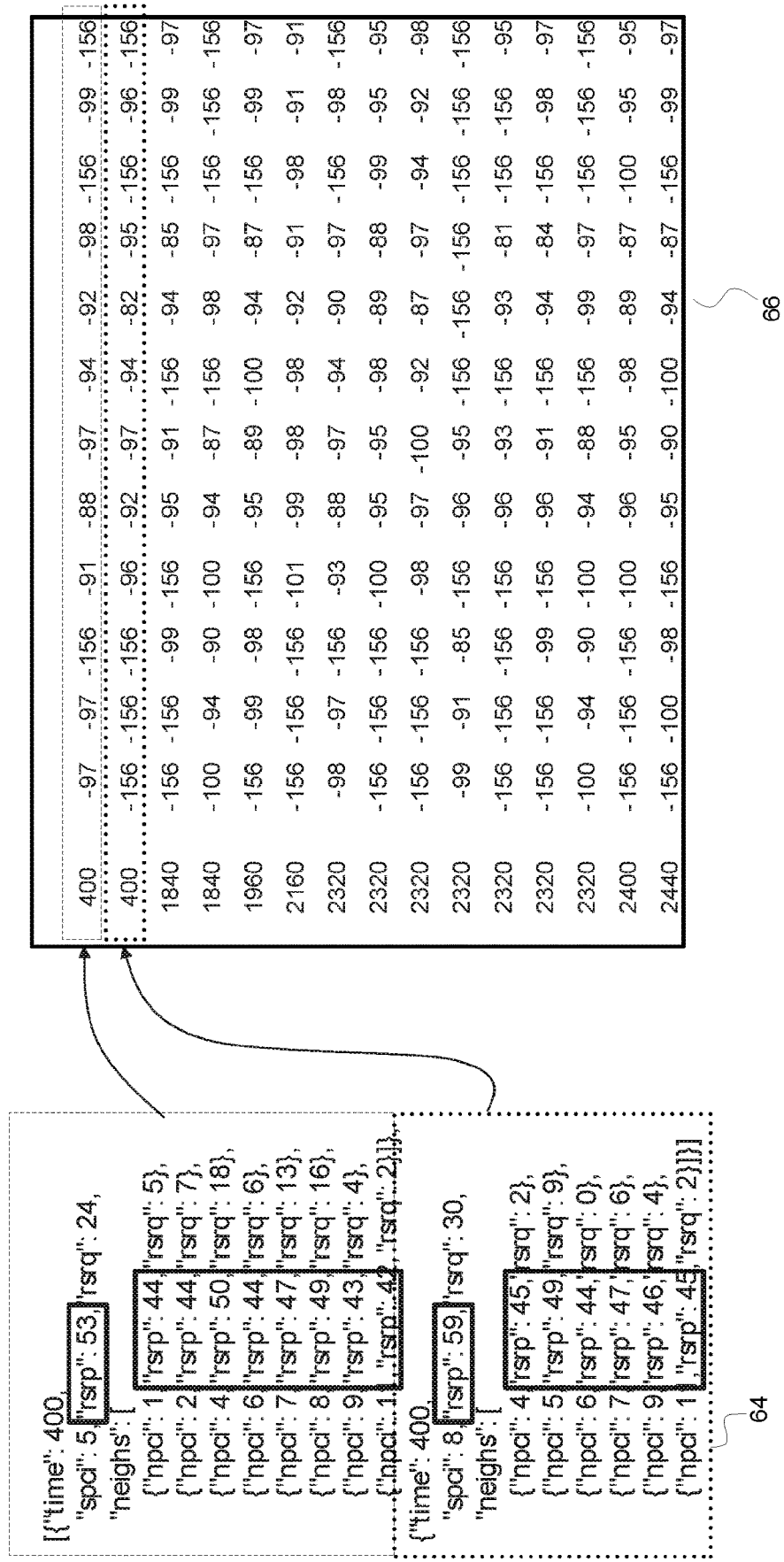
FIG. 4 is a block diagram of an example data frame, generated from measurement reports, usable to test for the presence of a false cell that is using a certain Physical Cell Identity (PCI), according to some embodiments.

FIG. 4 shows a concrete example where the detection equipment 40 uses these embodiments to test for the presence of a false cell that is using a Physical Cell Identity (PCI) of 6. As shown, measurement reports 64 are obtained for wireless devices that are served by a cell using a PCI of 1. The serving cell's PCI, Reference Signal Received Power (RSRP), and Reference Signal Received Quality (RSRQ) are denoted by "spci", "rsrp", and "rsrq", respectively in each measurement report. It should be understood that the value of "spci", "rsrp" and "rsrq" illustrated in the figure are only for example and do not necessarily represent any real world value. Each measurement report 64 also contains a list of cells detected as neighboring the serving cell, e.g., denoted by the array "neighs". Each element of "neighs" represents one neighboring cell in which the neighboring cells' PCI, RSRP and RSRQ are denoted by "npci", "rsrp" and "rsrq" respectively. In this example, the RSRPs from those measurement reports 64 are converted into a data frame 66. Separate data frames may be created for each serving cell or a single data frame may be created covering the whole network or set of serving cells. Each row of the data frame 66 corresponds to one measurement report 64. The "n1p", "n2p" to "n12p" denote the RSRP of cells with PCIs 1, 2 to 12. The RSRP in the measurement report which are in the form of range may be converted into dBm by subtracting 141, i.e., the left hand side shows RSRP in the range which is converted to dBm on the right hand side using the formula dBm=range −141. Missing values may be filled in with a value representing extremely low RSRP, e.g., −156. The first two rows on the right hand side correspond to the left hand side. Other rows on the right hand side are more examples. Effectively, then, each measurement report 64 and row of the data frame 66 indicates a combination of values that a wireless device 12 detected for RSRP, with values in the combination being associated with respective PC's.

In some embodiments, the detection equipment 40 uses the trained model 30 in conjunction with the RSRP values for the cell (PCI=1) and cells with PCIs other than 6, in order to predict the RSRP value expected for the cell with PCI=6 in the absence of a false cell. That is, the detection equipment 40 predicts, from the combination of RSRP values indicated by each row of the dataframe 66 as detected in association with PCIs other than 6, an RSRP value expected for PCI=6 in the absence of a false cell. Effectively, then, the columns of the dataframe 66 that have RSRP values for PCIs other than 6 function as input values (X) and the column of the dataframe that has RSRP values for PCI=6 function as labels or ground truths (Y) for false cell presence detection. In any event, the detection equipment 40 then compares the predicted RSRP value for PCI=6 with the RSRP values observed in each row of the dataframe 66 for PCI=6. If the difference between the predicted RSRP value and the observed RSRP value for PCI=6 exceeds a threshold included in the trained model 30, the detection equipment 40 may decide that a false cell using PCI=6 is present. In some embodiments, the detection equipment 40 makes this decision on a row by row basis, e.g., for each row individually, so as to label each row as malicious (false cell present) or normal (false cell absent). In other embodiments, the detection equipment 40 makes this decision collectively after considering multiple rows, so as to label groups of rows (or the whole dataframe 66) as malicious or normal. Either way, these embodiments detect an anomaly in the RSRP of a cell using PCI=6 from the perspective of a cell using PCI=1 and other cells.

Consider another example that detects malicious cell by running prediction on one cell at a time. As illustrated in FIG. 5, during the training phase, the RSRP of each cell is trained by taking the RSRP of all other cells but one. In FIG. 5, the RSRP of cell 2 is trained first without the RSRP of cell 1, next without the RSRP of cell 3 and so on. During the testing phase, similarly, the RSRP of each cell is tested by taking the RSRP of all other cells but one. The predicted value will be close to the observed value only when the RSRP of cell 6 was not taken into account. In all other cases, when the RSRP of cell 6 was taken into account, the prediction would be wrong because the RSRP of cell 6 (which is assumed to be false) disturbs the trained model. It means that cell 6 is flagged as malicious. Similarly, when the RSRP of cell 6 is being predicted without each of the other cells, the prediction will be wrong in all the cases because the observed RSRP of cell 6 is not what it should have been. This also means that cell 6 is flagged as malicious.

Figure 6:
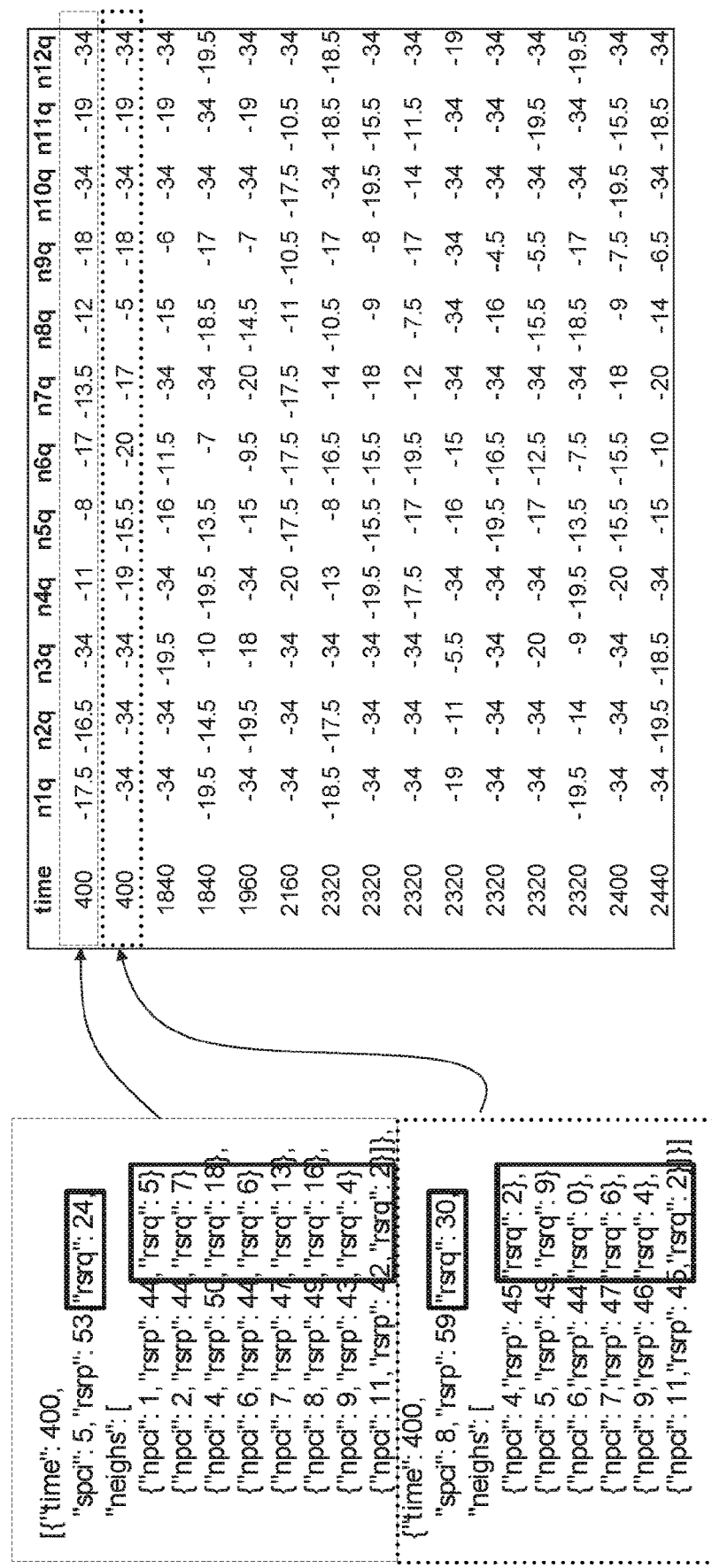
FIG. 6 is a block diagram of an example data frame, generated from measurement reports, usable to test for the presence of a false cell that is using a certain Physical Cell Identity (PCI), according to other embodiments.
Figure 7:
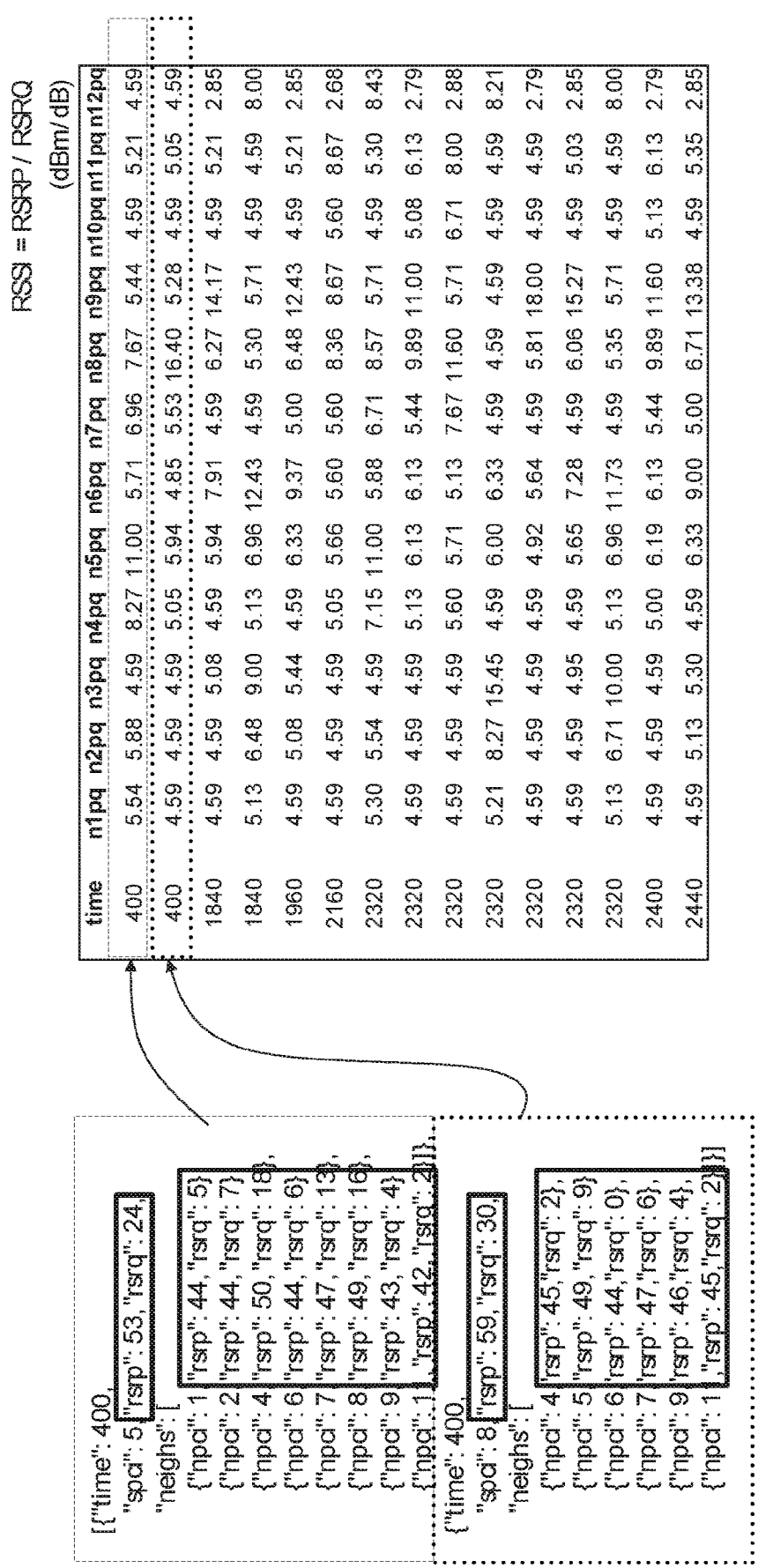
FIG. 7 is a block diagram of an example data frame, generated from measurement reports, usable to test for the presence of a false cell that is using a certain Physical Cell Identity (PCI), according to still other embodiments.

Although these examples were illustrated for RSRP, other embodiments herein may use RSRQ or RSSI in a similar way. FIGS. 6 and 7 in this regard illustrate this for RSRQ and RSSI respectively. In FIG. 6, the left hand side shows RSRW in range which is converted to dB on the right hand side using the formula dB=(range −40)×0.5. Non-existent values are filled with −34. The first two rows on the right hand side correspond to the left hand side. Other rows on the right hand side are more examples.

Moreover, yet other embodiments herein could employ a combination of RSRQ, RSRQ, and RSSI, e.g., where a separate label or ground truth (Y) can be built for this purpose. Note that, when RSRPs (or RSRQs) of a particular neighboring cell are used as y values, then a detected anomaly may directly point out the anomalous cell identity. However, if RSRPs (or RSRQs or RSSIs) of a serving cell are used as y values, then a detected anomaly may only indicates that there is something anomalous around that serving cell without pointing out the anomalous cell identity. Additional steps might be needed to determine the anomalous cell identity, e.g., going through each neighboring cell's pattern of RSRP/RSRQ.

Note, too, that the quantification of difference between predicted y and observed y in some embodiments is based on one or more statistical measures, e.g., residual error, mean squared error (MSE), mean absolute error (MAE), mean squared log error, median absolute error, mean Poisson deviance, coefficient of determination (R2 score), mean absolute percentage error (MAPE) etc.

The above embodiments for RSRP and RSRQ and RSSI exemplified cell characteristics that may be appropriately modelled through regression. The trained model 30 in such a case may be any type of regressor model, including for instance Linear regression, Clustered Linear regression, Clustered regression, AdaBoost, Random Forest regression, Neural Networks, Support Vector Regression, Decision Trees etc. Indeed, any of these types of regressor models may be used to determine if predicted y (RSRP/RSRQ/RSSI) differs significantly with observed y (RSRP/RSRQ/RSSI). No matter the particular type, though, such a model may be used to predict a value with input from the test dataset. If the predicted value differs significantly from the value in test dataset, then an anomaly may be flagged.

Other embodiments may exploit a rule-based model. In such a case, the trained model 30 may comprise rules (e.g., thresholds) against which to check the test dataset. A rule may for instance specify that the RSRP value for a certain PCI should always be less than X, or the RSRQ value for a neighboring cell with a certain PCI should always be less than the RSRQ value for the serving cell's PCI. If these checks are not met, then the detection equipment 40 would flag an anomaly.

Figure 8:
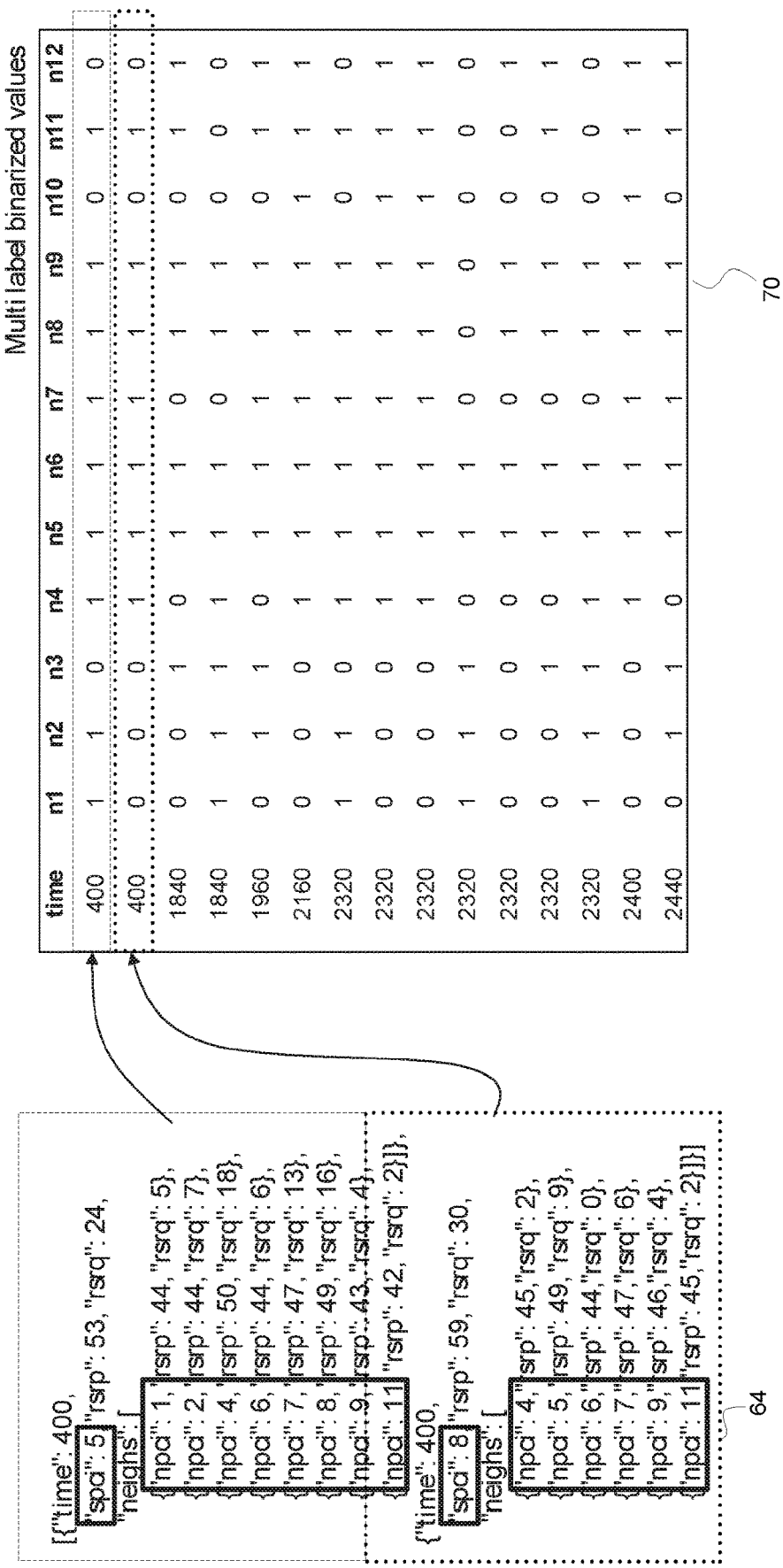
FIG. 8 is a block diagram of an example data frame, generated from measurement reports, usable to test for the presence of a false cell using a cell characteristic in the form of detected cell presence, according to some embodiments.

Other cell characteristics may be more appropriately modeled through classification. In such a case, the trained model 30 may be a single-class or multi-class classification model. The model in such a case may be used to predict a class value from the test dataset. If the predicted class value differs from the class value in the test dataset, then an anomaly may be flagged. FIG. 8 shows one such example for a cell characteristic in the form of detected cell presence.

As shown in FIG. 8, the measurement reports 64 report which cell identities are detected in combination with one another. The PCIs from these measurement reports 64 are converted into a data frame 70. Each row of the dataframe 70 corresponds to one measurement report 64. The "n1", n2", to "n12" denotes the presence or absence of cell PCIs 1, 2, to 12. This can, for example, be produced by using a MultiLabelBinarizer in Python scikit-learn library, where 0 means absent and 1 means present. Effectively, then, each measurement report 64 and row of the data frame 70 indicates a combination of values that a wireless device 12 detected for a cell presence or absence label, with values in the combination being associated with respective PC's.

In the example of FIG. 8, the detection equipment 40 may use the trained model 30 in conjunction with the cell presence or absence label values for the cell (PCI=1) and cells with PCIs other than 6, in order to predict the cell presence of absence label value expected for the cell with PCI=6 in the absence of a false cell. That is, the detection equipment 40 predicts, from the combination of cell presence or absence label values indicated by each row of the dataframe 70 as detected in association with PCIs other than 6, a cell presence or absence label value expected for PCI=6 in the absence of a false cell. Effectively, then, the columns of the dataframe 70 that have cell presence or absence label values for PCIs other than 6 function as input values (X) and the column of the dataframe that has cell presence or absence label values for PCI=6 function as labels or ground truths (Y) for false cell presence detection. In some embodiments, though, the column for the serving cell may be ignored. In any event, the detection equipment 40 then compares the predicted cell presence or absence label value for PCI=6 with the cell presence or absence label values observed in each row of the dataframe 70 for PCI=6. If the predicted label value and the observed label value for PCI=6 differ, the detection equipment 40 may decide that a false cell using PCI=6 is present. In some embodiments, the detection equipment 40 makes this decision on a row by row basis, e.g., for each row individually, so as to label each row as malicious (false cell present) or normal (false cell absent). In other embodiments, the detection equipment 40 makes this decision collectively after considering multiple rows, so as to label groups of rows (or the whole dataframe 70) as malicious or normal. Either way, these embodiments detect an anomaly in the presence or absence of a cell using PCI=6 from the perspective of a cell using PCI=1 and other cells.

As described for RSRP earlier when malicious cell was detected by running prediction on one cell at a time, the same technique can be used here for PCI. In other words, presence/absence of each cell can be trained by taking presence/absence of all other cells but one. During testing phase, similarly, presence/absence of each cell can be tested by taking presence/absence of all other cells but one. The predicted value will match observed value only when presence/absence of malicious cell would not be taken into account. In all other cases, when presence/absence of malicious cell was taken into account, the prediction would be wrong because presence/absence of malicious disturbs the trained model. Similarly, when presence/absence of malicious cell is being predicted without each of other cells, the prediction will be wrong in all the cases because the observed presence/absence of malicious cell is not what it should have been.

Note that when identifiers of a particular neighboring cell are used as labels, then a detected anomaly may directly point out to the anomalous cell. However, if identifiers of a serving cell are used as labels, then a detected anomaly may only tells that there is something anomalous around that serving cell without pointing out the anomalous cell identity. Additional steps might be needed to determine the anomalous cell identity, e.g., going through each neighboring cell's pattern of identifiers.

As an example, classification models like k-Nearest Neighbors, SVM-based classification, Decision Tree for classification, Random Forest classification, Neural Network, AdaBoost, Naive Bayes, Linear Discriminant Analysis etc. can be used as the trained model 30, in order to predict a class label (presence/absence of cell). If the result is different than expected, it can be used as an anomaly detector.

The performance of classifier, based on ratio of number of correctly predicted examples vs. total number of examples can be based on related statistical measures like sensitivity, specificity, precision, number of false positives and false negatives, F1 score and receiver operating characteristic area under the curve (ROC AUC) etc.

Additionally or alternatively to comparing predicted value(s) to observed value(s) for testing false cell presence, other embodiments herein test for false cell presence using distribution-level analysis. One or more such embodiments, for instance, compare the extent to which a distribution of values observed in the test dataset 40 for a certain cell identity differs from a "false-cell-free" distribution of values in the training dataset 26 that reflects what the distribution of values is expected to look like for the certain cell identity in the absence of a false cell. The difference between distributions may be quantified, for example, using information theoretic measures such as mutual information or Kullback-Leibler (KL) divergence, statistical measures such as measures of central tendency and/or standard deviation, or any other measure that quantify how distributions differ from one another in one or more aspects. Regardless, if the distribution of values observed in the test dataset 40 differs from the false-cell-free distribution to at least a certain extent, the detection equipment 40 may detect that a false cell using the certain cell identity is present.

Figure 9:
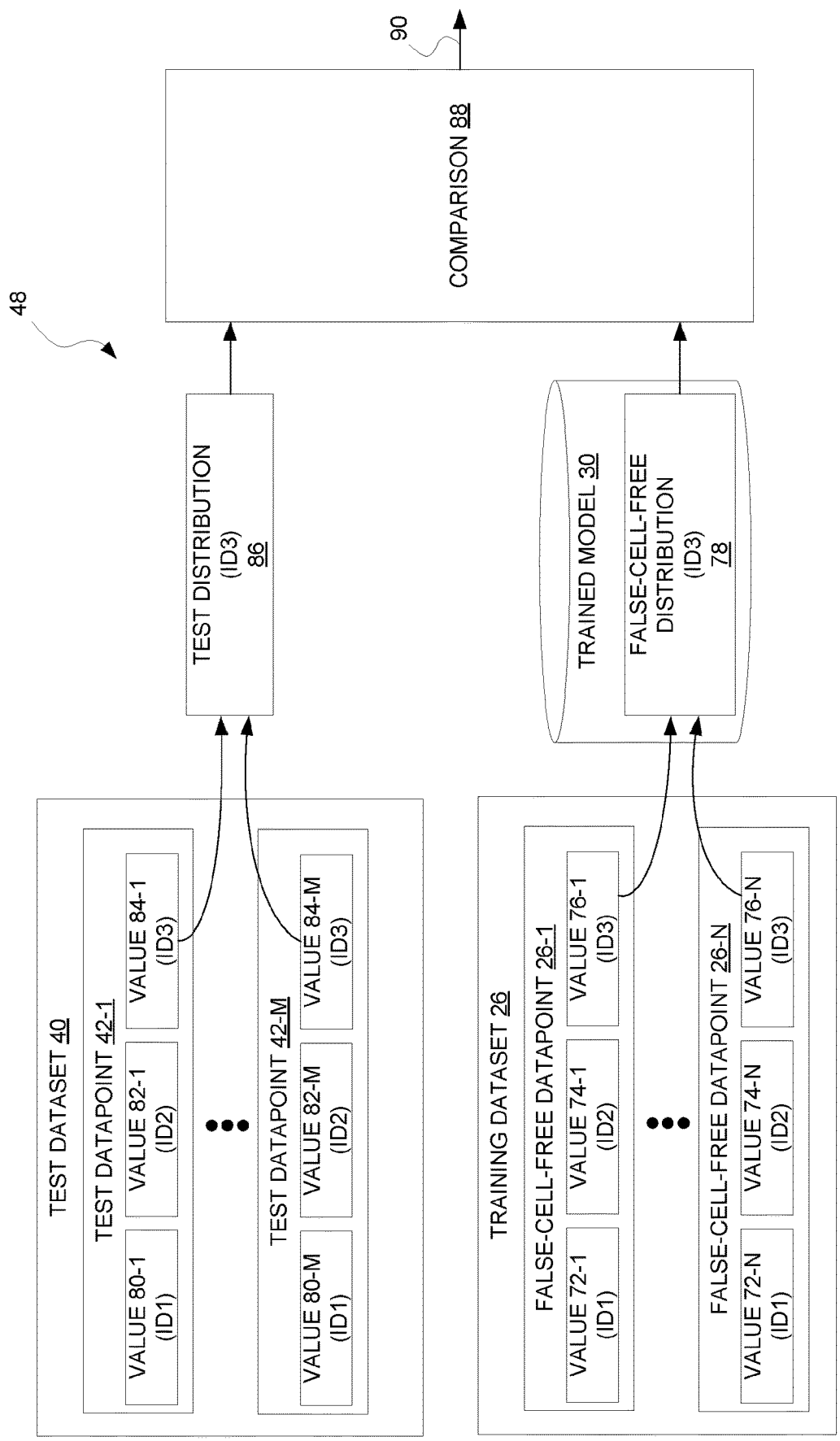
FIG. 9 is a block diagram of false presence detection by detection equipment according to some embodiments that employ distribution-level analysis.

FIG. 9 shows one example of embodiments that employ distribution-level analysis. As shown in this example, the training dataset 26 includes false-cell-free datapoints 26-1 . . . 26-N which each indicate combinations of values detected for a cell characteristic (e.g., characteristic like RSRP, RSRQ, RSSI etc.) in association with respective cell identities ID1, ID2, and ID3 in the assumed absence of a false cell. False-cell-free datapoint 26-1 for instance indicates one combination of values 72-1, 74-1, and 76-1 detected for the cell characteristic in association with respective cell identities ID1, ID2, and ID3, whereas false-cell-free datapoint 26-N indicates another combination of values 72-N, 74-N, and 76-N detected for the cell characteristic in association with respective cell identities ID1, ID2, and ID3. In some embodiments, the combination of values indicated by each false-cell-free datapoint is a combination of values detected by a wireless device served by a cell using one of those cell identities in the assumed absence of a false cell, e.g., ID1 may identify the cell serving the wireless device that detected each combination of values and ID2-ID3 may identify neighboring cells that neighbor that serving cell. Regardless, across the false-cell-free datapoints 26-1 . . . 26-N, the values 72-1 . . . 72-N are the values detected in association with cell identity ID1, the values 74-1 . . . 74-N are the values detected in association with cell identity ID2, and the values 76-1 . . . 76-N are the values detected in association with cell identity ID3. FIG. 9 depicts the trained model 30 as including a false-cell-free distribution (ID3) 86 that represents the distribution of the values 76-1 . . . 76-N detected in association with cell identity ID3. The false-cell-free distribution 78 (also generally referred to as false-cell-free representation) may represent this as a statistical distribution of values 76-1 . . . 76-N in terms of a 2-dimensional curve, statistical measures such a measure of central tendency and/or standard deviation, or in any other way.

Although not shown, the trained model may include false-cell-free distributions for one or more others of the cell identities.

FIG. 9 similarly shows the test dataset 40 as including test datapoints 42-1 . . . 42-M which each indicate combinations of values detected for the cell characteristic in association with respective cell identities ID1, ID2, and ID3. Test datapoint 42-1 for instance indicates one combination of values 80-1, 82-1, and 84-1 detected for the cell characteristic in association with respective cell identities ID1, ID2, and ID3, whereas test datapoint 42-M indicates another combination of values 80-M, 82-M, and 74-M detected for the cell characteristic in association with respective cell identities ID1, ID2, and ID3. Across the test datapoints 42-1 . . . 42-M, then, the values 80-1 . . . 80-M are the values detected in association with cell identity ID1, the values 82-1 . . . 82-M are the values detected in association with cell identity ID2, and the values 84-1 . . . 84-M are the values detected in association with cell identity ID3.

To test for the presence of a false cell using the cell identity ID3, false cell presence testing 48 as shown may involve forming a test distribution (ID3) 86 from the values 84-1 . . . 84-M detected in association with cell identity ID3 across the test datapoints 42-1 . . . 42-M. False cell presence testing 48 then performs comparison 88 to compare the test distribution (ID3) 86 to the false-cell-free distribution (ID3) 78 represented in the trained model 30. This comparison 88 produces a test result 90 indicating whether a false cell using cell identity ID3 is present. If the test distribution (ID3) 86 differs from the false-cell-free distribution (ID3) 78 by at least a certain extent (e.g., as indicated by one or more thresholds in the trained model 30), the test result 90 may indicate that a false cell using cell identity ID3 is present. Otherwise, the test result 90 may indicate that a false cell using cell identity ID3 is not present.

In some embodiments, the test distribution (ID3) 86 for the cell identity ID3 is formed from all values 84-1 . . . 84-M associated with that cell identity ID3 in the test dataset 40, so as to represent the distribution across the full test dataset 40. And the false-cell-free distribution (ID3) 78 for the cell identity ID3 is formed from all values 76-1 . . . 76-N associated with that cell identity ID3 in the training dataset 26, so as to represent the distribution across the full training dataset 26.

Alternatively or additionally, in some embodiments, the test distribution 86 and the false-cell free distribution 78 are each formed as a standalone distribution, without regard to other cell identities and/or without regard to values associated with other cell identities. In other embodiments, by contrast, the test distribution 86 and the false-cell-free distribution 78 for ID3 are each formed from the perspective of another cell identity (e.g., ID1), referred to as a reference cell identity. The reference cell identity may for instance be the serving cell identity that identified the cell serving the wireless device when the value for ID3 was detected.

In still other embodiments, the test distribution 86 and the false-cell-free distribution 78 for ID3 are each formed from the perspective of a certain value detected for the cell characteristic for the reference cell identity, where this certain value is referred to as a reference value. In this case, rather than there being a single test distribution (ID3) 86 and a single false-cell-free distribution (ID3) 78 for the cell identity ID3 (as formed across all of the test datapoints and false-cell-free datapoints) as shown in FIG. 9, multiple test distributions and multiple false-cell-free distributions may be formed for the cell identity ID3, one for each unique reference value associated with the reference cell identity. If, for example, cell identity ID1 is the reference cell identity, the values 72-1 . . . 72-N associated with ID1 across the false-cell-free datapoints 26-1 . . . 26-N will likely differ. In this case, multiple different false-cell-free distributions may be formed for the cell identity ID3, one for each of the values 72-1 . . . 72-N for ID1 that are unique. Each false-cell-free distribution for ID3, then, comprises a distribution of values detected for the cell characteristic in the training dataset 26, with each of those values being detected in combination with a unique reference value detected for the cell characteristic in association with ID1. Each false-cell-free distribution for ID3 thereby effectively represents the distribution of values detected for the cell characteristic for ID3, from the perspective of a certain unique reference value for ID1.

Consider now various examples of the embodiments above in the context of cell characteristics such as RSRP, RSRQ, RSSI, and/or PCI values of serving and neighboring cells.

Figure 10A:
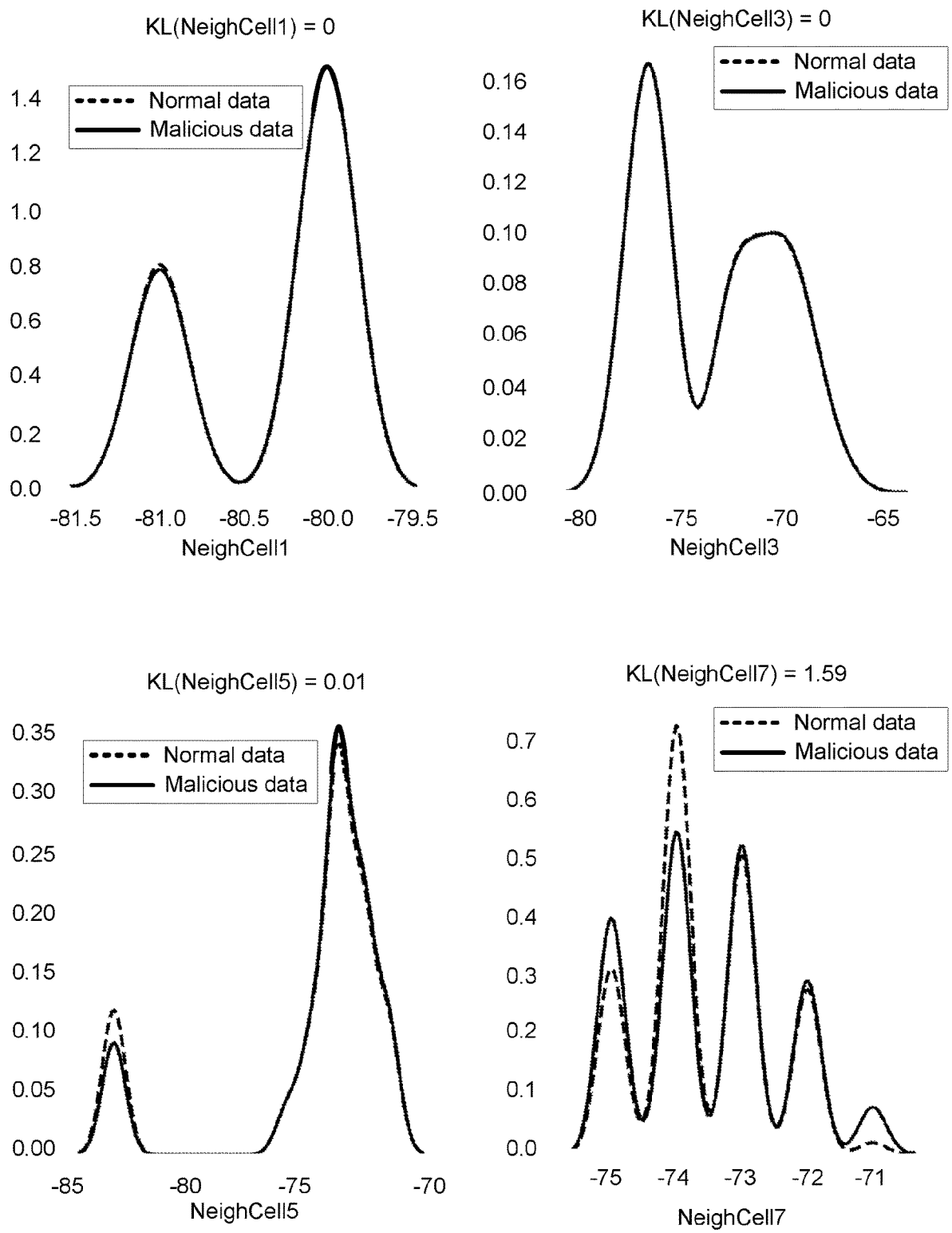
FIG. 10A includes graphs of RSRP values for normal data and malicious data in various cells, as used for false cell presence detection according to some embodiments.
Figure 10B:
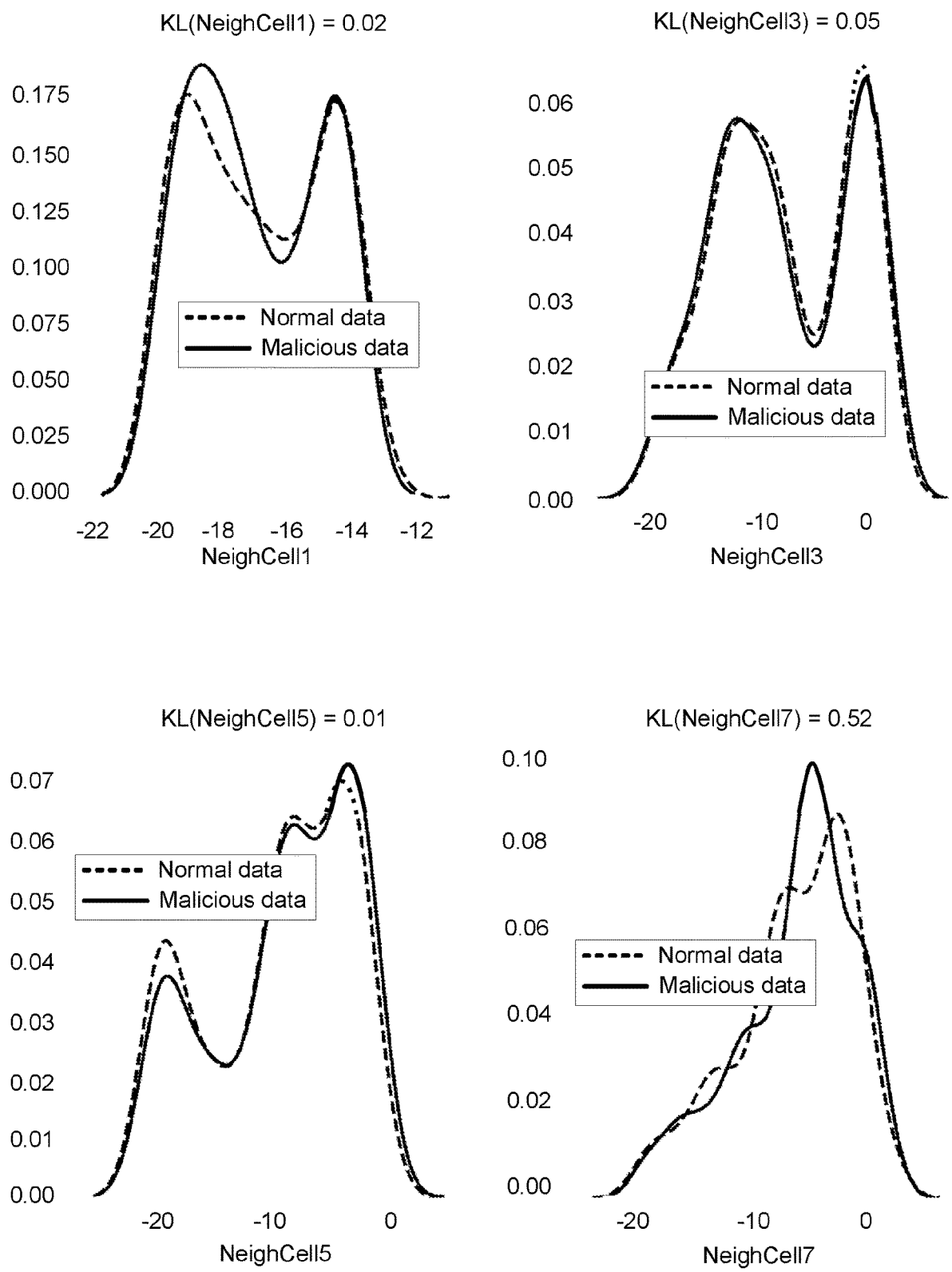
FIG. 10B includes graphs of the distribution of RSRQ values for normal data and malicious data in various cells, as used for false cell presence detection according to some embodiments.

FIG. 10A shows one example where the cell characteristic is RSRP and FIG. 10B shows another example where the cell characteristic is RSRQ. The distribution labeled "normal data" represents the false-cell-free distribution for a cell identity, and the distribution labeled "malicious data" represents the test distribution. In both examples, KL-divergence is used to quantify the difference between the test distribution and the false-cell-free distribution. Compared to legitimate cells 1, 3 and 5, the false cell (Cell 7) has higher KL-divergence value both for RSRP, which is 1.59 is this particular example and RSRQ, which is 0.52 in this particular example.

The underlying assumption here is that a cell in normal conditions (i.e., in the absence of a false cell) operates with similar power values. In other words, RSRP/RSRQ/RSSI data from measurement reports for the same cell on two different occasions will be very similar apart from some statistical noise. On the other hand, if a false cell has overtaken a legitimate cell (by operating with higher power values), even if statistical noise is removed, the two distributions will differ more than expected. One can use metrics used to compare two statistical distributions such as KL-divergence to quantify such a difference between false-cell-free distribution and testing distribution of RSRP/RSRQ/RSSI and detect a false cell if the difference is above a given threshold.

The threshold can be set either manually or adaptively based on power value comparison between all cells in the network. The threshold may be set adaptively, for example, based on KL-divergence values, e.g., since legitimate and false cells will make separate clusters. This is due to the fact that KL-divergence values of legitimate cells will be close to zero while those for false cells will be much higher than zero.

Figure 11:
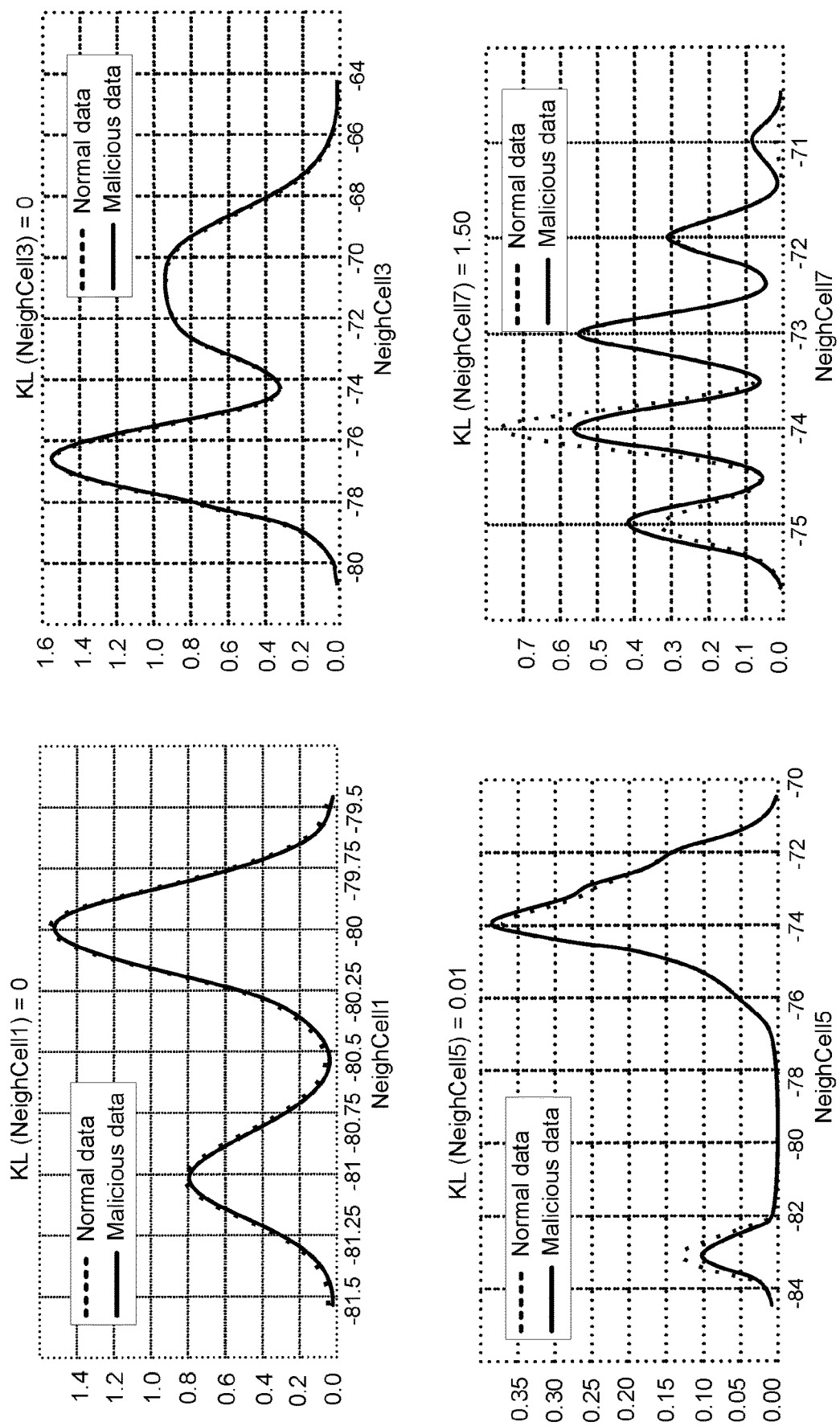
FIG. 11 includes graphs of the cell-level distribution of neighboring cells for training data and for testing data according to some embodiments.

Consider a concrete example shown in FIG. 11. FIG. 11 shows the cell-level distribution of neighboring cells for training data (i.e., labeled normal data) and for testing data (i.e., labeled malicious data) for a given network with 4 neighboring cells. Based on KL-divergence computation, the false cell (in this case Cell 7) has a score of 1.59 compared to the much lower scores of other (legitimate) cells. Note that KL-divergence value is not normalized and should be taken relatively in comparison with peer values. In this case, false cell KL-divergence value is much higher than the score for other cells.

Figure 12A:
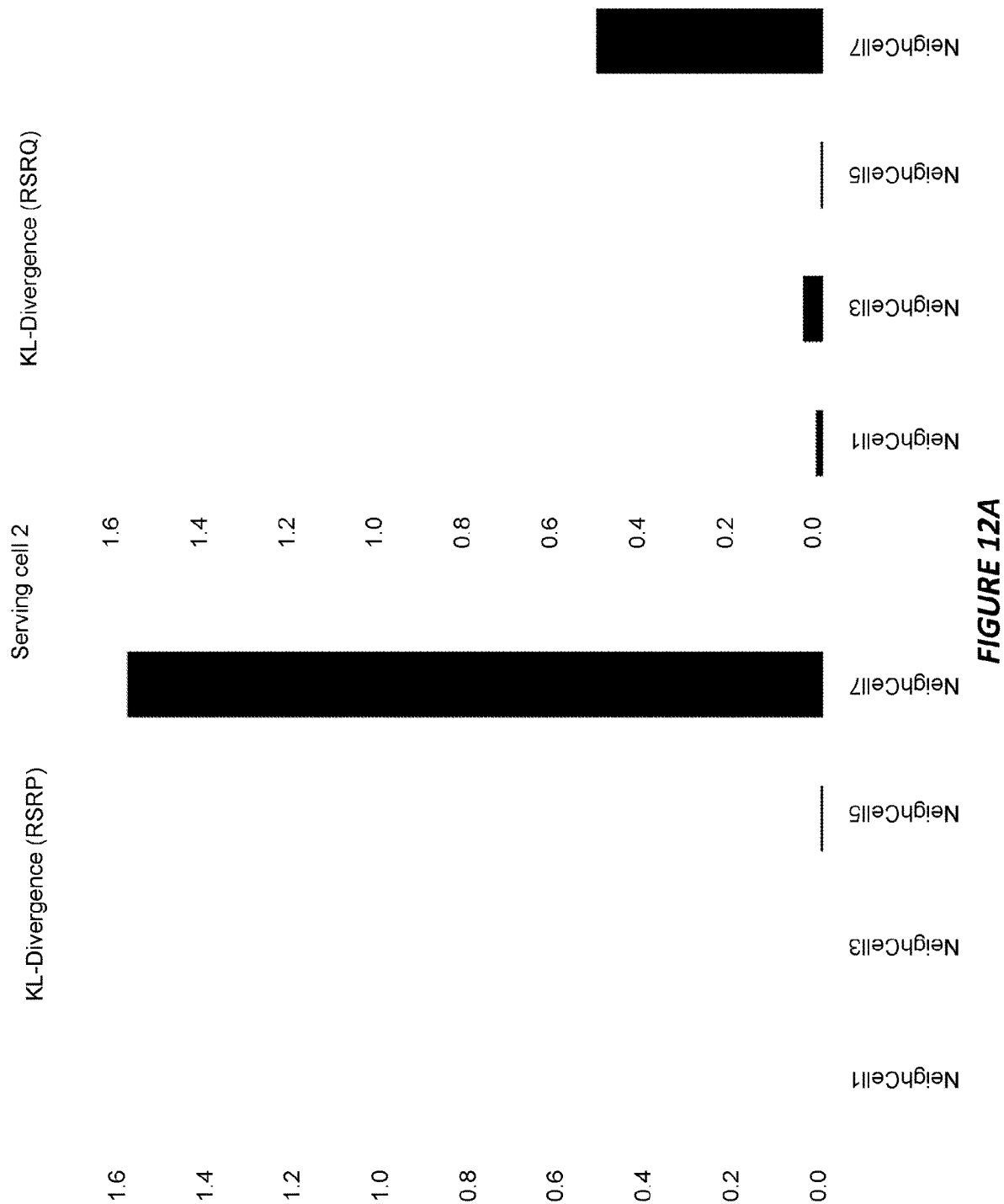
FIG. 12A includes bar plots based on KL-divergence values calculated using RSRP and RSRQ for all neighboring cells according to some embodiments.

FIG. 12A shows the bar plot based on KL-divergence values calculated using RSRP (left subfigure) and RSRQ (right subfigure) for all neighboring cells. Observe that the false cell (Cell 7) has much higher value than the rest of (legitimate) cells.

As suggested above, some embodiments perform adaptive thresholding, e.g., using a combination of clustering and support vector machine (SVM). In particular, some embodiments make a table consisting of 2 columns, where, for all cells, the first column contains their KL-divergence values based on RSRP and the second column contains KL-divergence values based on RSRQ. Some embodiments then cluster this data to obtain 2 clusters using a clustering algorithm such as K-Means. Then some embodiments compare the intra-cluster and inter-cluster distance of these clusters to infer whether a false cell is present or not. In other words, if there is significant difference between the two distances, some embodiments assume clusters are well separated and one cluster contains all the legitimate cells while other contains all the false cells. If the distance is not significant, some embodiments infer that there is no false cell.

Given that the distance is significant, i.e., a false cell is present, some embodiments label the clusters using cluster IDs and use Support Vector Machine (SVM) to estimate maximum margin hyperplane. This line, by definition of SVM, is the optimum thresholding line separating legitimate and false cells.

Figure 12B:
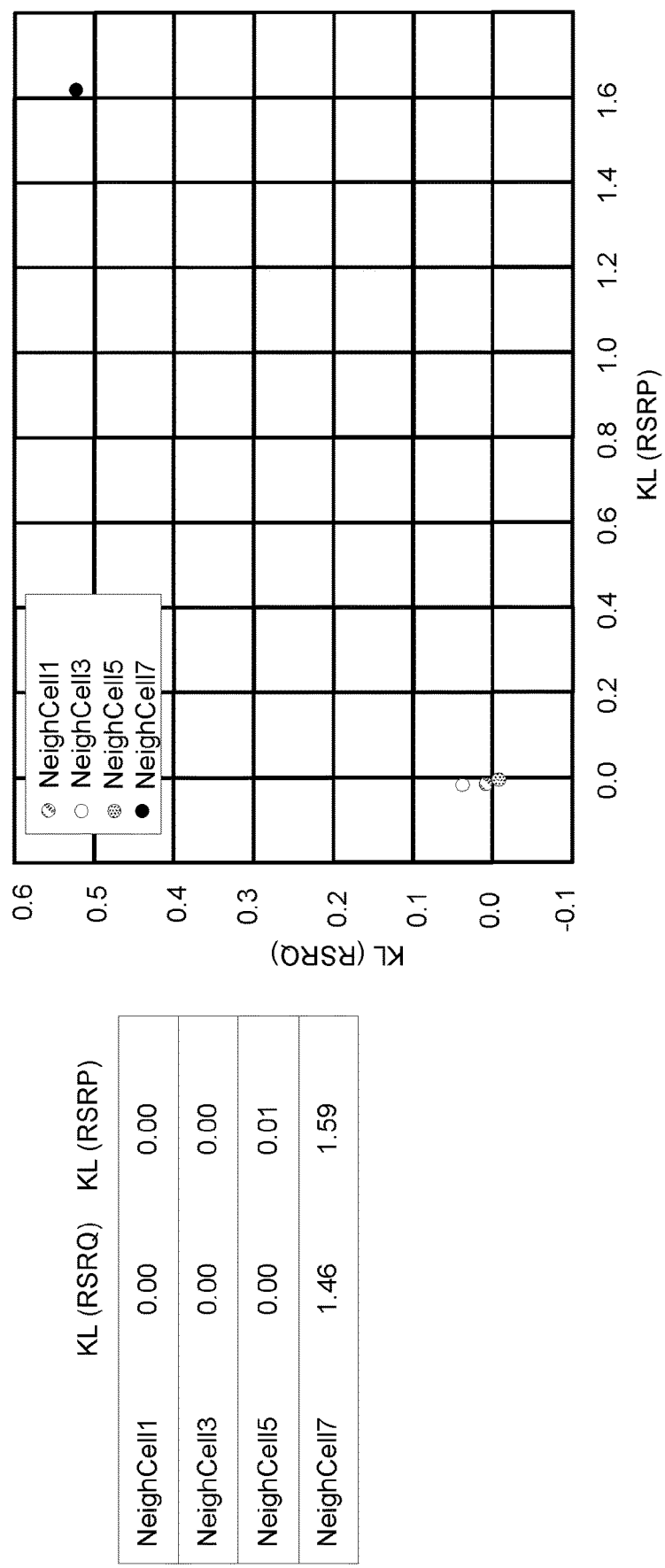
FIG. 12B includes a table and a 2D plot of KL-divergence values computed from RSRP and RSRQ according to some embodiments.

Consider a concrete example of these embodiments. The left subfigure in FIG. 12B shows a table with KL divergence values computed using RSRP and RSRQ values for all neighboring cells, while the right subfigure shows the corresponding 2D plot. Note that the false cell is located significantly farther from the legitimate cells.

Figure 12C:
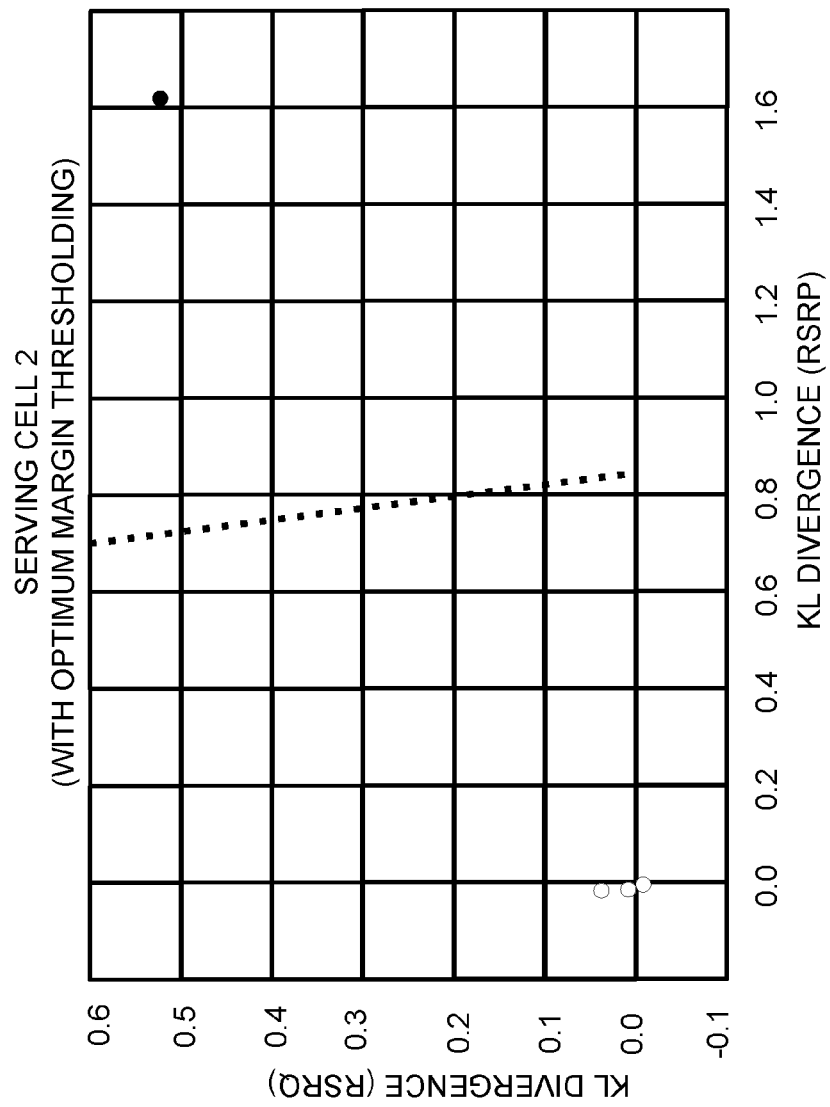
FIG. 12C is a plot showing the optimum margin hyperplane between the legitimate and false base stations Support Vector Machine (SVM) classifier according to some embodiments.

K-Mean clustering followed by ratio of inter-vs intercluster distance confirms two clusters (black and white) as shown in FIG. 12C. Using cluster IDs as label, one can use SVM with an appropriate kernel, in this case a linear kernel, to estimate the maximum margin hyperplane as shown in the dotted line in the same subfigure. FIG. 12C thereby shows the optimum margin hyperplane between the legitimate and false base stations SVM classifier.

Figure 13A:
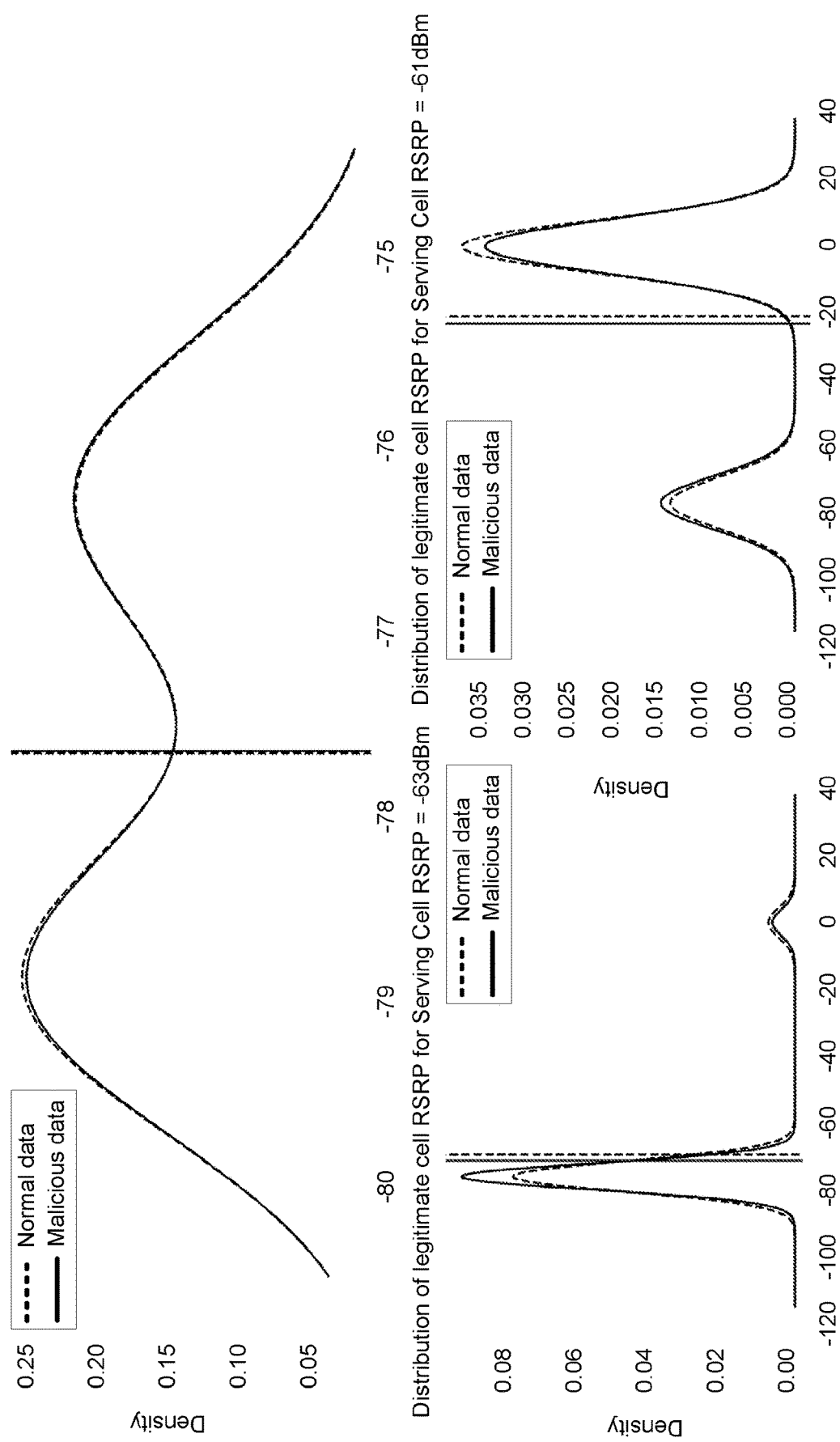
FIG. 13A includes plots showing the cell-level distribution of RSRP and the distributions of legitimate cell RSRP for various values of serving cell RSRP according to some embodiments.
Figure 13B:
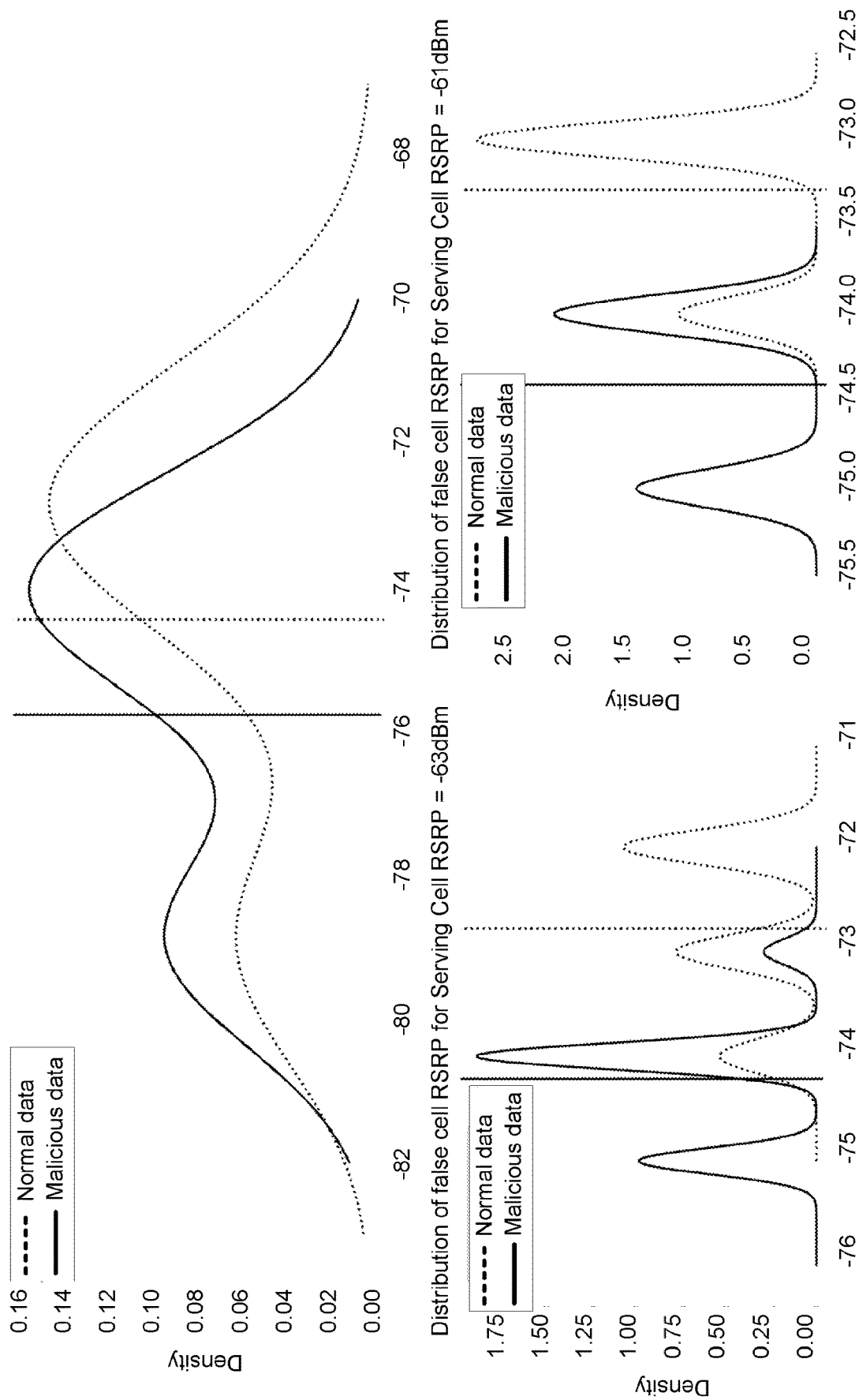
FIG. 13B includes plots showing the cell-level distribution of RSRP and the distributions of legitimate cell RSRP for various values of serving cell RSRP according to other embodiments.

FIGS. 13A and 13B illustrate another example with respect to RSRP and RSRQ. For each unique value of RSRP/RSRQ in the serving cell, the distribution of reported RSRP/RSRQ of each neighboring cell is estimated. This provides more accurate results as well as increased network visibility because, for each legitimate cell, specific power values can be observed which are relatively more prone to anomalies. This is shown in FIGS. 13A and 13B where, for both the left and right plots, the upper rows show the cell-level distribution of RSRP (from the perspective of serving cell) while the lower row shows distribution of RSRP values for two RSRP value of serving cell (in this case −63 dBm and −61 dBm). From the right plot in FIG. 13B, observe higher signal power of false cell for serving cell RSRP of −61 dBm compared to −63 dBm.

Note that in FIGS. 13A and 13B, two distributions are compared using their mean values. Apart from such point estimate comparison, one can use distribution properties to look for anomalies. One way is to compare KL-divergence and compare such comparison with other cells for difference that is unexpected.

For example, at training time, some embodiments create a reference mapping table $T_{ref}$ where $T_{ref}(i,j)$ contains the mean RSRP value of $j^{th}$ cell for serving cell RSRP value i. At test time, a test table $T_{test}$ is obtained, where $T_{test}(i,j)$ contains the RSRP value of $j^{th}$ cell for serving cell RSRP value i (note here it is a single RSRP value extracted from one test datapoint and not the mean as in the reference table). By subtracting each $T_{test}$ from $T_{ref}$ and computing the mean for each neighboring cell, the difference vector V is obtained, where V(i) is the RSRP difference observed for neighboring cell i.

Given a batch size b, the serving cell collects b measurement reports, computes V for each and computes mean vector $\overline{V}$. Then for the given threshold $\delta$, a false cell is inferred as follows.

$$\text{Status}(\text{Cell}_i) = \begin{cases} \overline{V}(i) < \delta; & \text{Cell is legitimate} \\ \overline{V}(i) \geq \delta; & \text{Cell is false} \end{cases}$$

Consider a concrete example. FIG. 14 shows $T_{ref}$ containing the mean RSRP values of all neighboring cells for each unique RSRP of serving cell (Cell 2). For instance, for a serving cell RSRP of −67 dBm, neighboring cells 3 and 4 have mean RSRP of −76 and −74.264487 dBm respectively.

Figure 16A:
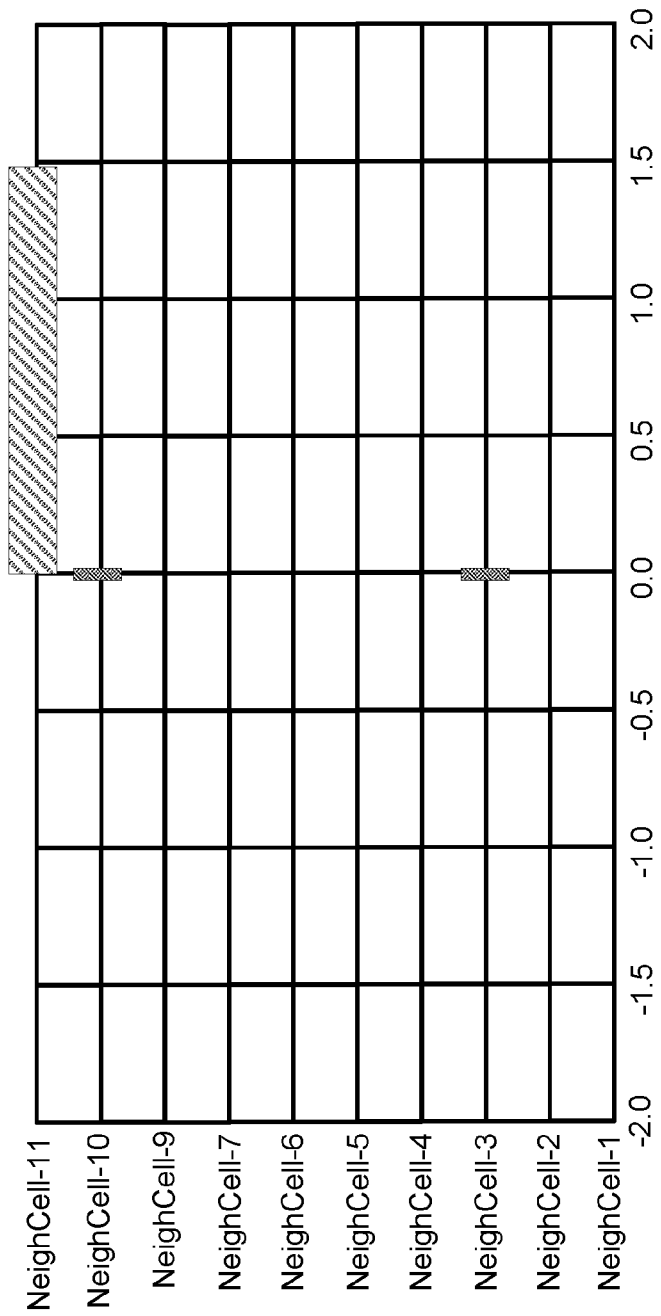
FIGS. 16A and 16B are plots showing detection of a false cell after first and second batches, respectively, according to some embodiments.
Figure 16B:
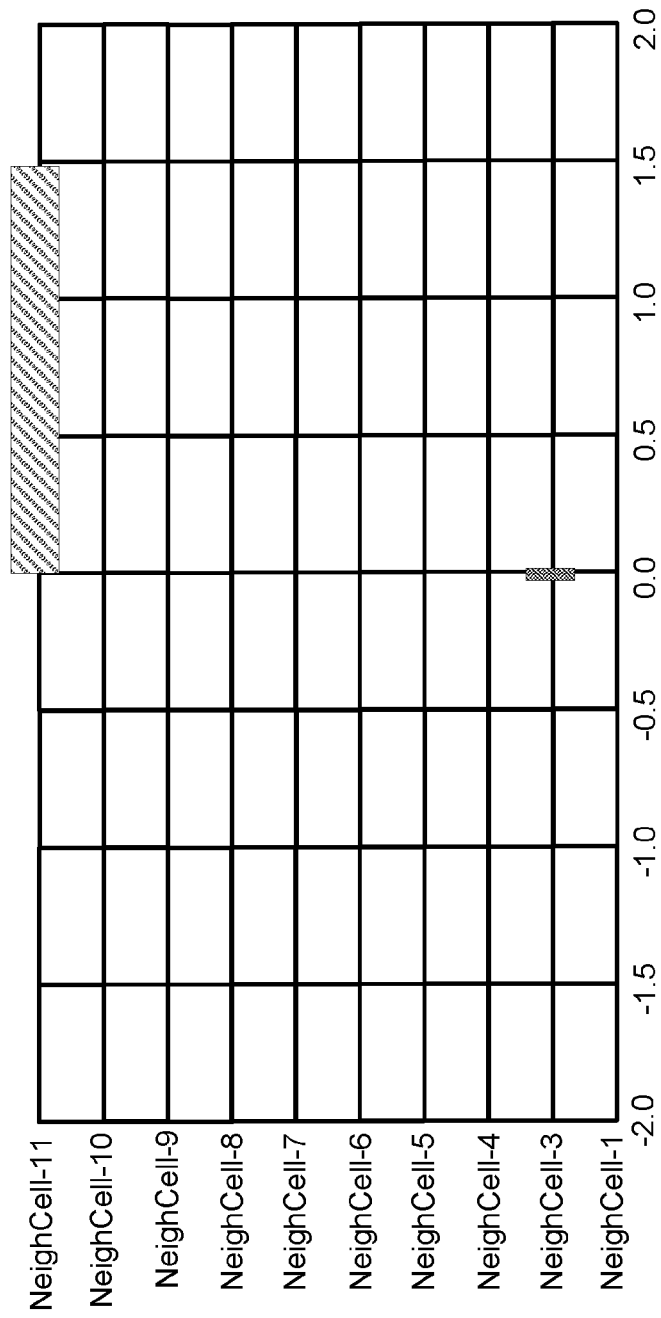

FIG. 15 shows an example containing a difference vector V of RSRP values, one for each of the first 5 measurement reports where a batch size b=100 and threshold $\delta$=0.5 are used. After collecting 100 measurement reports, some embodiments compute $\overline{V}$ and classify cell 11 as false in this example. FIGS. 16A and 16B show the results for the first 2 batches where cell 11 has been marked since its difference is approximately 1.5 in both batches.

The current example uses RSRP for detection of false cells. However, one can also use RSRQ in a similar way for false cell detection purposes.

Consider now other embodiments herein that compare the test distribution and false-cell-free distribution for a cell identity in terms of an area between 2-dimensional (2D) curves (ABC). Just like $T_{ref}$ was created from the serving cell perspective above, a summary table can be created from each cell (whether serving or neighboring) perspective. In general, for n cells in the network, some embodiments create n such summary tables. Denote $T_{N(i)}$ and $T_{T(i)}$ as such summary table from Cell i perspective in false-cell-free and testing datasets respectively. Some embodiments use the data for Cell i and each Cell j (j≠i) in $T_{N(i)}$ and $T_{T(i)}$ to draw 2D curves $C_N(i,j)$ and $C_T(i,j)$ respectively. Subsequently, some embodiments compute the area between $C_N(i,j)$ and $C_T(i,j)$, denoted as ABC(i,j). Given a legitimate cell l and false cell f, ABC(i,f)≤ABC(i,l) if cell i itself is a legitimate cell. This is based on the assumption that the RSRP/RSRQ values of cell f in testing data are significantly different than its counterpart in training data since it operated with higher power. By computing ABC(i,j) for all pairs of cells (i,j) in the network, some embodiments obtain a matrix M where M(i,j)=ABC(i,j).

Given a threshold $\delta$, i.e., the maximum allowed ABC, some embodiments check each cell i from the perspective of serving cell SC if ABC(SC,i)>$\delta$ and flag that as false. Then for the rest of the cells j∉{SC,i}, some embodiments find how many of those cells have identified the cell i as false. Given the condition that less than half of the cells in the network are false, some embodiments use a majority consensus vote by all cells to consolidate the detection of a false cell.

Figure 18:
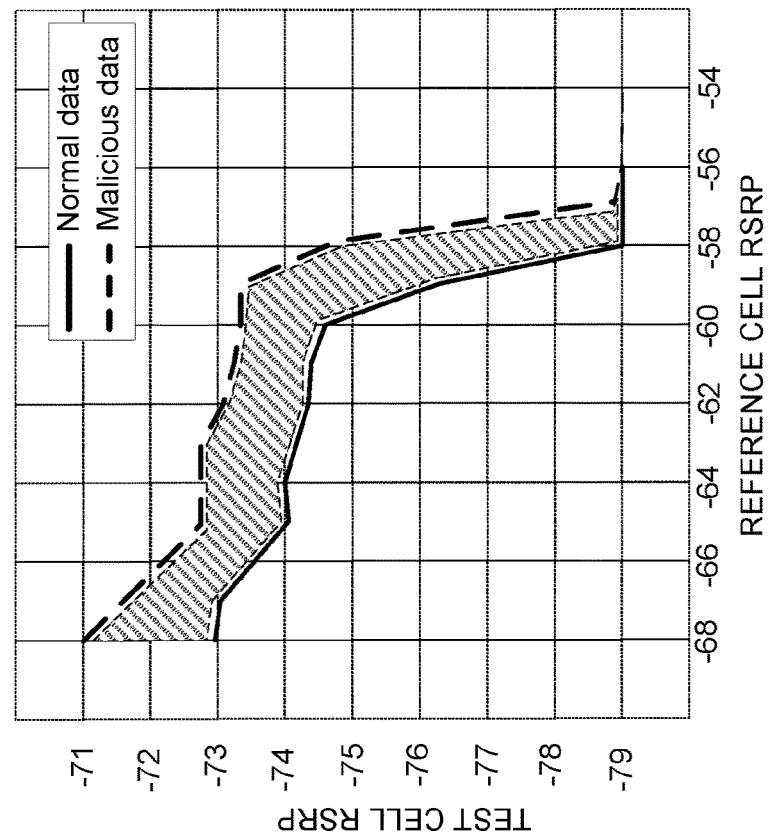
FIG. 18 is an example plot showing the area between 2-dimensional (2D) curves according to some embodiments.
Figure 18:
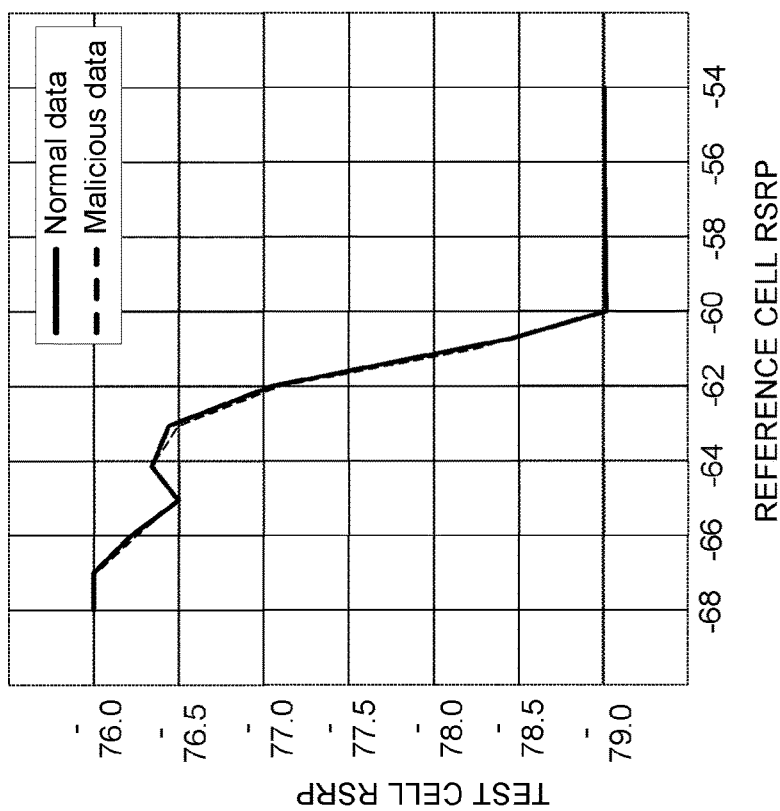

Consider a concrete example. FIG. 14 showed $T_{N(SC)}$, i.e., the summary table for false-cell-free data from the perspective of serving cell. FIG. 17 shows $T_{T(SC)}$, i.e., the corresponding summary table for the test data. For neighboring cell 3, i.e., j=3, the left subfigure in FIG. 18 shows 2D curves $C_N(SC,3)$ as a solid line and $C_T(SC,3)$ as a dashed line. The right subfigure shows $C_N(SC,11)$ as a solid line and $C_T(SC,11)$ as a dashed line for neighboring cell 11. By comparing the ABC for both subfigures in 18, one can visually confirm that ABC(SC,11)>ABC(SC,3). A large value of ABC signifies the presence of a false cell. The test cell in the left subfigure is a legitimate cell while the one in the right subfigure is a false cell.

Figure 20:
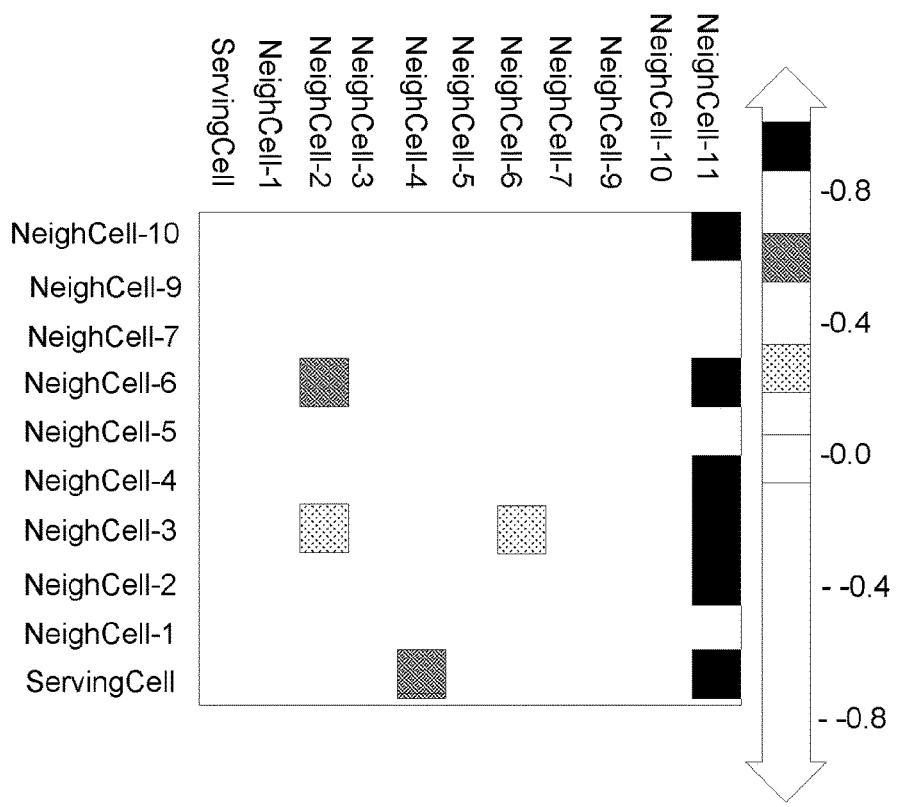
FIG. 20 shows the heatmap and a bar graph for the matrix M in FIG. 19 according to some embodiments.
Figure 20:
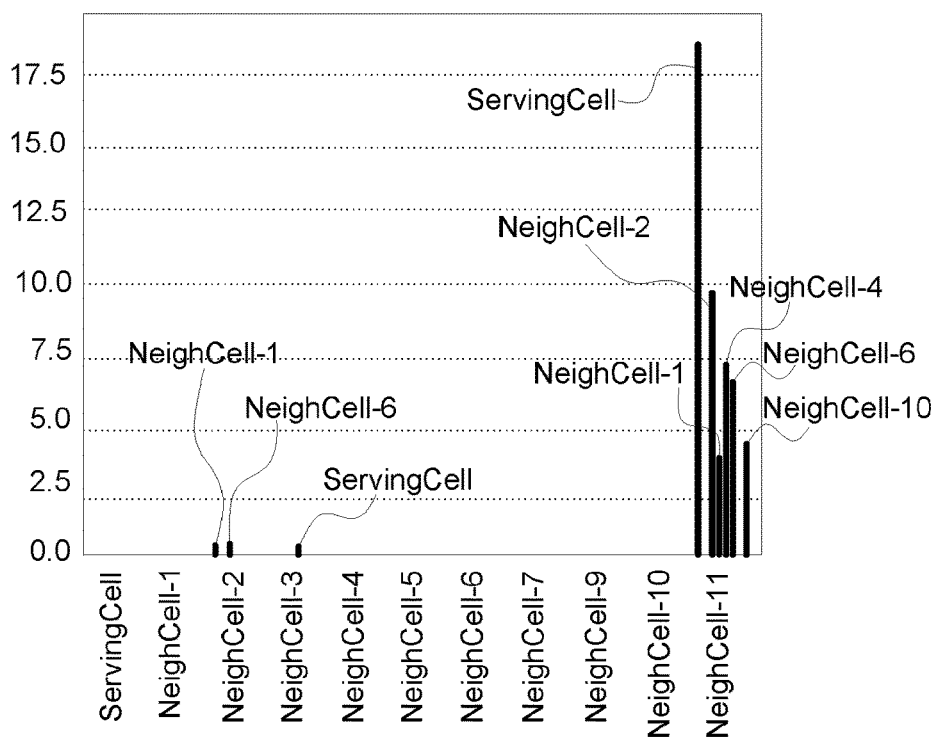

FIG. 19 show the 11×11 matrix M containing the area between the curves, i.e., ABC(i,j) for all 121 pairs of cells (i,j) in the network. FIG. 20 shows the heatmap and a bar graph for matrix M. The shading intensities in the heatmap (top subfigure) represent the relative size of ABC from cell i (row) perspective for cell j. A darker region thereby shows the presence of a false cell (in columns) from the perspective of the reference cell (in rows). One can observe that most of the cells, including the serving cell (bottom row), have identified cell 11 as the false cell. As pointed out herein, Cell 11 itself has identified 6 of the 10 cells as false cells (including the serving cell). Thus, by meeting the two conditions, i.e., (i) serving cell identifying the cell as false, and (ii) the cell itself identifying most of the rest of the cells as false, some embodiments infer cell 11 as a false cell. The bottom sub-figure in FIG. 20 shows an alternative way of visualizing area between the curves where it can be observed that, apart from the serving cell, measurement reports from cell 3, cell 4, cell 6 and cell 8 identify cell 11 as the false cell. The false cell, in turn, identifies most of the rest of the cells including the serving cell as false. Here, values considerably larger than zero are detected false cells.

Finally, observe that the current example is using RSRP as the metric. It is pertinent to mention here that, in a similar vein, one can also use the RSRQ metric to detect a false cell.

Alternatively or additionally to exploiting a spatial relationship between RSRP and/or RSRP values of cells in the above examples, some embodiments exploit a temporal relationship between those RSRP and/or RSRP values. Like a spatial relationship, there is a temporal relationship among consecutive RSRP and RSRQ values reported by an individual wireless device for a given cell.

For example, let $RSRP_{UC}(t)$ and $RSRP_{UC}(t+1)$ be the value of RSRP reported at time t and t+1 respectively by a wireless device U for a neighboring cell C. In the absence of false cell C, and when the wireless device is moving away from the cell C towards some serving cell, then from the serving cell's perspective, a sudden significant rise in $RSRP_{UC}(t+1)$ is not expected compared to $RSRP_{UC}(t)$. In other words, given a threshold δ

$$RSRP_{UC}(t+1) - RSRP_{UC}(t) < \delta$$

Now consider a false cell $\overline{C}$, which is using the PCI of the genuine cell C and is nearer to the serving cell than the genuine cell C. In such a scenario, when U is moving nearer to both the serving cell and $\overline{C}$, and when U reports C at time t and $\overline{C}$ (instead of C) at time (t+1), the network may observe that:

$$RSRP_{U\overline{C}}(t+1) - RSRP_{UC}(t) > \delta$$

To exploit this property, at training time, for each wireless device U and neighboring cell C, some embodiments compute $M_{UC}$, i.e., $$M_{UC} = \max(RSRP_{UC}(t+1) - RSRP_{UC}(t))$$

Some embodiments then compute the mean maximum value $M_C$ (by taking mean of all $M_{UC}$). At test time, some embodiments compare the difference between the consecutive RSRP value for each neighboring cell. If, for a certain cell, the difference between two consecutive RSRP values is greater than $M_C$ for many wireless devices then an anomaly may be reported. Note that here statistical mean is used for comparison, which is a point estimate. One can also exploit distributional properties by computing the distribution over $M_{UC}$ at training time and comparing how many standard deviations the test value is away from the mean and report anomaly with similar level of confidence.

Consider now exemplary training and inference algorithms according to one or more of these embodiments.

Consider now a particular example training algorithm. From the perspective of some serving cell, for each wireless device U reporting the neighboring cell C $$\max(RSRP_{UC}) = 0$$

For each incoming $RSRP_{UC}(t+1)$ at time (t+1):

$$\delta_{UC} = RSRP_{UC}(t+1) - RSRP_{UC}(t)$$

If $\max(RSRP_{UC}) < \delta_{UC}$
$\max(RSRP_{UC}) = \delta_{UC}$ $$M_C = \frac{\sum_1^N \max(RSRP_{UC})}{N}$$

(This is the threshold for max change in RSRP at given time for neighboring cell C from a perspective of a serving cell).

Consider next a particular example inference algorithm:
alertCount=C (This is the maximum number of mobile phones reporting the RSRP change $\delta > M_C$ at time (t+1))

curCount=0

For each incoming RSRP from a registered mobile phone U at time t+1:

$$\delta_{UC} = (RSRP_{UC}(t+1) - RSRP_{UC}(t))$$

If $\delta_{UC} > M_C$ (i.e., as soon as we see any mobile phone experiencing RSRP change $\delta > M_C$)

For each mobile phone Ú≠U at time t+1: (check how many other mobile phones are experiencing RSRP change $\delta > M_C$)

```
If δ_UC > M_C then
    curCount = curCount + 1
    If curCount > alertCount (we have seen required # of mobile
phones, so raise alarm)
        Raise alarm for possible false cell
    Else
        curCount = 0 (reset the counter to zero)
```

Regarding the data, chronological values of RSRP are needed for each neighboring cell as reported by wireless devices. Note, though, that an actual timestamp is not strictly needed since all that is needed is computation of consecutive values, which can be done from a simple chronological ordering.

Regardless, in some embodiments, the values for the cell characteristic (e.g., the RSRP, RSRQ, and/or PCI values) may be collected by the base stations (or the mobile network) using radio resource control (RRC) messages called measurement reports. These could be collected from wireless devices which have active connections with legitimate base stations in which case the wireless devices are said to be in RRC CONNECTED state. The RSRP and RSRQ could also be collected from wireless devices which do not currently have active connections with legitimate base stations in which case the wireless devices are said to be in RRC IDLE (or RRC INACTIVE) state. While in RRC IDLE or RRC INACTIVE state, the wireless devices could log the measurements and transmit the log to the legitimate base station later when they transition to RRC CONNECTED state.

From the base stations, the measurement reports could be either used locally or sent to another network function/node like some analytics server in the core network.

In some embodiments, the measurement reports from wireless devices do not directly contain the RSRP in dBm; rather they contain what are called the RSRP-Ranges that are integer values with 1 dBm resolution. These integer values are then mapped to RSRP range value in dBm. A simple formula is to subtract 140 from the reported integer value, e.g., reported integer "1" means "−140 dBm<=RSRP <−139 dBm".

Similarly, the measurement reports contain the RSRQ-Ranges that are integer values, with 0.5 dB resolution, which are then mapped to RSRQ range value in dB. A simple formula is to multiply the reported integer value with 0.5 and then subtract 19.5, e.g., reported integer "1" means "−19.5 dB<=RSRQ <−19 dB".

The RSRP and RSRQ could be used as-is in integer values reported by wireless devices or in dBm and dB after performing the mapping.

Figure 21:
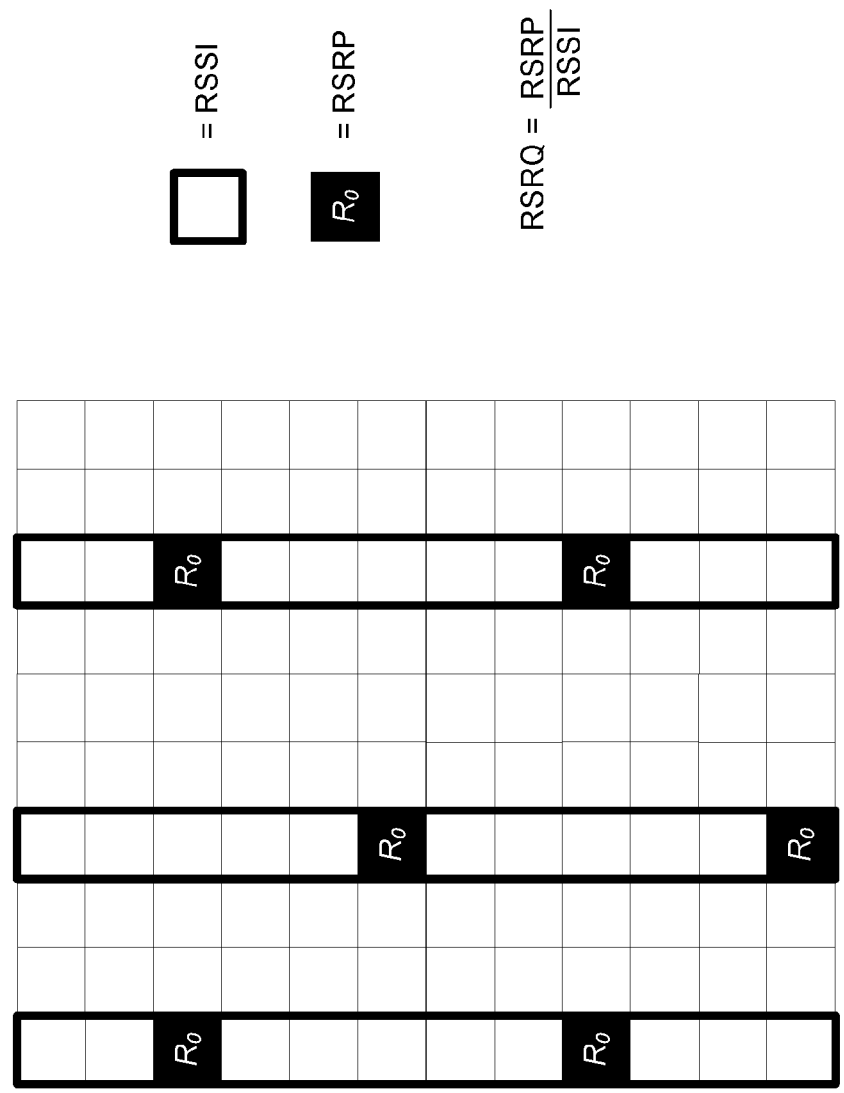
FIG. 21 is a block diagram of resource elements used for calculating RSSI, RSRP, and RSRQ according to some embodiments.

In any event, the RSRP in some embodiments represents an average strength of received signals from a cell by a wireless device, as shown in FIG. 21. It is an average power contribution of the resource elements that carry Cell Specific Reference Signals (CRSs) over a measurement bandwidth. The RSRP is expressed in dBm.

The RSRQ represents quality of received signals from a cell by a wireless device. The RSRQ is expressed in dB which is a dimensionless unit since it quantifies ratio between RSRP and RSSI values. The term RSSI means received signal strength indicator which is an average of the total received power observed over a measurement bandwidth during which the RSRP symbols are measured. The RSSI also includes interference and noise.

Despite sufficiently conveying necessary radio conditions, these RSRP and RSRQ are interesting also because of the fact that they are almost always available in the measurement reports which means they are accessible for analysis.

Other signal properties that could be used for the cell characteristic, alternatively or additionally to RSRP and RSRQ, are other characteristics like Signal to Interference to Noise Ratio (SINR), or Signal to Noise Ratio (SNR) or Received Signal Strength Indication (RSSI), global cell identifiers, timing advances, downlink coding information, uplink grants, scrambling codes, radio network temporary identifiers, etc.

Note also that some embodiments herein may employ any type of model 24, 30.

For example, a rule-based model that performs checks against some threshold(s) could be used. The threshold(s) could be static or configurable via files, database, sockets, etc. The threshold(s) could also be in relation to other parameters in the features. A rule-based model could even be used to check against thresholds where the cell characteristic is cell identity presence/absence, like "nX" should always be 0, or "nY" should always be 0 when "nZ" is 1. If these checks are not met, then the rule-based model would flag anomaly.

As another example, some embodiments use unsupervised deep learning models like autoencoders for detection purposes as well. In an autoencoder network, one tries to learn a low-dimensional mapping of the input. In practice, one trains the autoencoder network using the training data by minimizing the reconstruction error. Then at inference time, the reconstruction error of the testing data is computed. The higher the error, the higher the probability of a false cell. In practice, if the error is above a set threshold (which can also be learnt using the training data), an alert can be generated to signal the presence of a false cell.

Training can be performed using data collected from cells on different levels like cell-level, base station level, tracking area level, or network level.

Cell-level means that the training input consists of data collected by one cell. This kind of training can be used to find anomaly from the perspective of a single cell. When a wider perspective is desired, e.g., to know corresponding effects on different cells, training could also be done by combining data from different cells. A base station typically has more than one cell, so training could be done with data collected from all the cells in a base station. Further, tracking area typically consists of cells belonging to different base station, therefore, training could also be done with data collected from all the cells in a tracking area, and similarly for the whole network.

It is pertinent to mention here that depending upon which feature is chosen and machine learning model is chosen, some embodiments may train and test/infer under similar conditions. In other words, if cell traffic is markedly different in conditions like day vs. night, working day vs. weekend, on-working vs off-working times then some embodiments train separate models for such conditions. Given cheap availability of memory and off-line training, it shouldn't be a problem to keep separate models for different conditions. A related issue is re-training after a certain time like each week/month so that the trained model 30 is evolving with novel conditions and can catch false cells robustly.

Generally, training in some embodiments may be done totally or partially offline. Then, the trained model 30 (e.g., a serialized pickle file, Java object, etc.) can be shipped and loaded/used in the detection equipment for testing/detection. Mind that there could also be on-the-fly training (online training), e.g., collecting data in real-time and training on them at the same time.

Furthermore, although the training dataset 26 was illustrated above as including false-cell-free datapoints, the training dataset 26 in some embodiments may also include false-cell datapoints, to train the model as to what the combinations of values look like in the presence of a false cell. If the model 24 is only trained on "clean" data without a false cell, then the model 24 may detect anything different than that. This may be referred to as "novelty" detection. The model will have some hyperparameters which could be configured for determining how much the observed/test data must vary from the clean data in order to raise a novelty detection event. If the model 24 is trained on contaminated data (with a false cell present), then this may be called anomaly detection. Note though that in some embodiments the model 24 is robust to inclusion of false-cell datapoints in the training dataset 26, e.g., at least if the volume of false-cell-free datapoints is (much) higher than the volume of false-cell datapoints.

Regardless, given the trained model 30, testing/inference can be performed either in batch mode or streaming/online mode. The latter may be appropriate in real life conditions, since new data will be feed into the model as it arrives. As mentioned before, inference can be performed at the level of cell, base station, tracking area or network. Moreover, some embodiments perform testing/inference using models trained under similar conditions.

Cell operating conditions and user geographical navigation may change with time due to multiple reasons. This is bound to transform the neighboring cells' RSRP/RSRQ as well as inter-cell spatial and temporal relationships. Therefore, machine learning models may be updated at regular intervals to cope with changing conditions. The frequency of update may be determined by different factors like model accuracy, change in landscape of area covered by a cell like construction of new buildings etc. Since retraining may be performed offline, a separate process within the compute node can perform this on a regular basis, compare the performance with existing model and update the model if necessary.

In some embodiments, results can be collected in the same format as the input with an additional tag which indicates if a given input is flagged as malicious or anomalous. For example, each measurement report could be flagged with a Boolean value, TRUE meaning anomalous and FALSE meaning normal. Such flagging could also be done on a batch instead of every single measurement report, e.g., a batch size of 10 could have a single flag. An alternative way would be to use a probabilistic anomaly score between 0 to 1 where 0 meaning no probability of false cell, 1 meaning 100% probability of false cell and values between 0 and 1 showing the relative probability of false cell.

Results could also be collected such that there are following indications—time of detection, time when measurement report was received by the serving cell, identifier of the serving cell, identifier of the detected or flagged anomalous neighboring cell, identifier of the mobile phone from which the measurement report was received.

There results could be collected in different formats like JSON records, CSV (comma separated values), database rows, etc. and could be displayed in a web based dashboard.

Note also that, although embodiments above have been described with reference to a false cell, some embodiments herein are equally applicable to a false base station, where a false base station may provide one or more false cells. A false base station is a general term for a device which intentionally sets out to impersonate a genuine base station—very often as part of some malign activity, such as unauthorized surveillance, communication sabotage, or unsolicited advertising. A false base station is also known by other names such as International Mobile Subscription Identifier (IMSI) catcher, Stingray, rogue base station, or cell site simulator. The threats from false base stations could be broadly categorized as denial of service (DoS) on mobile phones, DoS on network, attack on subscriber's privacy, and attempts of fraud. Advanced false base stations may even actively eavesdrop on 2G radio communication. Even more advanced false base stations may conduct parallel attacks both on operator's radio and interconnect networks and thus actively eavesdrop on 3G and 4G radio communication. Regardless, some embodiments may detect a false base station in a similar way as described above for detecting a false cell.

In view of the above modifications and variations, some embodiments herein generally exploit one or more features (i.e., one or more cell characteristics) for use with machine learning techniques for detection of false cells. Where the cell characteristic is RSRP, RSRQ, or cell identifiers, for example, use of the one or more features may be based on (a) spatial relationship between RSRPs and/or RSRQs of cells, (b) spatial relationship between identifiers of cells, and (c) temporal relationship between RSRPs and/or RSRQs of neighboring cells. Regardless, some embodiments provide an end-to-end machine learning pipeline, which uses signal information to detect false cells adaptively. By adaptively, it is meant that, based on operating conditions of the network in a certain geographical area, some embodiments can tune themselves to identify false cells.

Figure 22:
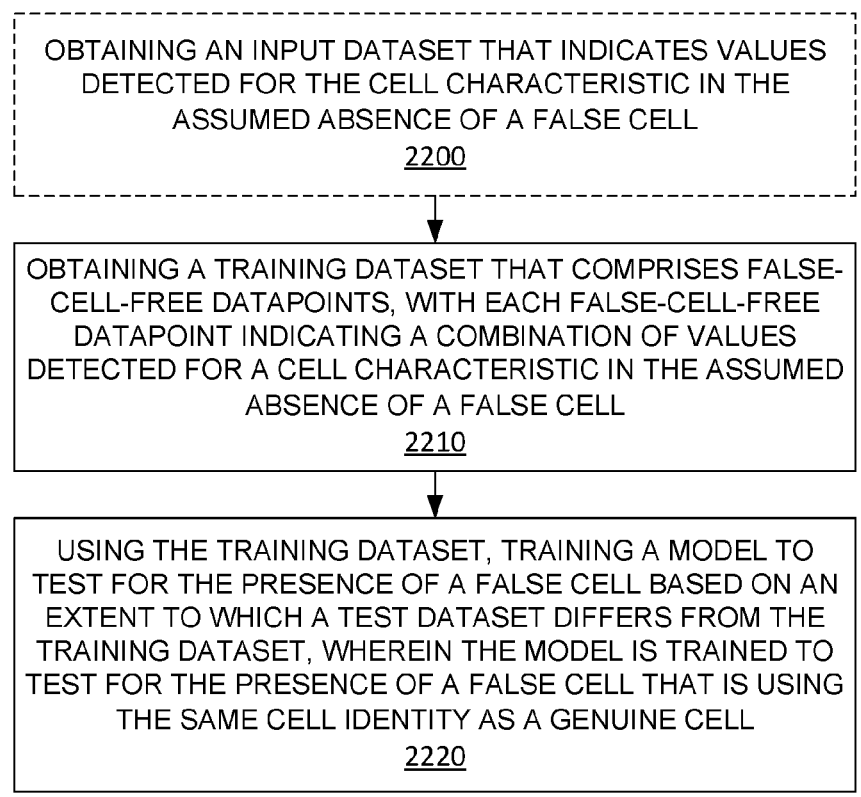
FIG. 22 is a logic flow diagram of a method performed by model training equipment in accordance with some embodiments.

In view of the above modifications and variations, FIG. 22 depicts a method performed by model training equipment 22 in accordance with particular embodiments. The method includes obtaining a training dataset 26 that comprises false-cell-free datapoints 26-1, 26-2 . . . 26-N, with each false-cell-free datapoint 26-1, 26-2 . . . 26-N indicating a combination of values 28-1, 28-2, . . . 28-N detected for a cell characteristic in the assumed absence of a false cell (Block 2210). The method may also comprise, using the training dataset 26, training a model 24 to test for the presence of a false cell based on an extent to which a test dataset 40 differs from the training dataset 26 (Block 2220). In some embodiments, the model 24 is trained to test for the presence of a false cell that is using the same cell identity as a genuine cell.

In some embodiments, the method further comprises obtaining an input dataset that indicates values detected for the cell characteristic in the assumed absence of a false cell (Block 2200). In one such embodiment, obtaining the training dataset 26 (Block 2210) comprises creating the training dataset 26 from the input dataset.

In some embodiments, the method further comprises obtaining an input dataset that indicates values detected for the cell characteristic in the assumed absence of a false cell. In this case, obtaining the training dataset 26 may comprise creating the training dataset 26 from the input dataset. In one such embodiment, the input dataset includes data detected and reported by wireless devices 12 in the assumed absence of a false cell. Alternatively or additionally, creating the training dataset 26 from the input dataset may comprise forming the false-cell-free datapoints 26-1, 26-2 . . . 26-N as respective combinations of values indicated by the input dataset.

In some embodiments, the values in each combination indicated by a false-cell-free datapoint have a spatial and/or temporal relationship. In one such embodiment, the model 24 is trained to test for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

In some embodiments, the values in the combination indicated by each false-cell-free datapoint are associated with respective cell identities in a set.

In some embodiments, the model 24 is trained to test for the presence of a false cell that is using a certain cell identity based on an extent to which a test distribution for the certain cell identity differs from a false-cell-free distribution for the certain cell identity.

In some embodiments, the model 24 is trained to test for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in combination with the given reference value, detected in association with the non-reference cell identity, and detected across the false-cell-free datapoints. And the test distribution for the non-reference cell identity comprises a distribution of values detected for the cell characteristic in combination with the given reference value, detected in association with the non-reference cell identity, and detected across test datapoints of the test dataset. For example, the model 24 may represent the false-cell-free distribution for the non-reference cell identity as a measure of central tendency of the values detected for the cell characteristic in combination with the given reference value, detected in association with the non-reference cell identity, and detected across the false-cell-free datapoints 26-1, 26-2 . . . 26-N. In such a case, the model 24 may comprise a threshold based on which to test an extent to which the false-cell-free distribution for the non-reference cell identity differs from the test distribution for the non-reference cell identity.

In other embodiments, the model 24 is trained to test for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in association with the non-reference cell identity, detected across the false-cell-free datapoints 26-1, 26-2 . . . 26-N, and detected across the different reference values. And the test distribution for the non-reference cell identity comprises a distribution of values detected for the cell characteristic in association with the non-reference cell identity, detected across test datapoints 42-1, 42-2, . . . 42-M of the test dataset, and detected across the different reference values. For example, the model 24 may represent the false-cell-free distribution for the non-reference cell identity as a two-dimensional curve of the values detected for the cell characteristic in association with the non-reference cell identity, detected across the false-cell-free datapoints 26-1, 26-2 . . . 26-N, and detected across the different reference values. In this case, the model 24 may comprise a threshold based on which to test an extent to which the test distribution for the non-reference cell identity differs from the false-cell-free distribution for the non-reference cell identity. In some embodiment, then, the test distribution for the non-reference cell identity is represented as a two-dimensional curve of values detected for the cell characteristic in association with the non-reference cell identity, detected across the test datapoints, and detected across the different reference values. Training may thereby comprise training the model 24 to test for the presence of a false cell based on an extent to which an area under the two-dimensional curve represented by the test distribution is above the threshold.

In some embodiments, each false-cell-free datapoint represents a measurement report that reports values detected for the cell characteristic associated with respective cell identities in a set, including a serving cell identity and one or more neighbor cell identities, wherein the reference cell identity is the serving cell identity.

In some embodiments, said training comprises training the model 24 to test for the presence of a false cell using a certain cell identity based on an extent to which a Kullback-Leibler (KL) divergence representing values associated with the certain cell identity in the test dataset differs from a KL divergence representing values associated with the certain cell identity in the training dataset 26.

In some embodiments, the values in the combination indicated by each false-cell-free datapoint are associated with respective cell identities in a set, the test dataset 40 includes a test datapoint indicating a combination of values detected for the cell characteristic, and the values in the combination indicated by the test datapoint are associated with respective cell identities in the set. In one such embodiment, training comprises training the model 24 to predict a value for the cell characteristic in association with a certain cell identity in the set, from a combination of one or more values indicated by the test datapoint as detected for the cell characteristic in association with one or more other cell identities in the set. The model 24 may be trained to test for the presence of a false cell using the certain cell identity based on an extent to which the value associated with the certain cell identity in the combination indicated by the test datapoint differs from the value predicted for the cell characteristic in association with the certain cell identity.

In some embodiments, values for the cell characteristic are numerical values and the model 24 is a regression model. In other embodiments, values for the cell characteristic are classification labels and the model 24 is a classification model. It should also be appreciated that numerical values can also be grouped or binned and be used by a classification model.

In yet other embodiments, the combination of values indicated by each false-cell-free datapoint comprise a pair of values detected by a wireless device 12 for the cell characteristic for the same cell identity but at different consecutive detection times. In one such embodiment, the model 24 comprises a measure of central tendency of the differences between the values of each pair comprised in a false-cell-free datapoint, and the model 24 further comprises a threshold based on which to test an extent to which a pair of values detected by the wireless device 12 for the cell characteristic for the same cell identity but at different detection times according to a test datapoint differs from the measure of central tendency.

In some embodiments, the cell characteristic is a cell signal strength or quality. Cell signal strength or quality as used herein may cover, for example, signal-to-noise-ratio (SNR) or signal-to-interference-plus-noise-ratio (SINR) or strength to quality ratio.

In other embodiments, the cell characteristic is a cell identity.

In some embodiments, the model 24 is a machine learning model.

In some embodiments, the model 24 is specific to certain conditions under which the cell characteristic is detected.

In some embodiments, the training dataset 26 further comprises false-cell datapoints 26-1, 26-2 . . . 26-N, with each false-cell datapoint indicating a combination of values detected for the cell characteristic in the assumed presence of a false cell.

In some embodiments, the method is further performed by detection equipment 46, and the method further comprises obtaining the test dataset that comprises test datapoints, with each test datapoint indicating a combination of values detected for a cell characteristic. The method may further comprise testing for the presence of a false cell based on an extent to which the test dataset differs from the training dataset according to the trained model.

Figure 23:
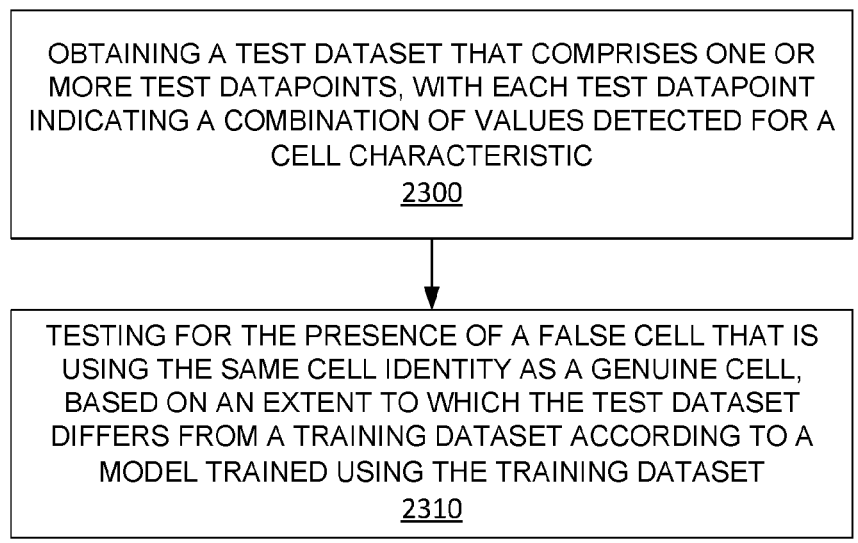
FIG. 23 is a logic flow diagram of a method performed by detection equipment in accordance with some embodiments.

FIG. 23 depicts a method performed by detection equipment 46 in accordance with other particular embodiments. The method includes obtaining a test dataset 40 that comprises one or more test datapoints 42-1, 42-2, . . . 42-M, with each test datapoint 42-1, 42-2, . . . 42-M indicating a combination of values 44-1, 44-2, . . . 44-M detected for a cell characteristic (Block 2300). The method also comprises testing for the presence of a false cell that is using the same cell identity as a genuine cell, based on an extent to which the test dataset 40 differs from a training dataset 26 according to a model 30 trained using the training dataset 26 (Block 2310). In some embodiments, the training dataset 26 comprises false-cell-free datapoints 26-1, 26-2 . . . 26-N, with each false-cell-free datapoint indicating a combination of values detected for the cell characteristic in the assumed absence of a false cell.

In some embodiments, the values in each combination indicated by a false-cell-free datapoint of the training dataset 26 have a spatial and/or temporal relationship. In one such embodiment, said testing comprises testing for the presence of a false cell based on an extent to which a spatial and/or temporal relationship of values in each combination indicated by a test datapoint of the test dataset 40 differs from the spatial and/or temporal relationship of the values in each combination indicated by a false-cell-free datapoint.

In some embodiments, the values in the combination indicated by each test datapoint are associated with respective cell identities in a set.

In some embodiments, said testing comprises testing for the presence of a false cell that is using a certain cell identity based on an extent to which a test distribution for the certain cell identity differs from a false-cell-free distribution for the certain cell identity.

In some embodiments, said testing comprises testing for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in combination with the given reference value, detected in association with the non-reference cell identity, and detected across false-cell-free datapoints of the training dataset 26. And the test distribution for the non-reference cell identity comprises a distribution of values detected for the cell characteristic in combination with the given reference value, detected in association with the non-reference cell identity, and detected across test datapoints of the test dataset 40. For example, the model 24 may represent the false-cell-free distribution for the non-reference cell identity as a measure of central tendency of the values detected for the cell characteristic in combination with the given reference value, detected in association with the non-reference cell identity, and detected across the false-cell-free datapoints. In this case, the model 24 may comprise a threshold based on which to test an extent to which the false-cell-free distribution for the non-reference cell identity differs from the test distribution for the non-reference cell identity. And said testing may comprise testing for the presence of a false cell using the measure of central tendency and the threshold.

In some embodiments, said testing comprises testing for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity. In one such embodiment, the false-cell-free distribution for the non-reference cell identity comprises a distribution of values detected for the cell characteristic in association with the non-reference cell identity, detected across false-cell-free datapoints of the training dataset 26, and detected across the different reference values. And the test distribution for the non-reference cell identity comprises a distribution of values detected for the cell characteristic in association with the non-reference cell identity, detected across test datapoints of the test dataset 40, and detected across the different reference values. For example, the model 24 may represent the false-cell-free distribution for the non-reference cell identity as a two-dimensional curve of the values detected for the cell characteristic in association with the non-reference cell identity, detected across the false-cell-free datapoints, and detected across the different reference values. In this case, the model 24 may comprise a threshold based on which to test an extent to which the test distribution for the non-reference cell identity differs from the false-cell-free distribution for the non-reference cell identity. And said testing comprises testing for the presence of a false cell using the two-dimensional curve and the threshold. For instance, the test distribution for the non-reference cell identity is represented as a two-dimensional curve of values detected for the cell characteristic in association with the non-reference cell identity, detected across the test datapoints 42-1, 42-2, . . . 42-M, and detected across the different reference values, and wherein said testing comprises testing for the presence of a false cell based on an extent to which an area under the two-dimensional curve represented by the test distribution is above the threshold.

In some embodiments, each test datapoint represents a measurement report that reports values detected for the cell characteristic associated with respective cell identities in a set, including a serving cell identity and one or more neighbor cell identities, wherein the reference cell identity is the serving cell identity.

In some embodiments, said testing comprises testing for the presence of a false cell using a certain cell identity based on an extent to which a Kullback-Leibler (KL) divergence representing values associated with the certain cell identity in the test dataset 40 differs from a KL divergence representing values associated with the certain cell identity in the training dataset 26 according to the model 24.

In some embodiments, the training dataset 26 comprises false-cell-free datapoints 26-1, 26-2 . . . 26-N, with each false-cell-free datapoint indicating a combination of values detected for the cell characteristic in the assumed absence of a false cell. In one such embodiment, the values in the combination indicated by each false-cell-free datapoint are associated with respective cell identities in a set, the test dataset 40 includes a test datapoint indicating a combination of values detected for the cell characteristic, and the values in the combination indicated by the test datapoint are associated with respective cell identities in the set. In this case, the testing may comprises predicting a value for the cell characteristic in association with a certain cell identity in the set, from a combination of one or more values indicated by the test datapoint as detected for the cell characteristic in association with one or more other cell identities in the set. And testing may further comprise determining an extent to which the value associated with the certain cell identity in the combination indicated by the test datapoint differs from the value predicted for the cell characteristic in association with the certain cell identity.

In some embodiments, values for the cell characteristic are numerical values and the model 24 is a regression model. In other embodiments, values for the cell characteristic are classification labels and the model 24 is a classification model. It should also be appreciated that numerical values can also be grouped or binned and be used by a classification model.

In some embodiments, the combination of values indicated by each test datapoint comprise a pair of values detected by a wireless device 12 for the cell characteristic for the same cell identity but at different consecutive detection times. In one such embodiment, the model 24 comprises a measure of central tendency of the differences between the values of each pair comprised in a test datapoint. In this case, the model 24 may further comprise a threshold based on which to test an extent to which a pair of values detected by the wireless device 12 for the cell characteristic for the same cell identity but at different detection times according to a test datapoint differs from the measure of central tendency, and said testing may comprise testing for the presence of a false cell using the measure of central tendency and the threshold.

In some embodiments, the cell characteristic is a cell signal strength or quality. In other embodiments, the cell characteristic is a cell identity.

In some embodiments, the model 24 is a machine learning model.

In some embodiments, the model 24 is specific to certain conditions under which the cell characteristic is detected.

In some embodiments, the training dataset 26 further comprises false-cell datapoints 26-1, 26-2 . . . 26-N, with each false-cell datapoint indicating a combination of values detected for the cell characteristic in the assumed presence of a false cell.

Note that the model training equipment 22 may be implemented as or part of any wireless communication equipment, e.g., located in a network node of the network 10 or a wireless device 12. Similarly, the detection equipment 46 may be implemented as or part of any wireless communication equipment, e.g., located in a network node of the network 10 or a wireless device 12. When located in the network 10, the network node may be equipment such as a server, or a virtualized server, or a containerized server in cloud, software application, etc.

Embodiments herein thereby also include corresponding apparatuses. Embodiments herein for instance include wireless communication equipment configured to perform any of the steps of any of the embodiments described above for the model training equipment 22 and/or detection equipment 46.

Embodiments also include wireless communication equipment comprising processing circuitry and power supply circuitry. The processing circuitry is configured to perform any of the steps of any of the embodiments described above for the model training equipment 22 and/or detection equipment 46. The power supply circuitry is configured to supply power to the wireless communication equipment.

Embodiments further include wireless communication equipment comprising processing circuitry. The processing circuitry is configured to perform any of the steps of any of the embodiments described above for the model training equipment 22 and/or detection equipment 46. In some embodiments, the wireless communication equipment further comprises communication circuitry.

Embodiments further include wireless communication equipment comprising processing circuitry and memory. The memory contains instructions executable by the processing circuitry whereby the wireless communication equipment is configured to perform any of the steps of any of the embodiments described above for the model training equipment 22 and/or detection equipment 46.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 24:
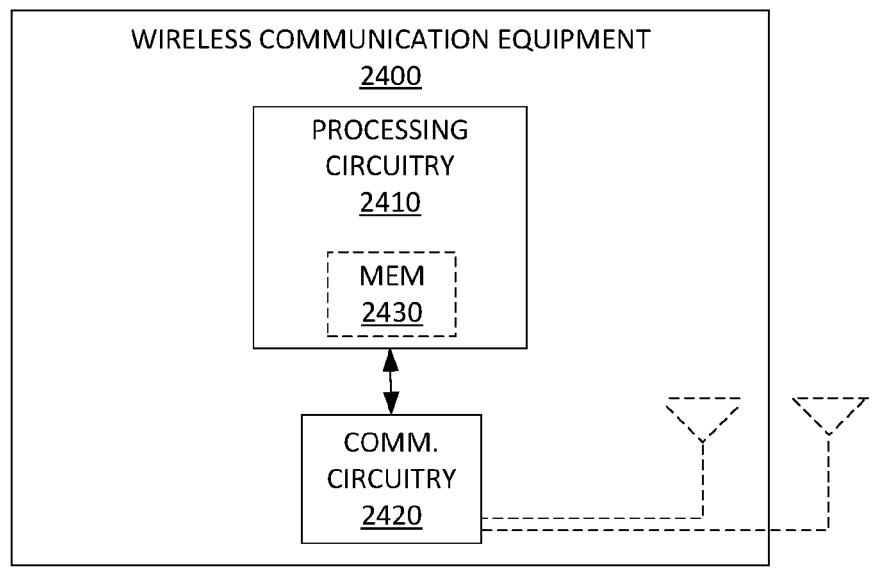
FIG. 24 is a blow diagram of wireless communication equipment (e.g., including model training equipment and/or detection equipment) according to some embodiments.

FIG. 24 for example illustrates wireless communication equipment 2400 as implemented in accordance with one or more embodiments. The wireless communication equipment 2400 may for instance be or include model training equipment 22 and/or detection equipment 46. As shown, the wireless communication equipment 2400 includes processing circuitry 2410 and communication circuitry 2420. The communication circuitry 2420 (e.g., radio circuitry) is configured to transmit and/or receive information to and/or from one or more other nodes, e.g., via any communication technology. In some embodiments, such communication may occur via one or more antennas that are either internal or external to the wireless communication equipment 2400. In other embodiments, such communication may occur via one or more wired interfaces. The processing circuitry 2410 is configured to perform processing described above, e.g., in FIGS. 22 and/or 23, such as by executing instructions stored in memory 2430. The processing circuitry 2410 in this regard may implement certain functional means, units, or modules.

Those skilled in the art will also appreciate that embodiments herein further include corresponding computer programs.

A computer program comprises instructions which, when executed on at least one processor of wireless communication equipment, cause the wireless communication equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of wireless communication equipment, cause the wireless communication equipment to perform as described above.

Embodiments further include a computer program product comprising program code portions for performing the steps of any of the embodiments herein when the computer program product is executed by wireless communication equipment. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 25:
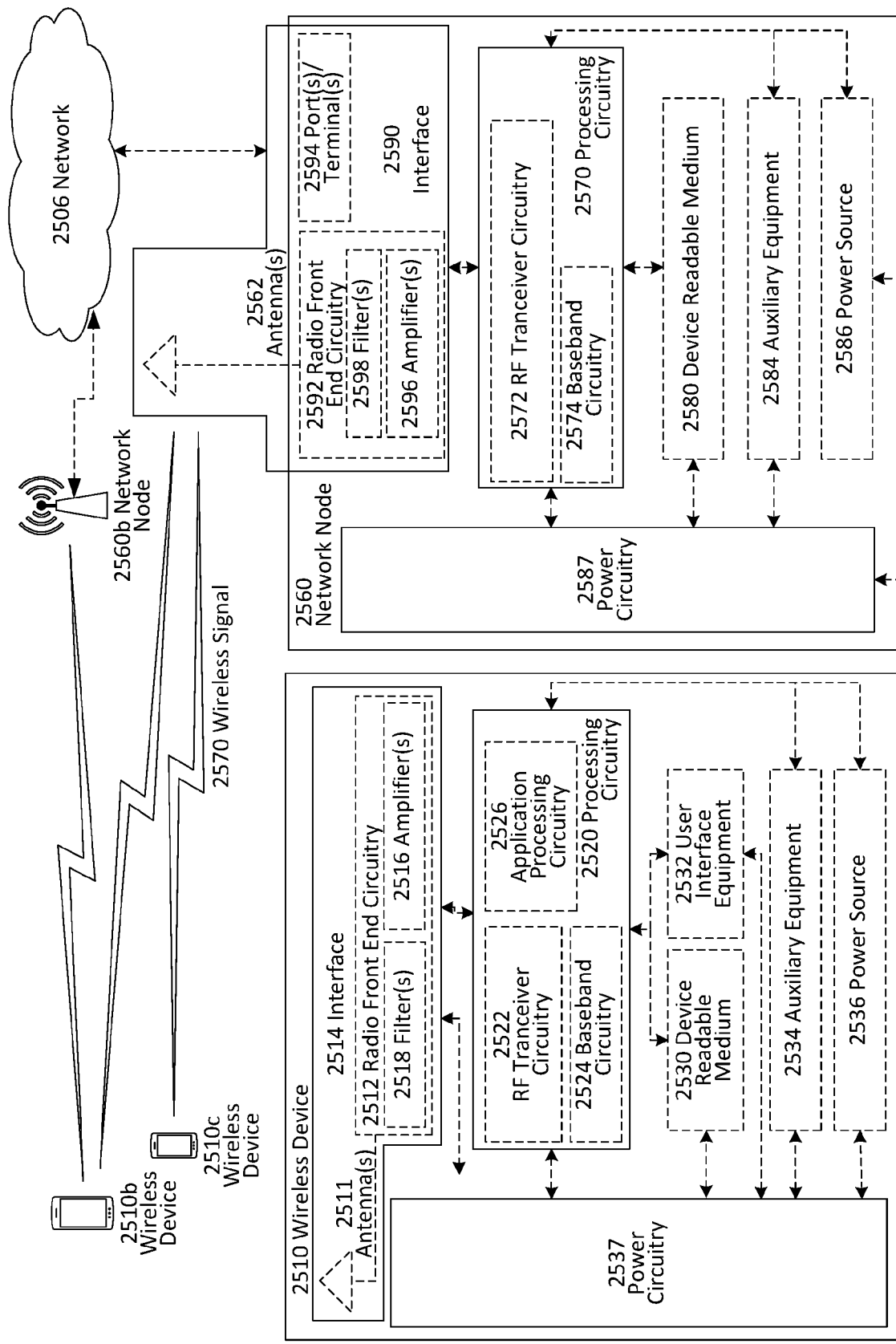
FIG. 25 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560b, and WDs 2510, 2510b, and 2510c. In practice, a wireless network may further include any additional elements suitable to support communication between wireless devices or between a wireless device and another communication device, such as a landline telephone, a service provider, or any other network node or end device. Of the illustrated components, network node 2560 and wireless device (WD) 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple RAM modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2560 may be configured to support multiple radio access technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, WCDMA, LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a system on a chip (SOC).

In some embodiments, processing circuitry 2570 may include one or more of radio frequency (RF) transceiver circuitry 2572 and baseband processing circuitry 2574. In some embodiments, radio frequency (RF) transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units In certain embodiments, some or all of the functionality described herein as being provided by a network node, base station, eNB or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner. In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc. and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signalling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592. The digital data may be passed to processing circuitry 2570. In other embodiments, the interface may comprise different components and/or different combinations of components.

In certain alternative embodiments, network node 2560 may not include separate radio front end circuitry 2592, instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2590 and may be any type of antenna capable of transmitting and receiving data and/or signals wirelessly. In some embodiments, antenna 2562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data and/or signals may be received from a wireless device, another network node and/or any other network equipment. Similarly, antenna 2562, interface 2590, and/or processing circuitry 2570 may be configured to perform any transmitting operations described herein as being performed by a network node. Any information, data and/or signals may be transmitted to a wireless device, another network node and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536 and power circuitry 2537. WD 2510 may include multiple sets of one or more of the illustrated components for different wireless technologies supported by WD 2510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2514 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner. In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a USB port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
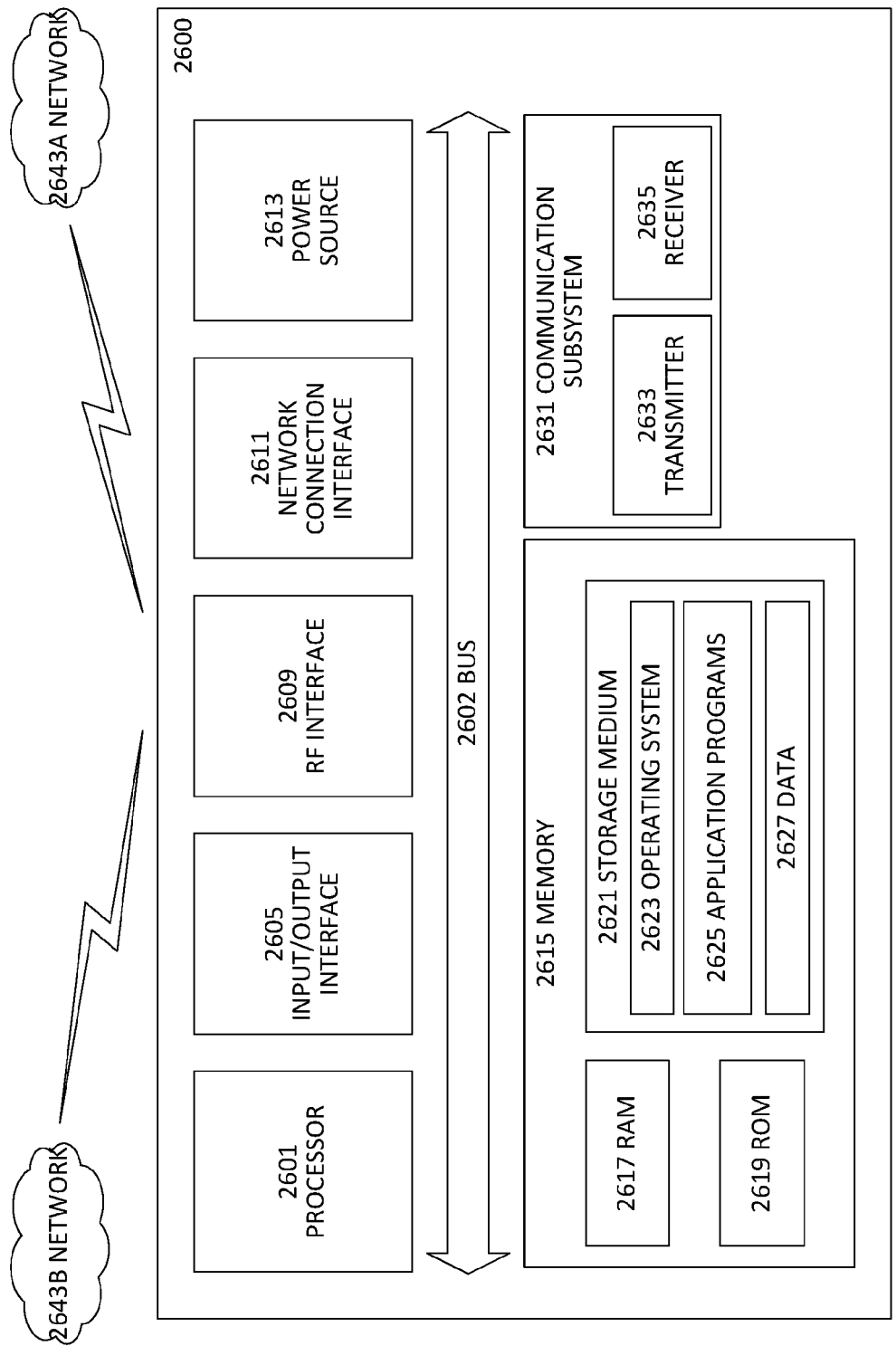
FIG. 26 is a block diagram of a user equipment according to some embodiments.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 26200 may be any UE identified by the 3rd Generation Partnership Project (3GPP), including a NB-IoT UE, a machine type communication (MTC) UE, and/or an enhanced MTC (eMTC) UE. UE 2600, as illustrated in FIG. 26, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 2600 includes processing circuitry 2601 that is operatively coupled to input/output interface 2605, radio frequency (RF) interface 2609, network connection interface 2611, memory 2615 including random access memory (RAM) 2617, read-only memory (ROM) 2619, and storage medium 2621 or the like, communication subsystem 2631, power source 2633, and/or any other component, or any combination thereof. Storage medium 2621 includes operating system 2623, application program 2625, and data 2627. In other embodiments, storage medium 2621 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 2601 may be configured to process computer instructions and data. Processing circuitry 2601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2601 may include two central processing units (CPUs). Data may be information in a form suitable for use by a computer.

In the depicted embodiment, input/output interface 2605 may be configured to provide a communication interface to an input device, output device, or input and output device. UE 2600 may be configured to use an output device via input/output interface 2605. An output device may use the same type of interface port as an input device. For example, a USB port may be used to provide input to and output from UE 2600. The output device may be a speaker, a sound card, a video card, a display, a monitor, a printer, an actuator, an emitter, a smartcard, another output device, or any combination thereof. UE 2600 may be configured to use an input device via input/output interface 2605 to allow a user to capture information into UE 2600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 2609 may be configured to provide a communication interface to RF components such as a transmitter, a receiver, and an antenna. Network connection interface 2611 may be configured to provide a communication interface to network 2643a. Network 2643a may encompass wired and/or wireless networks such as a local-area network (LAN), a wide-area network (WAN), a computer network, a wireless network, a telecommunications network, another like network or any combination thereof. For example, network 2643a may comprise a Wi-Fi network. Network connection interface 2611 may be configured to include a receiver and a transmitter interface used to communicate with one or more other devices over a communication network according to one or more communication protocols, such as Ethernet, TCP/IP, SONET, ATM, or the like. Network connection interface 2611 may implement receiver and transmitter functionality appropriate to the communication network links (e.g., optical, electrical, and the like). The transmitter and receiver functions may share circuit components, software or firmware, or alternatively may be implemented separately.

RAM 2617 may be configured to interface via bus 2602 to processing circuitry 2601 to provide storage or caching of data or computer instructions during the execution of software programs such as the operating system, application programs, and device drivers. ROM 2619 may be configured to provide computer instructions or data to processing circuitry 2601. For example, ROM 2619 may be configured to store invariant low-level system code or data for basic system functions such as basic input and output (I/O), startup, or reception of keystrokes from a keyboard that are stored in a non-volatile memory. Storage medium 2621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2621 may be configured to include operating system 2623, application program 2625 such as a web browser application, a widget or gadget engine or another application, and data file 2627. Storage medium 2621 may store, for use by UE 2600, any of a variety of various operating systems or combinations of operating systems.

Storage medium 2621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2621 may allow UE 2600 to access computer-executable instructions, application programs or the like, stored on transitory or non-transitory memory media, to off-load data, or to upload data. An article of manufacture, such as one utilizing a communication system may be tangibly embodied in storage medium 2621, which may comprise a device readable medium.

In FIG. 26, processing circuitry 2601 may be configured to communicate with network 2643*b* using communication subsystem 2631. Network 2643*a* and network 2643*b* may be the same network or networks or different network or networks. Communication subsystem 2631 may be configured to include one or more transceivers used to communicate with network 2643*b*. For example, communication subsystem 2631 may be configured to include one or more transceivers used to communicate with one or more remote transceivers of another device capable of wireless communication such as another WD, UE, or base station of a radio access network (RAN) according to one or more communication protocols, such as IEEE 802.26, CDMA, WCDMA, GSM, LTE, UTRAN, WiMax, or the like. Each transceiver may include transmitter 2633 and/or receiver 2635 to implement transmitter or receiver functionality, respectively, appropriate to the RAN links (e.g., frequency allocations and the like). Further, transmitter 2633 and receiver 2635 of each transceiver may share circuit components, software or firmware, or alternatively may be implemented separately.

In the illustrated embodiment, the communication functions of communication subsystem 2631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2631 may include cellular communication, Wi-Fi communication, Bluetooth communication, and GPS communication. Network 2643*b* may encompass wired and/or wireless networks such as a local-area network (LAN), a wide-area network (WAN), a computer network, a wireless network, a telecommunications network, another like network or any combination thereof. For example, network 2643*b* may be a cellular network, a Wi-Fi network, and/or a near-field network. Power source 2613 may be configured to provide alternating current (AC) or direct current (DC) power to components of UE 2600.

The features, benefits and/or functions described herein may be implemented in one of the components of UE 2600 or partitioned across multiple components of UE 2600. Further, the features, benefits, and/or functions described herein may be implemented in any combination of hardware, software or firmware. In one example, communication subsystem 2631 may be configured to include any of the components described herein. Further, processing circuitry 2601 may be configured to communicate with any of such components over bus 2602. In another example, any of such components may be represented by program instructions stored in memory that when executed by processing circuitry 2601 perform the corresponding functions described herein. In another example, the functionality of any of such components may be partitioned between processing circuitry 2601 and communication subsystem 2631. In another example, the non-computationally intensive functions of any of such components may be implemented in software or firmware and the computationally intensive functions may be implemented in hardware.

Figure 27:
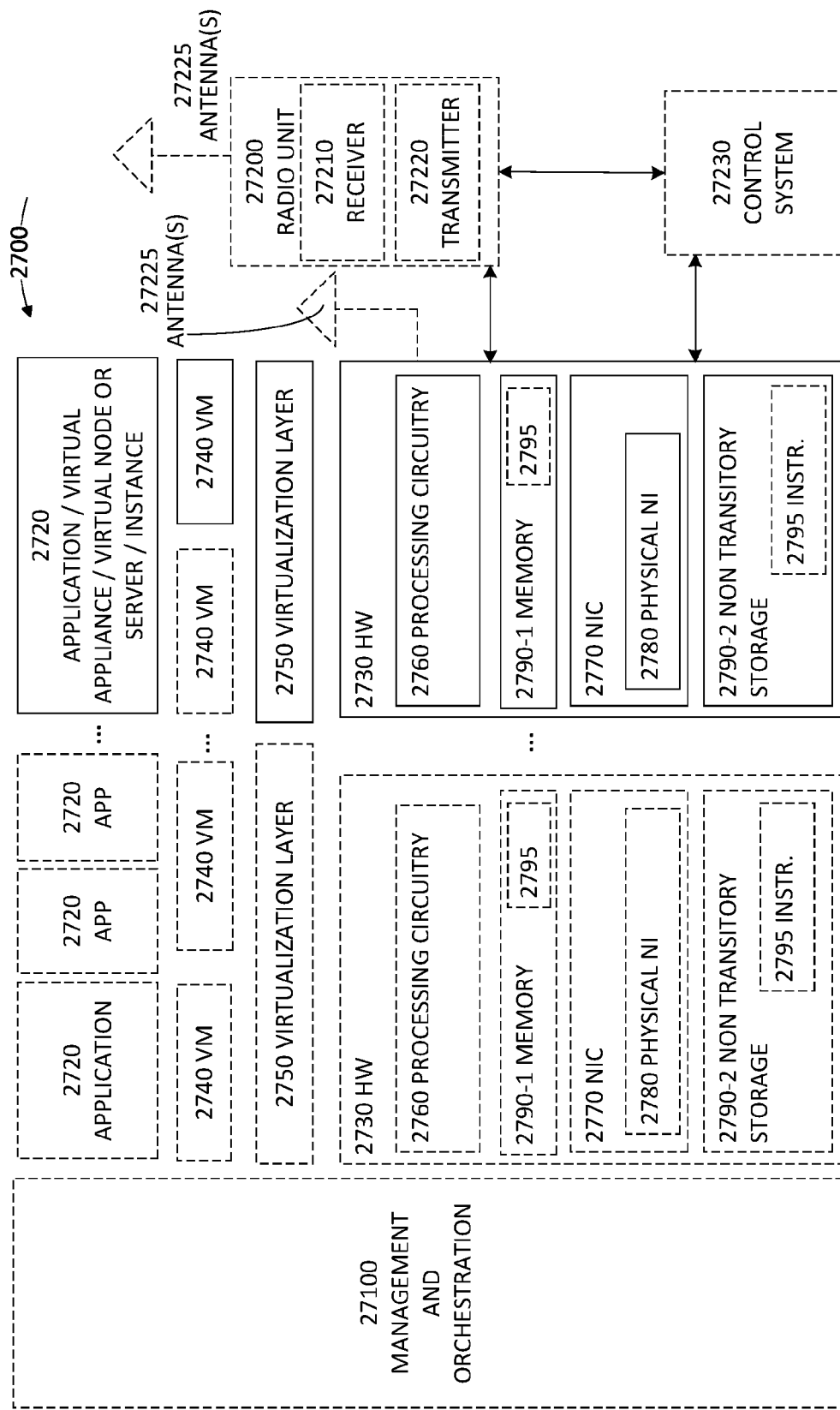
FIG. 27 is a block diagram of a virtualization environment according to some embodiments.

FIG. 27 is a schematic block diagram illustrating a virtualization environment 2700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2700 hosted by one or more of hardware nodes 2730. Further, in embodiments in which the virtual node is not a radio access node or does not require radio connectivity (e.g., a core network node), then the network node may be entirely virtualized.

The functions may be implemented by one or more applications 2720 (which may alternatively be called software instances, virtual appliances, network functions, virtual nodes, virtual network functions, etc.) operative to implement some of the features, functions, and/or benefits of some of the embodiments disclosed herein. Applications 2720 are run in virtualization environment 2700 which provides hardware 2730 comprising processing circuitry 2760 and memory 2790. Memory 2790 contains instructions 2795 executable by processing circuitry 2760 whereby application 2720 is operative to provide one or more of the features, benefits, and/or functions disclosed herein.

Virtualization environment 2700, comprises general-purpose or special-purpose network hardware devices 2730 comprising a set of one or more processors or processing circuitry 2760, which may be commercial off-the-shelf (COTS) processors, dedicated Application Specific Integrated Circuits (ASICs), or any other type of processing circuitry including digital or analog hardware components or special purpose processors. Each hardware device may comprise memory 2790-1 which may be non-persistent memory for temporarily storing instructions 2795 or software executed by processing circuitry 2760. Each hardware device may comprise one or more network interface controllers (NICs) 2770, also known as network interface cards, which include physical network interface 2780. Each hardware device may also include non-transitory, persistent, machine-readable storage media 2790-2 having stored therein software 2795 and/or instructions executable by processing circuitry 2760. Software 2795 may include any type of software including software for instantiating one or more virtualization layers 2750 (also referred to as hypervisors), software to execute virtual machines 2740 as well as software allowing it to execute functions, features and/or benefits described in relation with some embodiments described herein.

Virtual machines 2740, comprise virtual processing, virtual memory, virtual networking or interface and virtual storage, and may be run by a corresponding virtualization layer 2750 or hypervisor. Different embodiments of the instance of virtual appliance 2720 may be implemented on one or more of virtual machines 2740, and the implementations may be made in different ways.

During operation, processing circuitry 2760 executes software 2795 to instantiate the hypervisor or virtualization layer 2750, which may sometimes be referred to as a virtual machine monitor (VMM). Virtualization layer 2750 may present a virtual operating platform that appears like networking hardware to virtual machine 2740.

As shown in FIG. 27, hardware 2730 may be a standalone network node with generic or specific components. Hardware 2730 may comprise antenna 27225 and may implement some functions via virtualization. Alternatively, hardware 2730 may be part of a larger cluster of hardware (e.g. such as in a data center or customer premise equipment (CPE)) where many hardware nodes work together and are managed via management and orchestration (MANO) 27100, which, among others, oversees lifecycle management of applications 2720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2740 may be a software implementation of a physical machine that runs programs as if they were executing on a physical, non-virtualized machine. Each of virtual machines 2740, and that part of hardware 2730 that executes that virtual machine, be it hardware dedicated to that virtual machine and/or hardware shared by that virtual machine with others of the virtual machines 2740, forms a separate virtual network elements (VNE).

Still in the context of NFV, Virtual Network Function (VNF) is responsible for handling specific network functions that run in one or more virtual machines 2740 on top of hardware networking infrastructure 2730 and corresponds to application 2720 in FIG. 27.

In some embodiments, one or more radio units 27200 that each include one or more transmitters 27220 and one or more receivers 27210 may be coupled to one or more antennas 27225. Radio units 27200 may communicate directly with hardware nodes 2730 via one or more appropriate network interfaces and may be used in combination with the virtual components to provide a virtual node with radio capabilities, such as a radio access node or a base station.

In some embodiments, some signalling can be effected with the use of control system 27230 which may alternatively be used for communication between the hardware nodes 2730 and radio units 27200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by model training equipment, the method comprising:
obtaining a training dataset that comprises false-cell-free datapoints, with each false-cell-free datapoint indicating a combination of values detected for a cell characteristic in the assumed absence of a false cell; and using the training dataset, training a model to test for the presence of a false cell based on an extent to which a test dataset differs from the training dataset, wherein the model is trained to test for the presence of a false cell that is using the same cell identity as a genuine cell.

A2. The method of embodiment A1, further comprising obtaining an input dataset that indicates values detected for the cell characteristic in the assumed absence of a false cell, and wherein obtaining the training dataset comprises creating the training dataset from the input dataset.

A3. The method of embodiment A2, wherein the input dataset includes data detected and reported by wireless devices in the assumed absence of a false cell.

A4. The method of embodiment A2, wherein creating the training dataset from the input dataset comprises forming the false-cell-free datapoints as respective combinations of values indicated by the input dataset.

A5. The method of any of embodiments A1-A4, wherein the values in each combination indicated by a false-cell-free datapoint have a spatial and/or temporal relationship, and wherein the model is trained to test for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

A6. The method of any of embodiments A1-A5, wherein the values in the combination indicated by each false-cell-free datapoint are associated with respective cell identities in a set.

A7. The method of any of embodiments A1-A6, wherein the model is trained to test for the presence of a false cell that is using a certain cell identity based on an extent to which a test distribution for the certain cell identity differs from a false-cell-free distribution for the certain cell identity.

A8. The method of embodiment A7, wherein the test distribution for the certain cell identity comprises a distribution of values detected for the cell characteristic in association with the certain cell identity across test datapoints of the test dataset, and wherein the false-cell-free distribution for the certain cell identity comprises a distribution of values detected for the cell characteristic in association with the certain cell identity across the false-cell-free datapoints of the training dataset.

A9. The method of any of embodiments A7-A8, wherein:
the test distribution for the certain cell identity comprises a distribution of values detected for the cell characteristic in the test dataset, with each of those values being detected in combination with a given reference value detected for the cell characteristic in association with a reference cell identity; and
the false-cell-free distribution for the certain cell identity comprises a distribution of values detected for the cell characteristic in the training dataset, with each of those values being detected in combination with the given reference value.

A10. The method of embodiment A9, wherein the model represents the false-cell-free distribution for the certain cell identity as a measure of central tendency, and wherein the model comprises a threshold, wherein a false cell is to be detected as present if a measure of central tendency of the test distribution for the certain cell identity exceeds the measure of central tendency of the false-cell-free distribution for the certain cell identity by at least the threshold.

A11. The method of any of embodiments A7-A8, wherein:
the test distribution for the certain cell identity comprises a distribution of values detected for the cell characteristic across different reference values detected for the cell characteristic in association with a reference cell identity; and the false-cell-free distribution for the certain cell identity comprises a distribution of values detected for the cell characteristic across the different reference values.

A12. The method of embodiment A11, wherein the model represents the false-cell-free distribution for the certain cell identity as a two-dimensional curve, and wherein the model comprises a threshold, wherein a false cell is to be detected as present if an area under a two-dimensional curve representing the test distribution for the certain cell identity exceeds the threshold or exceeds an area under the two-dimensional curve representing the false-cell-free distribution for the certain cell identity by at least the threshold.

A12-2. The method of embodiment A11, wherein the model represents the false-cell-free distribution for the certain cell identity as a two-dimensional curve, and wherein the model comprises a threshold, wherein a false cell is to be detected as present if the area between the two-dimensional curve representing the test distribution for the certain cell identity and the two-dimensional curve representing the false-cell-free distribution for the same cell identity exceeds by at least the threshold.

A13. The method of any of embodiments A9-A12, wherein each false-cell-free datapoint represents a measurement report that reports values detected for the cell characteristic associated with respective cell identities in a set, including a serving cell identity and one or more neighbor cell identities, wherein the reference cell identity is the serving cell identity.

A14. The method of any of embodiments A1-A13, wherein said training comprises training the model to test for the presence of a false cell using a certain cell identity based on an extent to which a Kullback-Leibler (KL) divergence representing values associated with the certain cell identity in the test dataset differs from a KL divergence representing values associated with the certain cell identity in the training dataset.

A14-2. The method of any of embodiments A1-A13, wherein said training comprises training the model to test for the presence of a false cell using a certain cell identity based on an extent to which the Kullback-Leibler (KL) divergence, representing a value computed by comparing the distribution associated with the cell identity in test dataset and distribution of the same cell in training dataset, differs by greater than a threshold value.

A15. The method of any of embodiments A1-A6, wherein the values in the combination indicated by each false-cell-free datapoint are associated with respective cell identities in a set, wherein the test dataset includes a test datapoint indicating a combination of values detected for the cell characteristic, wherein the values in the combination indicated by the test datapoint are associated with respective cell identities in the set, wherein said training comprises training the model to predict a value for the cell characteristic in association with a certain cell identity in the set, from a combination of one or more values indicated by the test datapoint as detected for the cell characteristic in association with one or more other cell identities in the set, wherein the model is trained to test for the presence of a false cell using the certain cell identity based on an extent to which the value associated with the certain cell identity in the combination indicated by the test datapoint differs from the value predicted for the cell characteristic in association with the certain cell identity.

A16. The method of any of embodiments A1-A6 and A15, wherein the model is a regression model.

A17. The method of any of embodiments A1-A6 and A15, wherein the model is a classification model.

A18. The method of any of embodiments A1-A5, wherein the combination of values indicated by each false-cell-free datapoint comprise a pair of values detected by a wireless device for the cell characteristic for the same cell identity but at different consecutive detection times.

A19. The method of embodiment A18, wherein the model comprises a measure of central tendency of the differences between the values of each pair comprised in a false-cell-free datapoint, and wherein the model further comprises a threshold based on which to test an extent to which a pair of values detected by the wireless device for the cell characteristic for the same cell identity but at different detection times according to a test datapoint differs from the measure of central tendency.

A20. The method of any of embodiments A1-A19, wherein the cell characteristic is a cell signal strength or quality.

A21. The method of any of embodiments A1-A19, wherein the cell characteristic is cell presence.

A22. The method of any of embodiments A1-A21, wherein the model is a machine learning model.

A23. The method of any of embodiments A1-A22, wherein the model is specific to certain conditions under which the cell characteristic is detected.

A24. The method of any of embodiments A1-A23, wherein the training dataset further comprises false-cell datapoints, with each false-cell datapoint indicating a combination of values detected for the cell characteristic in the assumed presence of a false cell.

A25. The method of any of embodiments A1-A24, wherein the method is further performed by detection equipment, and wherein the method further comprises:
obtaining the test dataset that comprises test datapoints, with each test datapoint indicating a combination of values detected for a cell characteristic; and
testing for the presence of a false cell based on an extent to which the test dataset differs from the training dataset according to the trained model.

A26. The method of any of embodiments A1-A25, wherein one or more values for the cell characteristic are reported by a wireless device.

A27. The method of any of embodiments A1-A26, wherein the cell characteristic is reference signal received power or reference signal received quality, or received signal strength indication or signal to noise ratio or signal to interference plus noise ratio.

Group B Embodiments

B1. A method performed by detection equipment, the method comprising:
obtaining a test dataset that comprises one or more test datapoints, with each test datapoint indicating a combination of values detected for a cell characteristic; and
testing for the presence of a false cell that is using the same cell identity as a genuine cell, based on an extent to which the test dataset differs from a training dataset according to a model trained using the training dataset.

B2. The method of embodiment B1, wherein the training dataset comprises false-cell-free datapoints, with each false-cell-free datapoint indicating a combination of values detected for the cell characteristic in the assumed absence of a false cell.

B3. The method of any of embodiments B1-B2, wherein the values in each combination indicated by a false-cell-free datapoint of the training dataset have a spatial and/or temporal relationship, and wherein said testing comprises testing for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

B4. The method of any of embodiments B1-B3, wherein the values in the combination indicated by each test datapoint are associated with respective cell identities in a set.

B5. The method of any of embodiments B1-B4, wherein said testing comprises testing for the presence of a false cell that is using a certain cell identity based on an extent to which a test distribution for the certain cell identity differs from a false-cell-free distribution for the certain cell identity.

B6. The method of any of embodiments B1-B5:
wherein said testing comprises testing for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity;
wherein the false-cell-free distribution for the non-reference cell identity comprises a distribution of values detected for the cell characteristic in combination with the given reference value, detected in association with the non-reference cell identity, and detected across false-cell-free datapoints of the training dataset; and
wherein the test distribution for the non-reference cell identity comprises a distribution of values detected for the cell characteristic in combination with the given reference value, detected in association with the non-reference cell identity, and detected across test datapoints of the test dataset.

B7. The method of embodiment B6, wherein the model represents the false-cell-free distribution for the non-reference cell identity as a measure of central tendency of the values detected for the cell characteristic in combination with the given reference value, detected in association with the non-reference cell identity, and detected across the false-cell-free datapoints, wherein the model comprises a threshold based on which to test an extent to which the false-cell-free distribution for the non-reference cell identity differs from the test distribution for the non-reference cell identity, and wherein said testing comprises testing for the presence of a false cell using the measure of central tendency and the threshold.

B8. The method of any of embodiments B1-B5:
wherein said testing comprises testing for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity;
wherein the false-cell-free distribution for the non-reference cell identity comprises a distribution of values detected for the cell characteristic in association with the non-reference cell identity, detected across false-cell-free datapoints of the training dataset, and detected across the different reference values; and
wherein the test distribution for the non-reference cell identity comprises a distribution of values detected for the cell characteristic in association with the non-reference cell identity, detected across test datapoints of the test dataset, and detected across the different reference values.

B9. The method of embodiment B8, wherein the model represents the false-cell-free distribution for the non-reference cell identity as a two-dimensional curve of the values detected for the cell characteristic in association with the non-reference cell identity, detected across the false-cell-free datapoints, and detected across the different reference values, wherein the model comprises a threshold based on which to test an extent to which the test distribution for the non-reference cell identity differs from the false-cell-free distribution for the non-reference cell identity, and wherein said testing comprises testing for the presence of a false cell using the two-dimensional curve and the threshold.

B10. The method of embodiment B9, wherein the test distribution for the non-reference cell identity is represented as a two-dimensional curve of values detected for the cell characteristic in association with the non-reference cell identity, detected across the test datapoints, and detected across the different reference values, and wherein said testing comprises testing for the presence of a false cell based on an extent to which an area under the two-dimensional curve represented by the test distribution is above the threshold.

B11. The method of any of embodiments B6-B10, wherein each test datapoint represents a measurement report that reports values detected for the cell characteristic associated with respective cell identities in a set, including a serving cell identity and one or more neighbor cell identities, wherein the reference cell identity is the serving cell identity.

B12. The method of any of embodiments B1-B11, wherein said testing comprises testing for the presence of a false cell using a certain cell identity based on an extent to which a Kullback-Leibler (KL) divergence representing values associated with the certain cell identity in the test dataset differs from a KL divergence representing values associated with the certain cell identity in the training dataset according to the model.

B12-2. The method of any of embodiments B1-B11, wherein said testing comprises testing for the presence of a false cell using a certain cell identity based on an extent to which the Kullback-Leibler (KL) divergence, representing a value computed by comparing the distribution associated with the cell identity in test dataset and distribution of the same cell in training dataset, differs by greater than a threshold value according to the model.

B13. The method of any of embodiments B1-B4, wherein the training dataset comprises false-cell-free datapoints, with each false-cell-free datapoint indicating a combination of values detected for the cell characteristic in the assumed absence of a false cell, wherein the values in the combination indicated by each false-cell-free datapoint are associated with respective cell identities in a set, wherein the test dataset includes a test datapoint indicating a combination of values detected for the cell characteristic, wherein the values in the combination indicated by the test datapoint are associated with respective cell identities in the set, wherein said testing comprises:
predicting a value for the cell characteristic in association with a certain cell identity in the set, from a combination of one or more values indicated by the test datapoint as detected for the cell characteristic in association with one or more other cell identities in the set; and
determining an extent to which the value associated with the certain cell identity in the combination indicated by the test datapoint differs from the value predicted for the cell characteristic in association with the certain cell identity.

B14. The method of any of embodiments B1-B4 and B13, wherein the model is a regression model.

B15. The method of any of embodiments B1-B4 and B13, wherein the model is a classification model.

B16. The method of any of embodiments B1-B4, wherein the combination of values indicated by each test datapoint comprise a pair of values detected by a wireless device for the cell characteristic for the same cell identity but at different consecutive detection times.

B17. The method of embodiment B16, wherein the model comprises a measure of central tendency of the differences between the values of each pair comprised in a test datapoint, and wherein the model further comprises a threshold based on which to test an extent to which a pair of values detected by the wireless device for the cell characteristic for the same cell identity but at different detection times according to a test datapoint differs from the measure of central tendency, and wherein said testing comprises testing for the presence of a false cell using the measure of central tendency and the threshold.

B18. The method of any of embodiments B1-B17, wherein the cell characteristic is a cell signal strength or quality.

B19. The method of any of embodiments B1-B17, wherein the cell characteristic is a cell identity.

B20. The method of any of embodiments B1-B19, wherein the model is a machine learning model.

B21. The method of any of embodiments B1-B20, wherein the model is specific to certain conditions under which the cell characteristic is detected.

B22. The method of any of embodiments B1-B21, wherein the training dataset further comprises false-cell datapoints, with each false-cell datapoint indicating a combination of values detected for the cell characteristic in the assumed presence of a false cell.

BB. The method of any of the previous embodiments, further comprising:
obtaining user data; and
forwarding the user data to a host computer or a wireless device.

Group C Embodiments

C1. Wireless communication equipment configured to perform any of the steps of any of the Group A embodiments.

C2. Wireless communication equipment comprising processing circuitry configured to perform any of the steps of any of the Group A embodiments.

C3. Wireless communication equipment comprising:
communication circuitry; and
processing circuitry configured to perform any of the steps of any of the Group A embodiments.

C4. Wireless communication equipment comprising:
processing circuitry configured to perform any of the steps of any of the Group A embodiments; and
power supply circuitry configured to supply power to the wireless communication equipment.

C5. Wireless communication equipment comprising:
processing circuitry and memory, the memory containing instructions executable by the processing circuitry whereby the wireless communication equipment is configured to perform any of the steps of any of the Group A embodiments.

C6. The wireless communication equipment of any of embodiments C1-C5, wherein the wireless communication equipment comprises model training equipment and/or detection equipment.

C7. A computer program comprising instructions which, when executed by at least one processor of wireless communication equipment, causes the wireless communication equipment to carry out the steps of any of the Group A embodiments.

C8. A carrier containing the computer program of embodiment C7, wherein the carrier is one of an electronic signal, optical signal, radio signal, or computer readable storage medium.

C9. Wireless communication equipment configured to perform any of the steps of any of the Group B embodiments.

C10. Wireless communication equipment comprising processing circuitry configured to perform any of the steps of any of the Group B embodiments.

C11. Wireless communication equipment comprising:
communication circuitry; and
processing circuitry configured to perform any of the steps of any of the Group B embodiments.

C12. Wireless communication equipment comprising:
processing circuitry configured to perform any of the steps of any of the Group B embodiments; power supply circuitry configured to supply power to the wireless communication equipment.

C13. Wireless communication equipment comprising:
processing circuitry and memory, the memory containing instructions executable by the processing circuitry whereby the wireless communication equipment is configured to perform any of the steps of any of the Group B embodiments.

C14. Wireless communication equipment of any of embodiments C9-C13, wherein the wireless communication equipment comprises detection equipment.

C15. A computer program comprising instructions which, when executed by at least one processor of wireless communication equipment, causes the wireless communication equipment to carry out the steps of any of the Group B embodiments.

C16. The computer program of embodiment C14, wherein the wireless communication equipment comprises detection equipment.

C17. A carrier containing the computer program of any of embodiments C15-C16, wherein the carrier is one of an electronic signal, optical signal, radio signal, or computer readable storage medium.

What is claimed is:

1. A method performed by detection equipment for detecting a false cell in a wireless communication network, the method comprising:
obtaining a test dataset that comprises one or more test datapoints, with each test datapoint indicating a combination of values detected for a cell characteristic, wherein the values in the combination indicated by each test datapoint are associated with respective cell identities in a set; and
testing for the presence of a false cell that is using the same cell identity as a genuine cell, based on an extent to which the test dataset differs from a training dataset according to a model trained using the training dataset.

2. The method of claim 1, wherein the training dataset comprises false-cell-free datapoints, with each false-cell-free datapoint indicating a combination of values detected for the cell characteristic in the assumed absence of a false cell.

3. The method of claim 1, wherein the values in each combination indicated by a false-cell-free datapoint of the training dataset have a spatial and/or temporal relationship, and wherein said testing comprises testing for the presence of a false cell based on an extent to which a spatial and/or temporal relationship of values in each combination indicated by a test datapoint of the test dataset differs from the spatial and/or temporal relationship of the values in each combination indicated by a false-cell-free datapoint.

4. The method of claim 1:
wherein said testing comprises testing for the presence of a false cell that is using a non-reference cell identity based on an extent to which, for a given reference value detected for the cell characteristic in association with a reference cell identity, a test distribution for the non-reference cell identity differs from a false-cell-free distribution for the non-reference cell identity;
wherein the false-cell-free distribution for the non-reference cell identity comprises a distribution of values detected for the cell characteristic in combination with the given reference value, detected in association with the non-reference cell identity, and detected across false-cell-free datapoints of the training dataset; and
wherein the test distribution for the non-reference cell identity comprises a distribution of values detected for the cell characteristic in combination with the given reference value, detected in association with the non-reference cell identity, and detected across test datapoints of the test dataset.

5. The method of claim 4, wherein the model represents the false-cell-free distribution for the non-reference cell identity as a measure of central tendency of the values detected for the cell characteristic in combination with the given reference value, detected in association with the non-reference cell identity, and detected across the false-cell-free datapoints, wherein the model comprises a threshold based on which to test an extent to which the false-cell-free distribution for the non-reference cell identity differs from the test distribution for the non-reference cell identity, and wherein said testing comprises testing for the presence of a false cell using the measure of central tendency and the threshold.

6. The method of claim 1:
wherein said testing comprises testing for the presence of a false cell that is using a non-reference cell identity based on an extent to which, across different reference values detected for the cell characteristic in association with a reference cell identity, a test distribution for the non-reference cell identity differs from a false-cell-free distribution for the non-reference cell identity;
wherein the false-cell-free distribution for the non-reference cell identity comprises a distribution of values detected for the cell characteristic in association with the non-reference cell identity, detected across false-cell-free datapoints of the training dataset, and detected across the different reference values; and
wherein the test distribution for the non-reference cell identity comprises a distribution of values detected for the cell characteristic in association with the non-reference cell identity, detected across test datapoints of the test dataset, and detected across the different reference values.

7. The method of claim 6, wherein the model represents the false-cell-free distribution for the non-reference cell identity as a two-dimensional curve of the values detected for the cell characteristic in association with the non-reference cell identity, detected across the false-cell-free datapoints, and detected across the different reference values, wherein the model comprises a threshold based on which to test an extent to which the test distribution for the non-reference cell identity differs from the false-cell-free distribution for the non-reference cell identity, and wherein said testing comprises testing for the presence of a false cell using the two-dimensional curve and the threshold.

8. The method of claim 4, wherein each test datapoint represents a measurement report that reports values detected for the cell characteristic associated with respective cell identities in a set, including a serving cell identity and one or more neighbor cell identities, wherein the reference cell identity is the serving cell identity.

9. The method of claim 1, wherein said testing comprises testing for the presence of a false cell using a certain cell identity based on an extent to which a Kullback-Leibler (KL) divergence representing values associated with the certain cell identity in the test dataset differs from a KL divergence representing values associated with the certain cell identity in the training dataset according to the model.

10. The method of claim 1, wherein the training dataset comprises false-cell-free datapoints, with each false-cell-free datapoint indicating a combination of values detected for the cell characteristic in the assumed absence of a false cell, wherein the values in the combination indicated by each false-cell-free datapoint are associated with respective cell identities in a set, wherein the test dataset includes a test datapoint indicating a combination of values detected for the cell characteristic, wherein the values in the combination indicated by the test datapoint are associated with respective cell identities in the set, wherein said testing comprises:

predicting a value for the cell characteristic in association with a certain cell identity in the set, from a combination of one or more values indicated by the test datapoint as detected for the cell characteristic in association with one or more other cell identities in the set; and
determining an extent to which the value associated with the certain cell identity in the combination indicated by the test datapoint differs from the value predicted for the cell characteristic in association with the certain cell identity.

11. The method of claim 1, wherein the combination of values indicated by each test datapoint comprise a pair of values detected by a wireless device for the cell characteristic for the same cell identity but at different consecutive detection times, wherein the model comprises a measure of central tendency of the differences between the values of each pair comprised in a test datapoint, and wherein the model further comprises a threshold based on which to test an extent to which a pair of values detected by the wireless device for the cell characteristic for the same cell identity but at different detection times according to a test datapoint differs from the measure of central tendency, and wherein said testing comprises testing for the presence of a false cell using the measure of central tendency and the threshold.

12. The method of claim 1, wherein the cell characteristic is a cell signal strength or quality.

13. A method performed by model training equipment for training a model usable to detect a false cell in a wireless communication network, the method comprising:
obtaining a training dataset that comprises false-cell-free datapoints, with each false-cell-free datapoint indicating a combination of values detected for a cell characteristic in the assumed absence of a false cell, wherein each false-cell-free datapoint represents a measurement report that reports values detected for the cell characteristic associated with respective cell identities in a set, including a serving cell identity and one or more neighbor cell identities; and
using the training dataset, training a model to test for the presence of a false cell based on an extent to which a test dataset differs from the training dataset, wherein the model is trained to test for the presence of a false cell that is using the same cell identity as a genuine cell.

14. The method of claim 13, further comprising obtaining an input dataset that indicates values detected for the cell characteristic in the assumed absence of a false cell, and wherein obtaining the training dataset comprises creating the training dataset from the input dataset by forming the false-cell-free datapoints as respective combinations of values indicated by the input dataset.

15. The method of claim 13, wherein the combination of values indicated by each false-cell-free datapoint comprise a pair of values detected by a wireless device for the cell characteristic for the same cell identity but at different consecutive detection times, wherein the model comprises a measure of central tendency of the differences between the values of each pair comprised in a false-cell-free datapoint, and wherein the model further comprises a threshold based on which to test an extent to which a pair of values detected by the wireless device for the cell characteristic for the same cell identity but at different detection times according to a test datapoint differs from the measure of central tendency.

16. The method of claim 13, wherein the cell characteristic is a cell signal strength or quality.

17. Detection equipment configured to detect a false cell in a wireless communication network, the detection equipment configured to:

obtain a test dataset that comprises one or more test datapoints, with each test datapoint indicating a combination of values detected for a cell characteristic, wherein the values in the combination indicated by each test datapoint are associated with respective cell identities in a set; and test for the presence of a false cell that is using the same cell identity as a genuine cell, based on an extent to which the test dataset differs from a training dataset according to a model trained using the training dataset.

\* \* \* \* \*